US009804386B2

(12) United States Patent
Hayakawa et al.

(10) Patent No.: US 9,804,386 B2
(45) Date of Patent: Oct. 31, 2017

(54) CAMERA DEVICE, THREE-DIMENSIONAL OBJECT DETECTION DEVICE, AND LENS CLEANING METHOD

(71) Applicants: Nissan Motor Co., Ltd., Yokohama-shi, Kanagawa (JP); Clarion Co., Ltd., Saitama-shi, Saitama (JP)

(72) Inventors: Yasuhisa Hayakawa, Yokohama (JP); Osamu Fukata, Commerce Township, MI (US); Masayuki Takemura, Hitachi (JP); Masahiro Kiyohara, Hitachinaka (JP); Shoji Muramatsu, Hitachi (JP); Kota Irie, Sagamihara (JP)

(73) Assignees: Nissan Motor Co., Ltd., Yokohama (JP); Clarion Co., Ltd., Saitama (JP)

( * ) Notice: Subject to any disclaimer, the term of this patent is extended or adjusted under 35 U.S.C. 154(b) by 247 days.

(21) Appl. No.: 14/416,650

(22) PCT Filed: Jul. 26, 2013

(86) PCT No.: PCT/JP2013/070310
§ 371 (c)(1),
(2) Date: Jan. 23, 2015

(87) PCT Pub. No.: WO2014/017626
PCT Pub. Date: Jan. 30, 2014

(65) Prior Publication Data
US 2015/0177512 A1   Jun. 25, 2015

(30) Foreign Application Priority Data

Jul. 27, 2012  (JP) .................................. 2012-166530
Jul. 27, 2012  (JP) .................................. 2012-166531

(51) Int. Cl.
*B60S 1/48*  (2006.01)
*G02B 27/00*  (2006.01)
(Continued)

(52) U.S. Cl.
CPC ............ *G02B 27/0006* (2013.01); *B60S 1/56* (2013.01); *G03B 17/02* (2013.01); *G03B 17/08* (2013.01);
(Continued)

(58) Field of Classification Search
CPC ........ B60S 1/0848; B60S 1/56; B60S 1/0818; B60S 1/0822; B60S 1/0825; B60S 1/544;
(Continued)

(56) References Cited

U.S. PATENT DOCUMENTS 6,289,278 B1 * 9/2001 Endo .................. B60K 31/0008
340/988
8,120,673 B2 * 2/2012 Uwai ................... H04N 1/4097
348/231.3
(Continued)

FOREIGN PATENT DOCUMENTS

JP   2001-171491 A   6/2001
JP   2003-259358 A   9/2003
(Continued)

OTHER PUBLICATIONS

Lynn Buck: "2013 Nissan Altima First Drive", Jun. 1, 2012, Retrieved from the Internet: URL: http://www.automoblog.net/2012/06/01/2013-nissan-altima-review/.
(Continued)

*Primary Examiner* — Nathnael Aynalem
(74) *Attorney, Agent, or Firm* — Global IP Counselors, LLP

(57) ABSTRACT

A camera device includes image capturing device, a lens cleaning device, an adhesion state assessment unit and a controller. The image capturing device is installed on a vehicle and has a lens for forming an image of the vehicle surroundings. The lens cleaning device cleans the lens by spraying a cleaning fluid on the lens in accordance with a
(Continued)

predetermined lens cleaning step, in which at least a supply time for supplying cleaning fluid to the lens surface is predetermined. The adhesion state assessment unit is programmed to assess an adhesion state of contamination from a distribution of pixels corresponding to foreign matter adhered to the lens based on a captured image. The controller is programmed to extend the time until a time to start supplying the cleaning fluid in the lens cleaning step as the number of pixels corresponding to foreign matter adhered to the lens increases.

14 Claims, 34 Drawing Sheets

(51) Int. Cl.
| | | |
|---|---|---|
| B60S 1/56 | (2006.01) | |
| H04N 5/217 | (2011.01) | |
| G06K 9/00 | (2006.01) | |
| G06T 7/00 | (2017.01) | |
| G03B 17/02 | (2006.01) | |
| G03B 17/08 | (2006.01) | |
| B60S 1/08 | (2006.01) | |

(52) U.S. Cl.
CPC ..... *G06K 9/00791* (2013.01); *G06K 9/00805* (2013.01); *G06T 7/0002* (2013.01); *H04N 5/2171* (2013.01); *B60S 1/0848* (2013.01)

(58) Field of Classification Search
CPC ............. G02B 27/0006; H04N 1/4097; H04N 5/2171; G06K 9/00778; G06K 9/00785; G06K 9/00791; G06K 9/00798; G06K 9/00805; G06K 9/00812; G06K 9/00818; G06K 9/00825; G06K 9/00832; G06K 9/00845; G06K 9/325; G06K 2209/15; G06T 2207/30236; G06T 2207/30248; G06T 2207/30252; G06T 2207/30256; G06T 2207/30264; G06T 2207/30268; B60R 2300/86
USPC .......................................................... 348/148
See application file for complete search history.

(56) References Cited

U.S. PATENT DOCUMENTS

| | | | | |
|---|---|---|---|---|
| 9,278,670 | B2* | 3/2016 | Hattori | B60S 1/0848 |
| 9,319,637 | B2* | 4/2016 | Lu | H04N 7/18 |
| 2011/0080494 | A1 | 4/2011 | Mori et al. | |
| 2011/0282516 | A1* | 11/2011 | Lich | B60R 21/0134 |
| | | | | 701/1 |
| 2014/0104426 | A1* | 4/2014 | Boegel | B60R 1/00 |
| | | | | 348/148 |

FOREIGN PATENT DOCUMENTS

| | | |
|---|---|---|
| JP | 2007-318355 A | 12/2007 |
| JP | 2008-219063 A | 9/2008 |
| JP | 2008-262333 A | 10/2008 |

OTHER PUBLICATIONS

Atsushi Yamashita et al.: "Removal of Adherent Noises from Image Sequences by Spatio-Temporal Image Processing", 2008 IEEE International Conference on Robotics and Automation, Jan. 1, 2008, pp. 2386-2391, IEEE, USA.

* cited by examiner

CAMERA DEVICE, THREE-DIMENSIONAL OBJECT DETECTION DEVICE, AND LENS CLEANING METHOD

CROSS-REFERENCE TO RELATED APPLICATIONS

This application is a U.S. National stage application of International Application No. PCT/JP2013/070310, filed Jul. 26, 2013, which claims priority to Japanese Patent Application No. 2012-166530 filed in Japan on Jul. 27, 2012, and Japanese Patent Application No. 2012-166531 filed in Japan on Jul. 27, 2012. The entire disclosures of Japanese Patent Application No. 2012-198071 and Japanese Patent Application No. 2012-166530 are hereby incorporated herein by reference.

BACKGROUND

Field of the Invention

The present invention relates to a camera device, a three-dimensional object detection device, and a lens cleaning method.

Background Information

In a conventionally known onboard camera, adhered contamination due to splashing mud and the like is removed by blowing high-pressure air and high-pressure water onto the glass in front of a camera that is provided on the vehicle body (refer to Japanese Laid-Open Patent Application No. 2001-171491).

SUMMARY

According to conventional technology, a cleaning operation for removing lens contamination is executed during rainy weather when contamination such as mud splashing is likely to occur; however, since lens cleaning is executed regardless of the actual state of the lens contamination, there is a problem that the washing water is uselessly consumed.

The problem to be solved by the present invention is to execute lens cleaning at an appropriate timing according to the state of the lens contamination.

The present invention prevents the unnecessary consumption of the washing water and solves the above-mentioned problem by controlling the start timing of the cleaning operation according to the state of the lens contamination.

In the present invention, the cleaning process is executed at a timing that corresponds to the state of the lens contamination or with a cleaning fluid amount that corresponds to the state of the lens contamination; therefore, appropriately cleaning the lens contamination while conserving washing the water is possible.

BRIEF DESCRIPTION OF THE DRAWINGS

Referring now to the attached drawings which form a part of this original disclosure.

DETAILED DESCRIPTION OF THE EMBODIMENTS

First Embodiment 1

Figure 1:
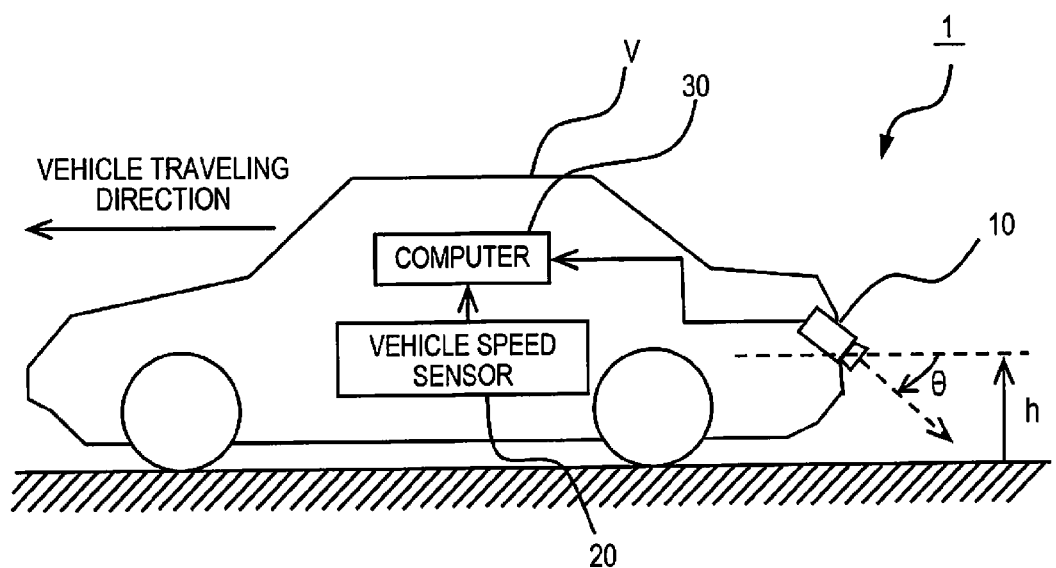
FIG. 1 is a schematic diagram of a vehicle according to one embodiment to which the three-dimensional object detection device of the present invention has been applied.

FIG. 1 is a schematic view of a vehicle according to one embodiment to which a three-dimensional object detection device 1 provided with a camera device 1000 of the present invention has been applied. The three-dimensional object detection device 1 of the present example detects other vehicles requiring the attention of a driver of a host vehicle V while driving, such as other vehicles that the host vehicle V could potentially contact when changing lanes, as obstacles. In particular, the three-dimensional object detection device 1 of the present example detects other vehicles traveling in adjacent lanes next to the lane in which the host vehicle is traveling (hereinafter also referred to simply as adjacent lanes).

The three-dimensional object detection device 1 of the present example is also capable of calculating the travel distance and traveling speed of a detected other vehicle. For this reason, the example described hereafter will be an example will be illustrated in which a three-dimensional object detection device 1 is installed in a host vehicle V and detects, among various detected three-dimensional objects in the periphery of the host vehicle, another vehicle traveling in an adjacent lane next to the lane in which the host vehicle V is traveling. As shown in the drawing, the three-dimensional object detection device 1 of the present example is provided with a camera 10 provided with a lens 11 that forms images of the area rearward of a vehicle, a vehicle speed sensor 20, a computer 30, and a lens cleaning device 100 for cleaning the lens 11 of the camera 10.

As shown in FIG. 1, the camera 10 is attached at a location on the rear of the host vehicle V at a height h so that the optical axis thereof forms a downward angle θ with respect to the horizontal of the host vehicle V. From this position, the camera 10 captures a predetermined area of the surroundings of the host vehicle V. In the present embodiment, one camera is provided for detecting three-dimensional objects at the rear of the host vehicle V, but, in other uses, other cameras for acquiring, for example, images of the vehicle's surroundings can also be provided. The vehicle speed sensor 20 detects the travel speed of the host vehicle V and calculates the vehicle speed based on, e.g., a wheel speed detected by a wheel vehicle speed sensor that detects the rotational speed of a wheel. The computer 30 detects a three-dimensional object rearward of the vehicle and, in the present example, calculates the travel distance and the traveling speed of the three-dimensional object.

Figure 2:
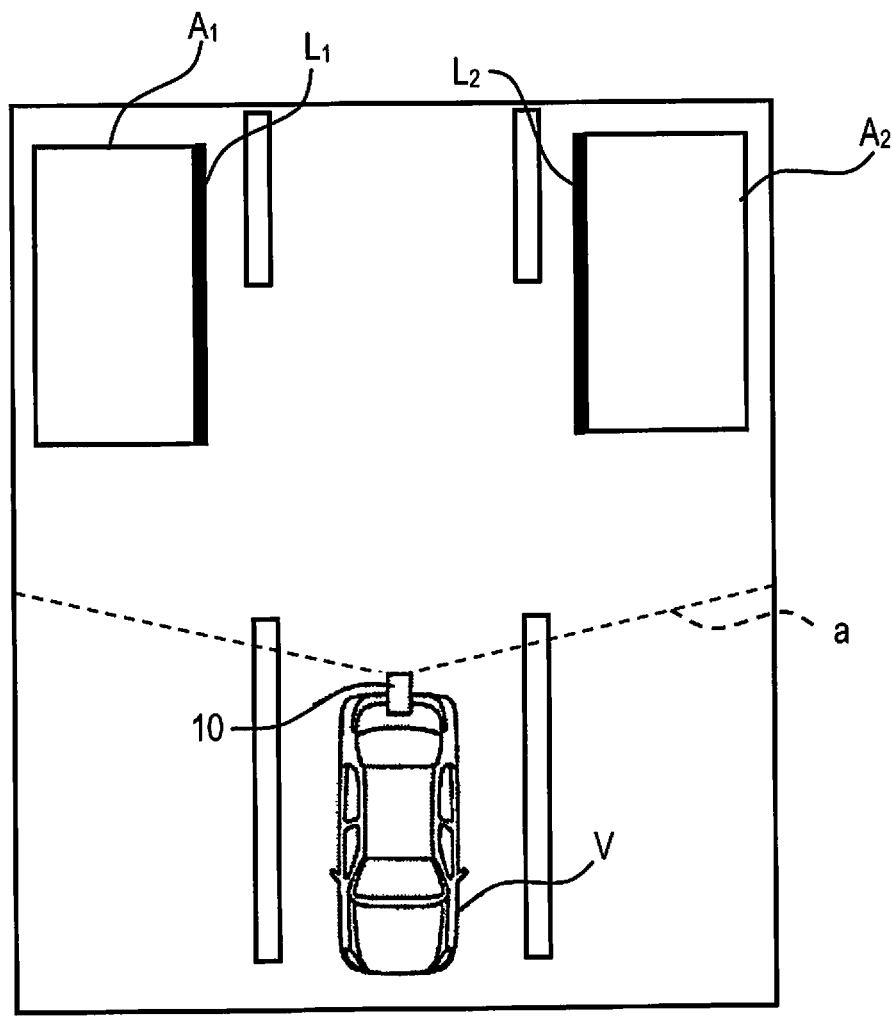
FIG. 2 is a plan view differential waveform of the vehicle in FIG. 1 in a state of travel (three-dimensional object detection by differential waveform information).

FIG. 2 is a plan view of the host vehicle V in FIG. 1 in a state of travel. As shown in the drawing, the camera 10 captures the rear of the vehicle at a predetermined view angle α. Here, the view angle α of the camera 10 is set to a view angle allowing the left and right lanes to be captured in addition to the lane in which the host vehicle V is traveling. The photographable areas at the rear of the host vehicle V that can be captured include the detection object areas A1, A2 over the adjacent lanes to the left and right of the traveling lane of the host vehicle V.

Figure 3:
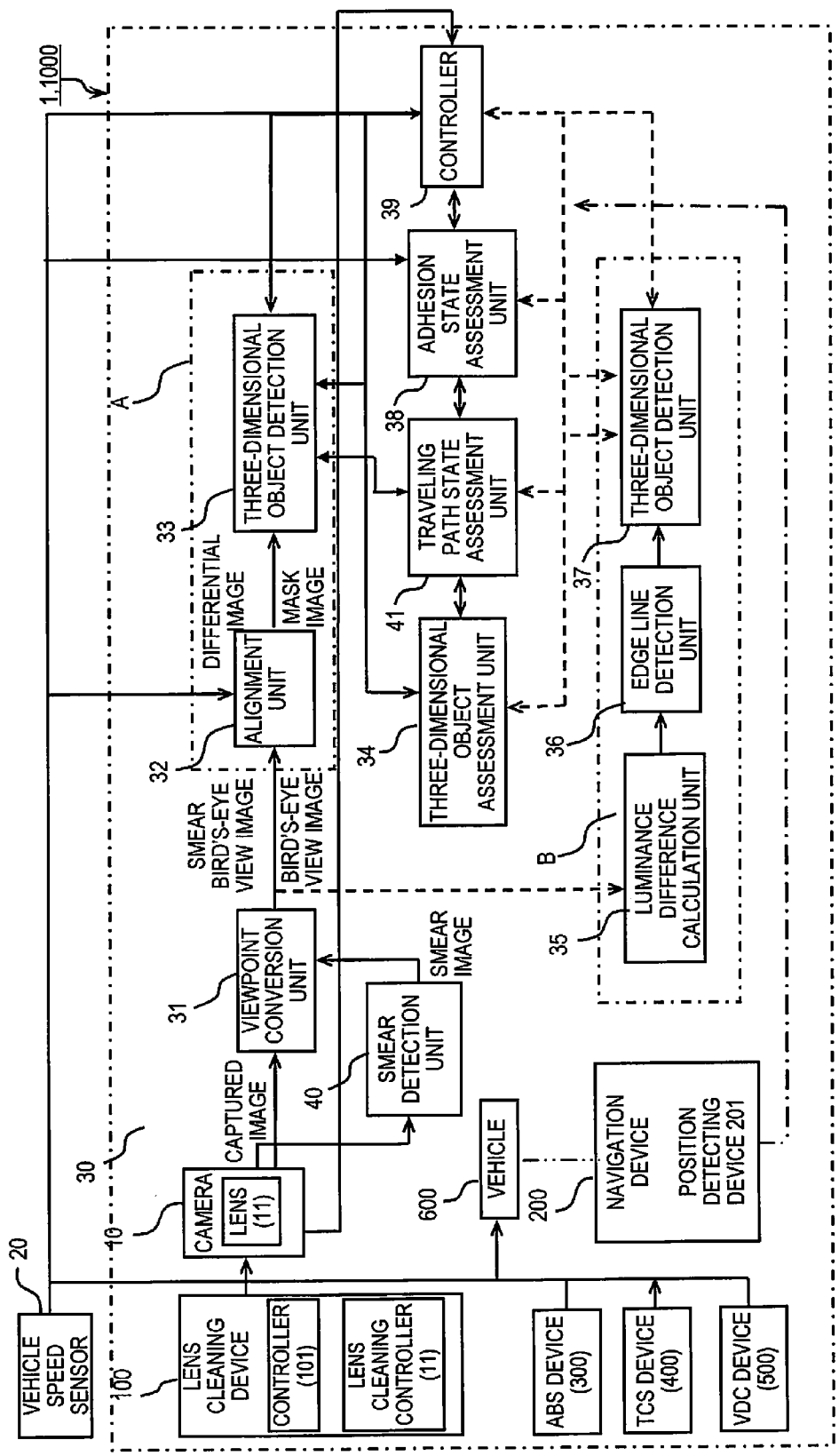
FIG. 3 is a block view of the details of a computer from FIG. 1.

FIG. 3 is a block diagram of the details of the computer 30 from FIG. 1. The camera 10, the vehicle speed sensor 20, the lens cleaning device 100, a vehicle controller 100, a navigation device 200, an ABS (Anti-lock braking system: Anti-lock braking system, hereinafter the same) device 300, a TCS (Tracking Control System: Traction Control System, hereinafter the same) device 400, and a VDC (Vehicle Dynamics Control: Vehicle Dynamics Control) device 500 are also illustrated in FIG. 3 in order to distinctly indicate connection relationships. The vehicle speed sensor 20, the ABS device 300, the TCS device 400, and the VDC device 500 are mounted to a vehicle and can send and receive information to and from the three-dimensional object detection device 100 of the present embodiment via the vehicle controller 100. Each of the devices described above is able to send and receive information via an onboard communication network, such as a CAN (Controller Area Network).

As shown in FIG. 3, the computer 30 is provided with a viewpoint conversion unit 31, an alignment unit 32, a three-dimensional object detection unit 33, a three-dimensional object assessment unit 34, an adhesion state assessment unit 38, a controller 39, a smear detection unit 40, and a traveling path state assessment unit 41. The computer 30 of the present embodiment has a configuration relating to a three-dimensional object detection block using differential waveform information. The computer 30 of the present embodiment can also have a configuration relating to a three-dimensional object detection block using edge information. In this case, a detection block configuration A comprising the alignment unit 32 and the three-dimensional object detection unit 33 shown in FIG. 3 can be replaced by a detection block configuration B comprising the luminance difference calculation unit 35, the edge line detection unit 36, and the three-dimensional object detection unit 37 surrounded by the dotted line. As shall be apparent, a configuration that is provided with both the detection block configuration A and the detection block configuration B and performs three-dimensional object detection based on the differential waveform information and the three-dimensional object detection based on the edge information is also possible. If both the detection block configuration A and detection block configuration B are provided, either the detection block configuration A or the detection block configuration B can be operated according to environmental factors, such as luminance. These various configurations will be described hereafter.

Three-Dimensional Object Detection Based on Differential Waveform Information

The three-dimensional object detection device 1 of the present embodiment detects three-dimensional objects present in a right-side detection area or a left-side detection area rearward of the vehicle, based on the image information obtained by a monocular camera 10 taking images of the rear of the vehicle.

Captured image data of the predetermined area captured by the camera 10 is input into the viewpoint conversion unit 31, and the captured image data thus input is converted into bird's-eye view image data, which is a bird's-eye view. Here, the 'bird's-eye view' refers to a view from a viewpoint of an imaginary camera looking downward from midair, e.g., vertically downward. This viewpoint conversion can be executed as disclosed, for example, in Japanese Laid-Open Patent Application No. 2008-219063. The captured image data is viewpoint-converted to bird's-eye view image data based on the principle that vertical edges unique to three-dimensional objects are converted to straight-line groups passing through specific fixed points via viewpoint conversion to bird's-eye view image data, with this principle allowing for a distinction between flat objects and three-dimensional objects. The results of the image conversion process by the viewpoint conversion unit 31 are also used to detect flat objects using edge information, as described hereafter.

Figure 4:
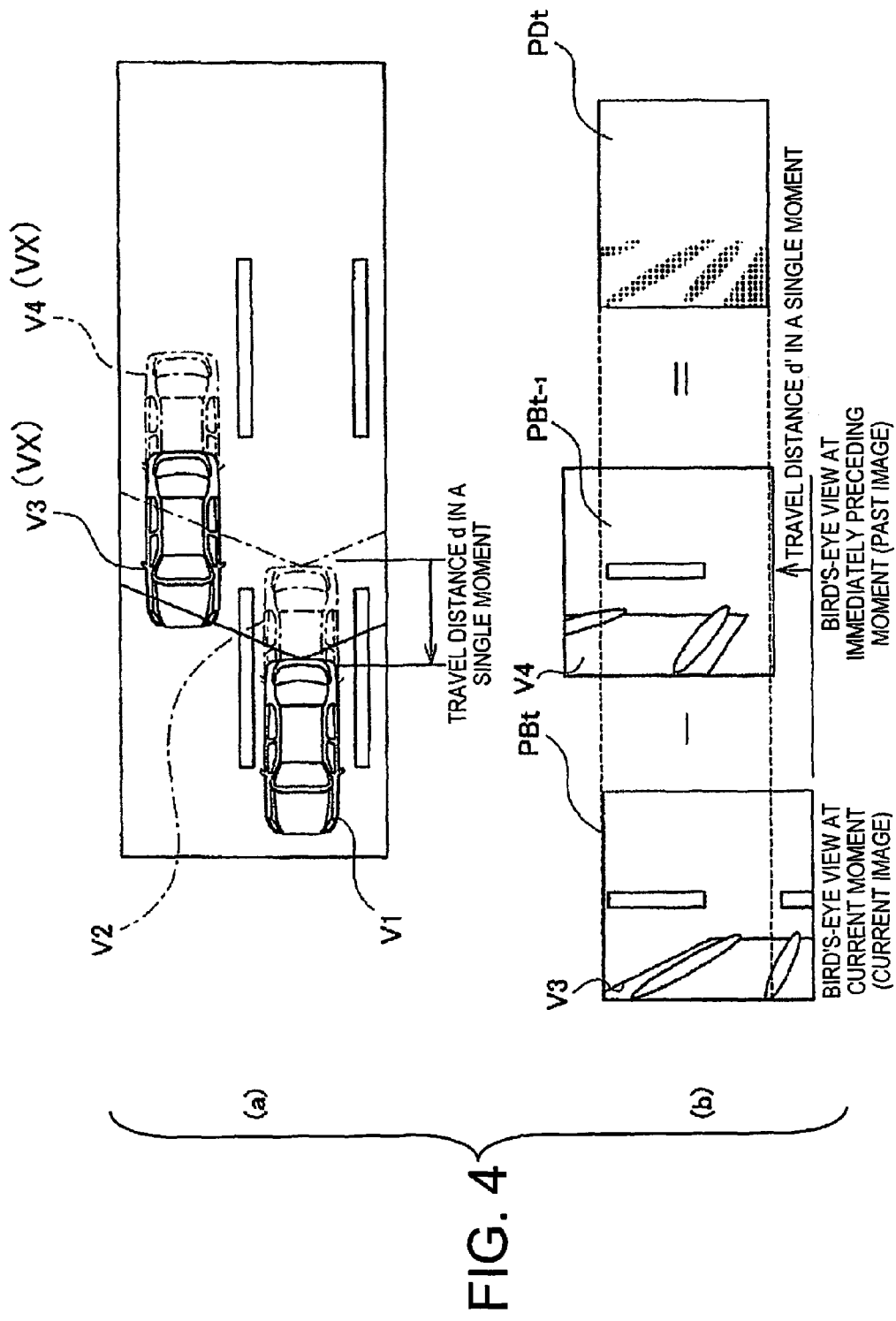
FIG. 4 is an explanatory illustration of an overview of a process performed by an alignment unit in FIG. 3, with part (a) illustrating the state of motion of the vehicle in a plan view, and part (b) showing a general overview of the alignment.

The bird's-eye view image data obtained via viewpoint conversion performed by the viewpoint conversion unit 31 are sequentially input to the alignment unit 32, which aligns input the bird's-eye view image data input at different points in time. FIG. 4 is an explanatory illustration of an overview of a process performed by an alignment unit 32, with part (a) being a plan view of the host vehicle V in a state of motion, and part (b) showing an overview of the alignment process.

As shown in part (a) of FIG. 4, an assumption has been made that the host vehicle V is positioned at V1 at the current moment and that the host vehicle V one moment before was positioned at V2 at one moment before. An assumption has also been made that another vehicle VX is positioned to the rear of the host vehicle V and travels parallel to the host vehicle V and that the other vehicle VX is positioned at V3 at the current moment and the other vehicle VX one moment before was positioned at V4 at one moment before. In addition, an assumption has been made that the host vehicle V has moved a distance d in one moment. The phrase "one moment before" may be a time in the past set in advance (e.g., one control cycle) from the current moment, or this may be a time or any desired length of time in the past.

In this state, a current bird's-eye view image $PB_t$ is as shown in part (b) of FIG. 4. In this bird's-eye view image $PB_t$, the white lines painted on the road surface appear as rectangular shapes, indicating a relatively accurate plan view therefore, but the position of the other vehicle VX at position V3 is collapsed. Likewise, in a bird's-eye view image $PB_{t-1}$, from one moment before, the white lines painted on the road surface appear as rectangular shapes, indicating a relatively accurate plan view thereof, but the other vehicle VX at position V4 is collapsed. As already stated, the vertical edges of the three-dimensional object (including edges rising from the road surface in three-dimensional space as well as vertical edges in the strict sense) appear as a group of straight lines along the collapsing direction as a result of the process of viewpoint conversion to bird's-eye view image data, whereas flat images on the road surface do not contain vertical edges and, therefore, do not exhibit collapsing even after viewpoint conversion.

The alignment unit 32 aligns the above-described bird's-eye view images $PB_t$ and $PB_{t-1}$ in the data. During this process, the alignment unit 32 offsets the bird's-eye view image $PB_{t-1}$ from one moment before and aligns this with the position of the current the bird's-eye view image $PB_t$. The left-side image and the center image in part (b) of FIG. 4 illustrate the offset state by a travel distance d'. The offset amount d' is the movement amount in the bird's-eye view image data corresponding to the actual travel distance d of the host vehicle V shown in part (a) of FIG. 4 and is assessed based on a signal from the vehicle speed sensor 20 and the length of time from one moment before to the current time.

After alignment has been performed, the alignment unit 32 finds the difference between the bird's-eye view images $PB_t$ and $PB_{t-1}$ and generates data for a differential image $PD_t$. Here, the pixel values of the differential image $PD_t$ may be the absolute values of the differences between the pixel values of the bird's-eye view images $PB_t$ and $PB_{t-1}$, or they may be set to "1" if the absolute values exceed a predetermined threshold value p, and to "0" if not in order to accommodate variations in the environmental illumination. The image to the right in part (b) of FIG. 4 is a differential image $PD_t$. This threshold value p may be preset or varied according to a control command issued according to the results detected by the adhesion state determination unit 38 of the controller 39 mentioned hereafter.

Returning to FIG. 3, the three-dimensional object detection unit 33 detects a three-dimensional object based on the data for the differential image $PD_t$ shown in part (b) of FIG. 4. At this time, the three-dimensional object detection unit 33 of the present example also calculates the travel distance of the three-dimensional object in real space. To detect a three-dimensional object and calculate the travel distance thereof, the three-dimensional detection unit 33 first generates a first differential waveform. The travel distance per unit of time of the three-dimensional object is used to calculate the traveling speed of the three-dimensional object. The traveling speed of the three-dimensional object can then be used to determine whether or not the three-dimensional object is a vehicle.

To form the differential waveform, the three-dimensional object detection unit 33 of the present embodiment sets a detection area in the differential image $PD_t$. The three-dimensional object detection device 1 of the present example detects other vehicles requiring the attention of the driver of the host vehicle V, particularly other vehicles traveling in a lane adjacent to the lane in which the host vehicle V travels and with which there is a possibility of contact should the host vehicle V variation lanes, as detection targets. Thus, in the present example, in which three-dimensional objects are detected based on image information, two detection areas to the right and the left sides of the host vehicle V are set in the images obtained from the camera 10. Specifically, in the present embodiment, rectangular detection areas A1, A2 are set on the right and left sides to the rear of the host vehicle V, as shown in FIG. 2. Another vehicle detected in the detection areas A1, A2 is detected as an obstacle traveling in an adjacent lane next to the lane in which the host vehicle V is traveling. These detection areas A1, A2 may be set based on a relative position with respect to the host vehicle V or with reference to the positions of the white lines. When set, based on the position of the white lines, the three-dimensional object detection device 1 may use, e.g., known road line recognition technology.

The three-dimensional object detection unit 33 recognizes the borders of the set detection areas A1, A2 by the host vehicle V side (the borders following the direction of travel) as ground contact lines L1, L2 (FIG. 2). Generally, a ground contact line refers to a line at which a three-dimensional object contacts the ground, but in the present embodiment, the ground contact lines are not lines of contact with the ground but are, rather, set as described above. That said, experience has shown that this is not a problem in practice, as there is not an excessive difference between the ground contact lines according to the present embodiment and the ground contact lines that would normally be assessed based on the position of the other vehicle VX.

Figure 5:
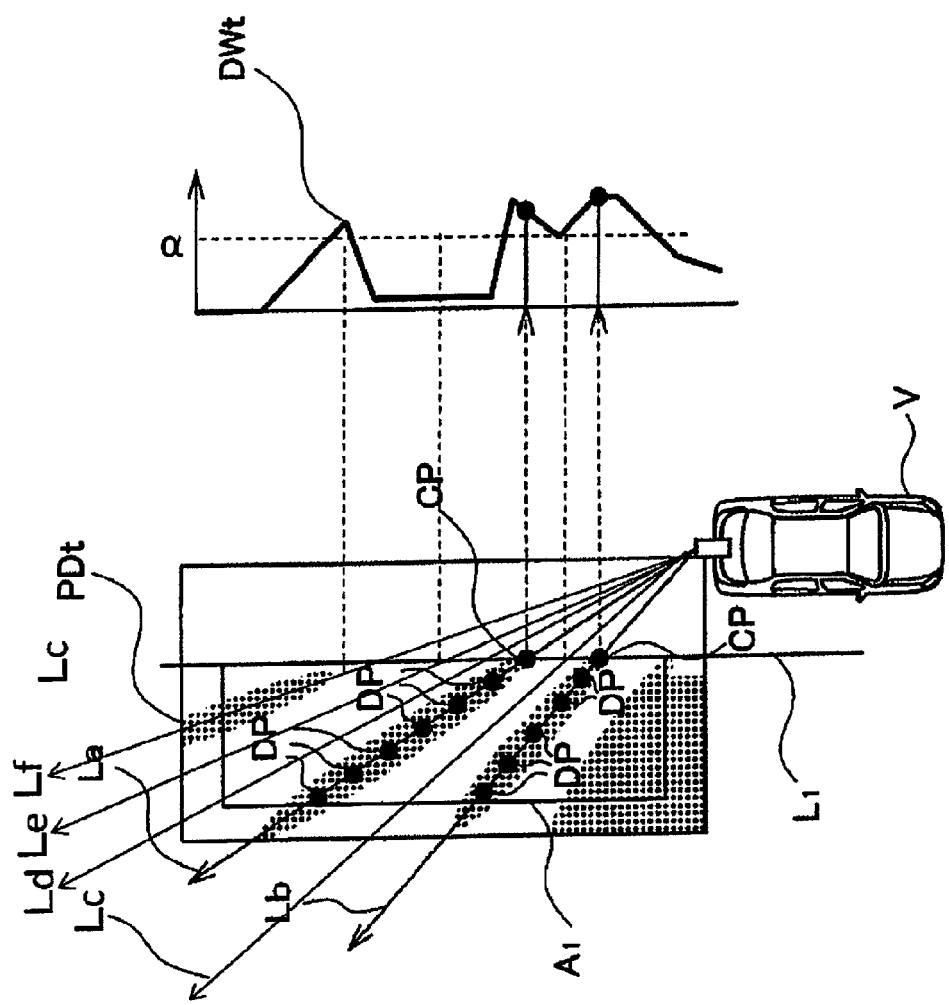
FIG. 5 is a schematic illustration of the manner in which a differential waveform is formed by a three-dimensional object detection unit in FIG. 3.

FIG. 5 is a schematic view illustration of the manner in which a differential waveform is formed by the three-dimensional object detection unit 33 shown in FIG. 3. As shown in FIG. 5, the three-dimensional object detection unit 33 generates a differential waveform $DW_t$ based on those parts of the differential image $PD_t$ (right image in part (b) of FIG. 4) calculated by the alignment unit 32 that correspond to the detection areas A1, A2. During this process, the three-dimensional object detection unit 33 forms the differential waveform $DW_t$ along the direction in which the three-dimensional object was collapsed as a result of viewpoint conversion. In the example shown in FIG. 5, only the detection area A1 is shown for convenience, but a differential waveform $DW_t$ is also formed for the detection area A2 according to a similar procedure.

Specifically, the three-dimensional object detection unit 33 defines a line La in the collapsing direction of the three-dimensional object in the data for the differential image $PD_t$. The three-dimensional object detection unit 33 then counts the number of difference pixels DP indicating a predetermined difference on the line La. The difference pixels DP indicating a predetermined difference are pixels exceeding a predetermined threshold value if the pixel values of the differential image $PD_t$ are the absolute values of the differences in the pixel values between the bird's-eye view images $PB_t$, $PB_{t-1}$, and are pixels indicating "1" if the pixel values of the differential image $PD_t$ are represented by "0" or "1."

After counting the number of difference pixels DP, the three-dimensional object detection unit 33 finds an intersection CP between the line La and the ground contact line L1. The three-dimensional object detection unit 33 then associates the intersection CP and the count number, assesses a horizontal axis position, i.e., a position on the axis running in the up-and-down direction to the right in FIG. 5, based on the position of the intersection CP, assesses a vertical axis position, i.e., a position on the axis running in the left-to-right direction to right in FIG. 5, based on the count number, and plots the positions as count numbers at the intersection CP.

Subsequently, the three-dimensional object detection unit 33 similarly defines the lines Lb, Lc, . . . in the collapsing direction of the three-dimensional object, counts the number of difference pixels DP, assesses the horizontal axis positions based on the positions of the intersections CP, assesses the vertical axis positions based on the count numbers (the number of difference pixels DP), and plots the positions. The three-dimensional object detection unit 33 sequentially repeats the process described above to create a frequency distribution, thereby generating a differential waveform $DW_t$ as shown to the right in FIG. 5.

As shown to the left in FIG. 5, the line La and line Lb running in the collapsing direction of the three-dimensional object differ in terms of the amount of overlap with the detection area A1. For this reason, if an assumption has been made that the detection area A1 is filled with the difference pixels DP, there will be more difference pixels DP on the line La than on the line Lb. Thus, if the vertical axis position is assessed based on the counted number of difference pixels DP, the three-dimensional object detection unit 33 performs normalization based on the amount of overlap between detection area A1 and the lines La, Lb running in the collapsing direction of the three-dimensional object. In a specific example, there are six difference pixels DP on the line La and five difference pixels DP on the line Lb to the left in FIG. 5. Therefore, to determine the vertical axis position based on the count number in FIG. 5, the three-dimensional object detection unit 33 performs normalization by, e.g., dividing the count number by the overlap distance. As a result, the values of the differential waveform $DW_t$ corresponding to the lines La, Lb in the collapsing direction of the three-dimensional object are substantially identical, as shown by the differential waveform $DW_t$.

After the differential waveform $DW_t$ has been generated, the three-dimensional object detection unit 33 calculates the travel distance by performing a comparison with the differential waveform $DW_{t-1}$ from one moment before. Specifically, the three-dimensional object detection unit 33 calculates the travel distance based on the variation over time between the differential waveforms $DW_t$, $DW_{t-1}$.

Figure 6:
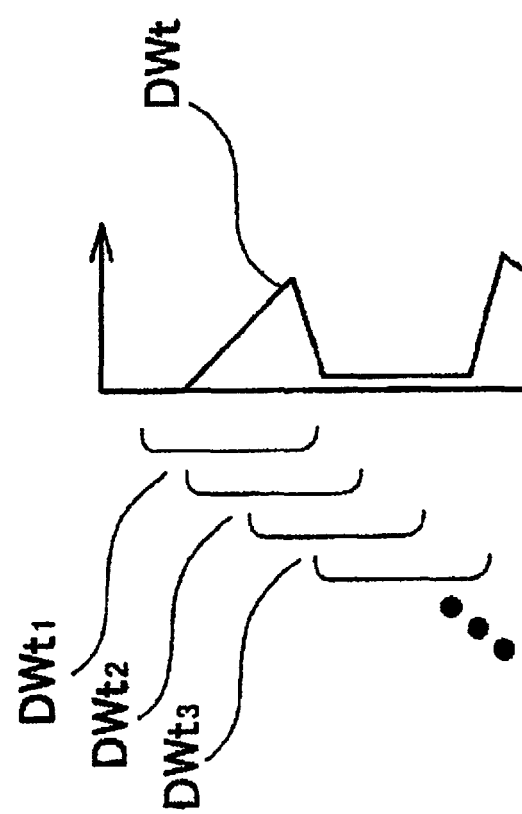
FIG. 6 is a view illustrating small areas divided by the three-dimensional object detection unit in FIG. 3.

Specifically, the three-dimensional object detection unit 33 divides the differential waveform $DW_t$ into a plurality of small areas $DW_{t1}$ to $DW_{tn}$ (n being any integer equal to 2 or greater), as shown in FIG. 6. FIG. 6 is an illustration of the small areas $DW_{t1}$ to $DW_{tn}$ divided up by the three-dimensional object detection unit 33. The small areas $DW_{t1}$ to $DW_{tn}$ are divided up so as to overlap each other, as shown in, e.g., FIG. 6. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 assesses the offset amount (the amount of movement in the horizontal axis direction of the differential waveform (in the up-and-down direction in FIG. 6)) for each of the small areas $DW_{t1}$ to $DW_{tn}$. The offset amounts are assessed based on the difference (i.e., distance in the horizontal axis direction) between the differential waveform $DW_{t-1}$ from one moment before and the differential waveform $DW_t$ at the current time. During this process, the three-dimensional object detection unit 33 moves the differential waveform $DW_{t-1}$ from one moment before in the horizontal axis direction for each of the small areas $DW_{t1}$ to $DW_{tn}$, assesses the position (i.e., the position in the horizontal axis direction) in which the error from the differential waveform $DW_t$ at the current time is at a minimum, and calculates the amount of movement in the horizontal axis direction between the original position of the differential waveform $DW_{t-1}$ and the position at which deviation is minimized as the offset amount. The three-dimensional object detection unit 33 then counts the offset amounts found for each of the small areas $DW_{t1}$ to $DW_{tn}$ and creates a histogram.

Figure 7:
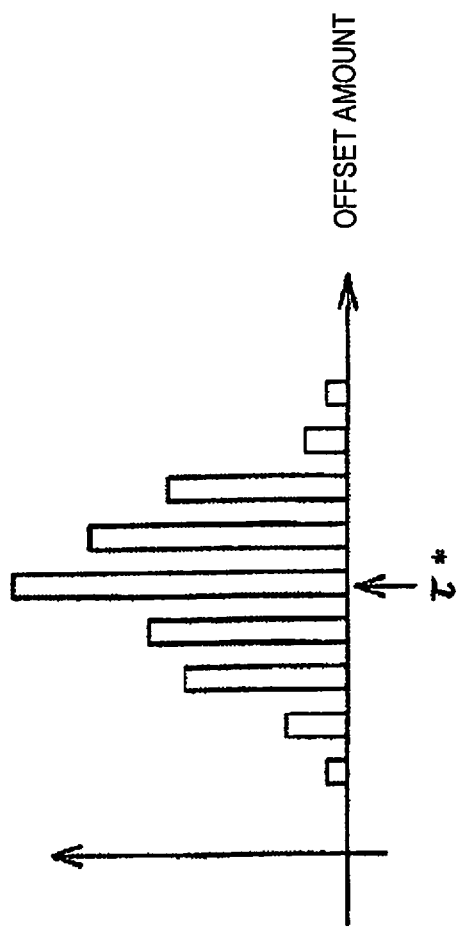
FIG. 7 is a view illustrating an example of a histogram obtained by the three-dimensional object detection unit in FIG. 3.

FIG. 7 is an illustration of an example of the histogram obtained by the three-dimensional object detection unit 33. As shown in FIG. 7, there is a certain degree of variability in the offset amount, constituting the amount of movement such that the deviation between the small areas $DW_{t1}$ to $DW_{tn}$ and the differential waveform $DW_{t-1}$ from one moment before is minimized. Thus, the three-dimensional object detection unit 33 creates a variability-containing offset amount histogram and calculates the travel distance based on the histogram. During this process, the three-dimensional object detection unit 33 calculates the travel distance of the three-dimensional object from the maximum value in the histogram. Specifically, in the example shown in FIG. 7, the three-dimensional object detection unit 33 calculates an offset amount indicating the maximum value of the histogram as the travel distance $\tau^*$. The travel distance $\tau^*$ is the relative travel distance of the other vehicle VX with respect to the host vehicle V. Thus, when calculating the absolute travel distance, the three-dimensional object detection unit 33 calculates the absolute travel distance based on the travel distance $\tau^*$ and the signal from the vehicle speed sensor 20.

Figure 8:
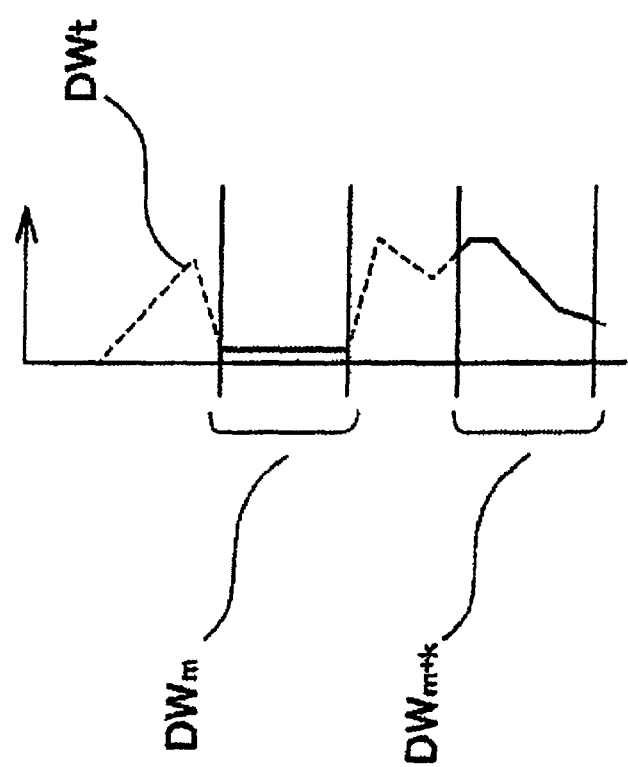
FIG. 8 is a view illustrating the weighting performed by the three-dimensional object detection unit in FIG. 3.

When creating a histogram, the three-dimensional object detection unit 33 may apply weighting to each of the plurality of small areas $DW_{t1}$ to $DW_{tn}$ and count the offset amounts found for each of the small areas $DW_{t1}$ to $DW_{tn}$ according to the weighting to create the histogram. FIG. 8 is an illustration of the weighting used by the three-dimensional object detection unit 33.

As illustrated in FIG. 8, the small area $DW_m$ (m being an integer at least equal to 1 and no greater than n−1) is flat. Specifically, there is only a small difference between the maximum and minimum pixel counts indicating a predetermined difference in the small area $DW_m$. The three-dimensional object detection unit 33 reduces the weighting of this type of small area $DW_m$. This is because such a flattened small area $DW_m$ lacks characteristic, leading to a high possibility of a calculation error.

The small area $DW_{m+k}$ (k being an integer no greater than n−m) has pronounced raised and lowered sections. Specifically, there is a large difference between the maximum and minimum pixel counts indicating a predetermined difference in the small area $DW_m$. The three-dimensional object detection unit 33 increases the weighting for this type of small area $DW_m$. This is because a markedly contoured small area $DW_{m+k}$ has characteristic features, leading to a high possibility of being able to accurately calculate the offset amount. Such weighting of the small areas allows for improved precision in calculating the travel distance.

In the embodiment described above, the differential waveform $DW_t$ is divided into a plurality of small areas $DW_{t1}$–$DW_{tn}$ in order to improve the precision of the travel distance calculation, but division into the small areas $DW_{t1}$ to $DW_{tn}$ may be omitted if there is no great need for precision in calculating the travel distance. In such cases, the three-dimensional object detection unit 33 calculates the travel distance from the offset amount for the differential waveform $DW_t$ that minimizes deviation between the differential waveform $DW_t$ and the differential waveform $DW_{t-1}$. In other words, the method used to determine the offset amount between the differential waveform $DW_{t-1}$ from one moment before and the differential waveform $DW_t$ at the current time is not limited to that described above.

Returning to FIG. 3, the computer 30 is provided with a smear detection unit 40. The smear detection unit 40 detects areas of smear occurrence using the data captured by the camera 10. Because smearing is a phenomenon of white streaks that occurs in CCD image sensors and the like, the smear detection unit 40 may be omitted if a camera 10 using a CMOS image sensor or the like, which is not subject to smearing, is used.

Figure 9:
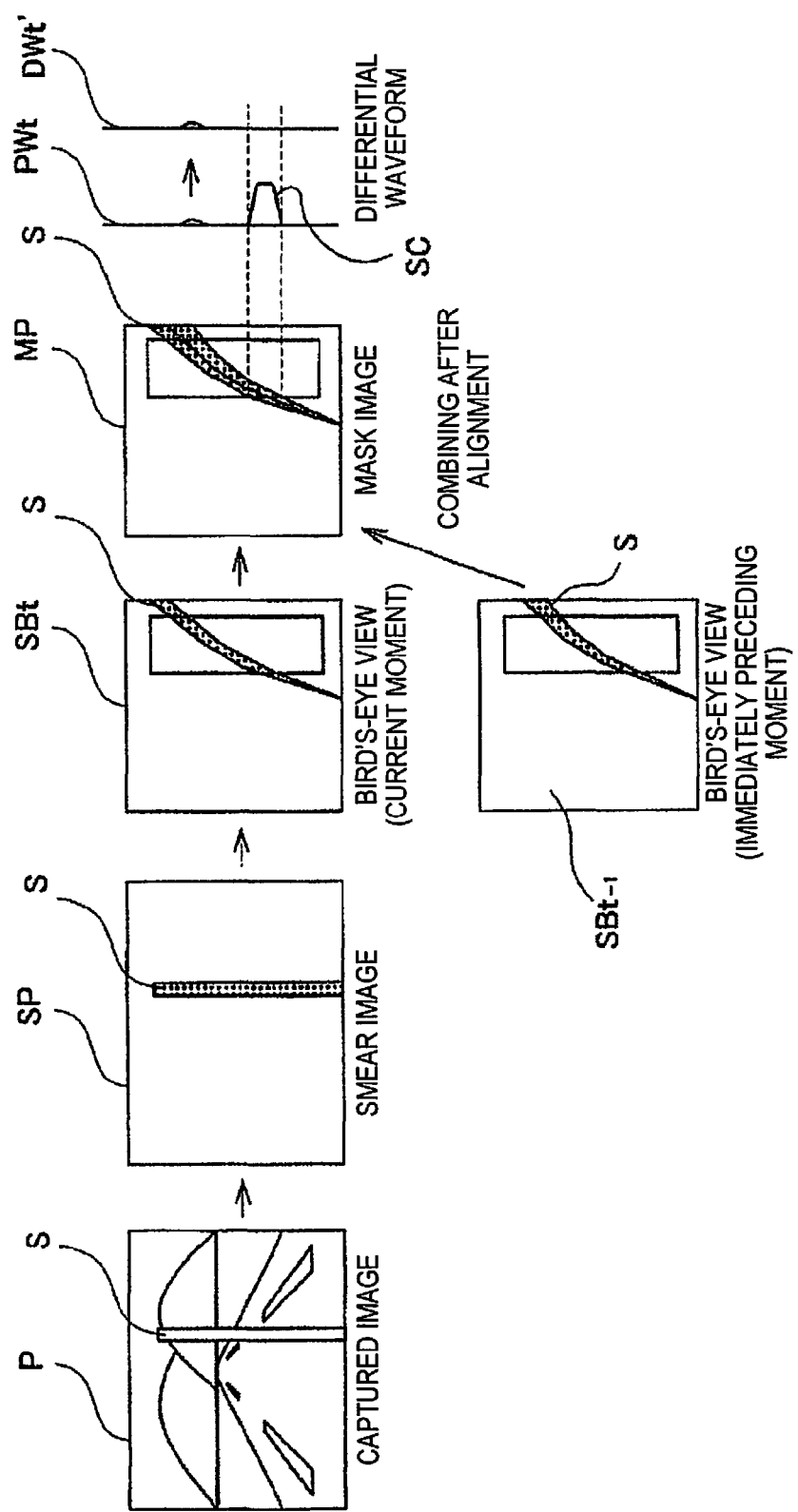
FIG. 9 is a view illustrating a process performed by a smear detection unit in FIG. 3 and for a process of calculating a differential waveform thereby.

FIG. 9 is an image illustrating a process performed by the smear detection unit 40 and a process of calculating a differential waveform $DW_t$ thereby. First, let us assume that data for a captured image P, in which a smear S is present, are input to the smear detection unit 40. The smear detection unit 40 detects the smear S in the captured image P. There are various methods for detecting smears S; if, for example, a typical CCD (Charge-Coupled Device) camera is used, a smear S appears only in a part of the image lower than the light source. For this reason, an area having a luminance value of a predetermined value or greater and continuing upwards in the vertical direction from the lower part of the image toward the upper part of image is detected and identified as an area of smear S occurrence in the present embodiment.

The smear detection unit 40 also generates smear image SP data, in which the pixel values are set to "1" at locations where the smear S occurs and to "0" elsewhere. After generating the data for the smear image SP, the smear detection unit 40 transmits the data to the viewpoint conversion unit 31. After the smear image SP has been imputed, the viewpoint conversion unit 31 input converts these data to a bird's-eye view. The viewpoint conversion unit 31 thus generates a smear bird's-eye view image $SB_t$ data. After forming the data for the smear bird's-eye view image $SB_t$, the viewpoint conversion unit 31 sends the data to the alignment unit 33. The viewpoint conversion unit 31 also sends data for a smear bird's-eye view image $SB_{t-1}$ from one moment before to the alignment unit 33.

The alignment unit 32 aligns the smear bird's-eye view images $SB_t$ and $SB_{t-1}$ in terms of data. The specifics of the alignment are performed in a manner similar to the alignment of the bird's-eye view images $PB_t$ and $PB_{t-1}$, in the data. After alignment, the alignment unit 32 finds the logical sum of the areas in which the smear S occurs in the smear bird's-eye view images $SB_t$ and $SB_{t-1}$. The variation alignment unit 32 then uses this to generate data for the mask image MP. After generating the data for the mask image MP, the alignment unit 32 transmits the data to the three-dimensional object detection unit 33.

The three-dimensional object detection unit 33 sets the count for the frequency distribution to zero at locations corresponding to areas of smear S occurrence in the mask image MP. Specifically, if a differential waveform $DW_t$ such as that shown in FIG. 9 has been generated, the three-dimensional object detection unit 33 sets the count SC for the smear S to zero and generates a corrected differential waveform $DW_t'$.

In the present embodiment, the three-dimensional object detection unit 33 assesses the traveling speed of the host vehicle V (camera 10) and assesses an offset amount for a stationary object based on the assessed traveling speed. After assessing an offset amount for the stationary object, the three-dimensional object detection unit 33 disregards the offset amount corresponding to the stationary object out of the maximum values of the histogram and calculates the travel distance of the three-dimensional object.

Figure 10:
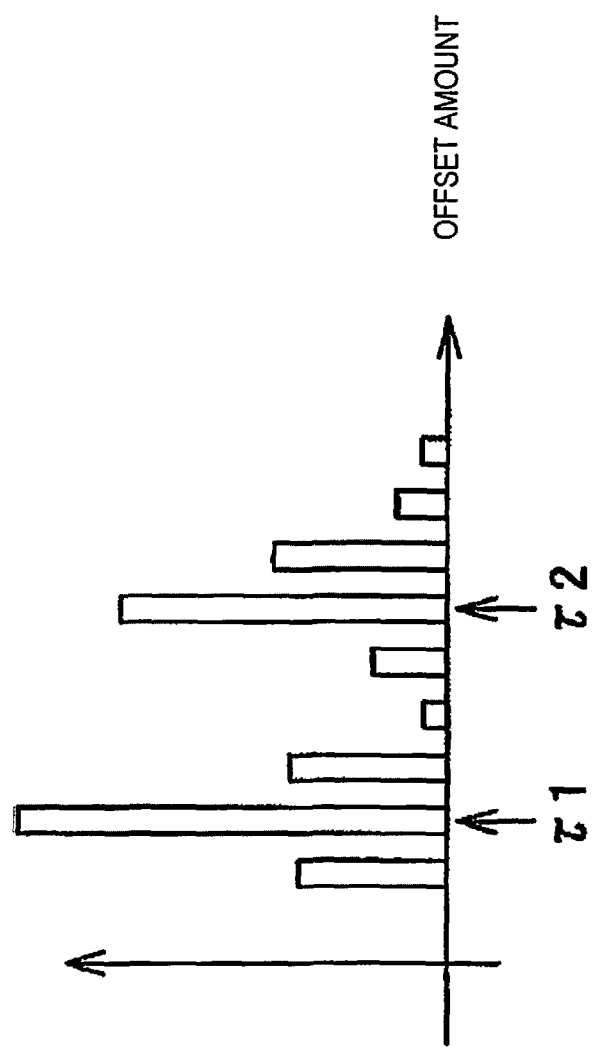
FIG. 10 is a view illustrating another example of a histogram obtained by the three-dimensional object detection unit in FIG. 3.

FIG. 10 is an illustration of another example of a histogram obtained by the three-dimensional object detection unit 33. If another stationary object apart from the other vehicle VX is present within the view angle of the camera 10, two maximum values τ1, τ2 appear in the obtained histogram. In this case, one of the two maximum values τ1, τ2 is the offset amount for the stationary object. The three-dimensional object detection unit 33 therefore assesses the offset amount for the stationary object based on the traveling speed, ignores the maximum value corresponding to the offset amount, and calculates the travel distance of the three-dimensional object using the remaining maximum value.

Even if the offset amounts corresponding to the stationary object are ignored, if there are multiple maximum values, there may be multiple other vehicles VX in the view angle of the camera 10. However, multiple other vehicles VX present within the detection areas A1, A2 occurs very rarely. The three-dimensional object detection unit 33 therefore cancels the travel distance calculation.

Figure 11:
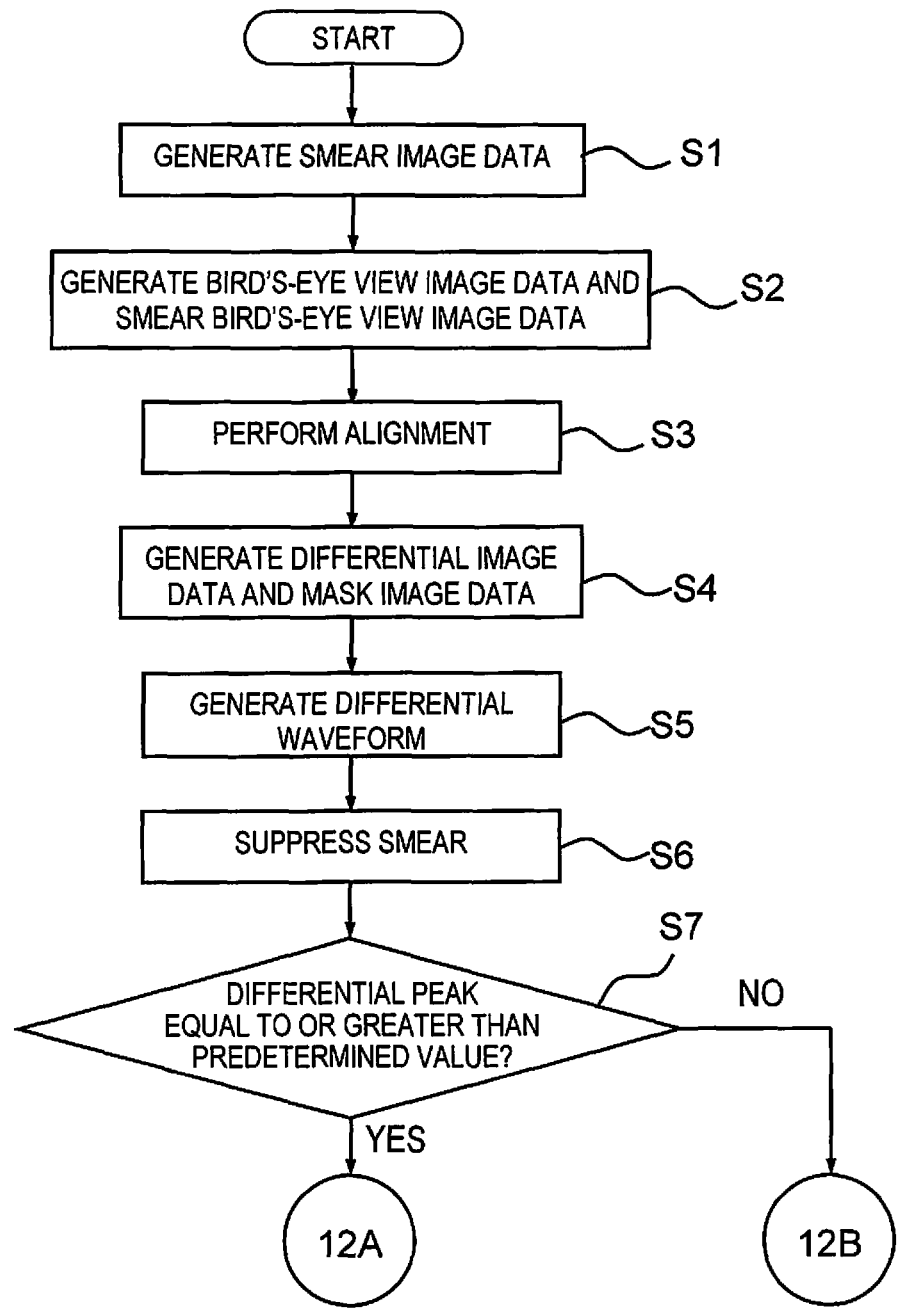
FIG. 11 is a first part of a flowchart illustrating a three-dimensional object detection method using the differential waveform information as executed by the viewpoint conversion unit, the alignment unit, the smear detection unit, and the three-dimensional object detection unit in FIG. 3.
Figure 12:
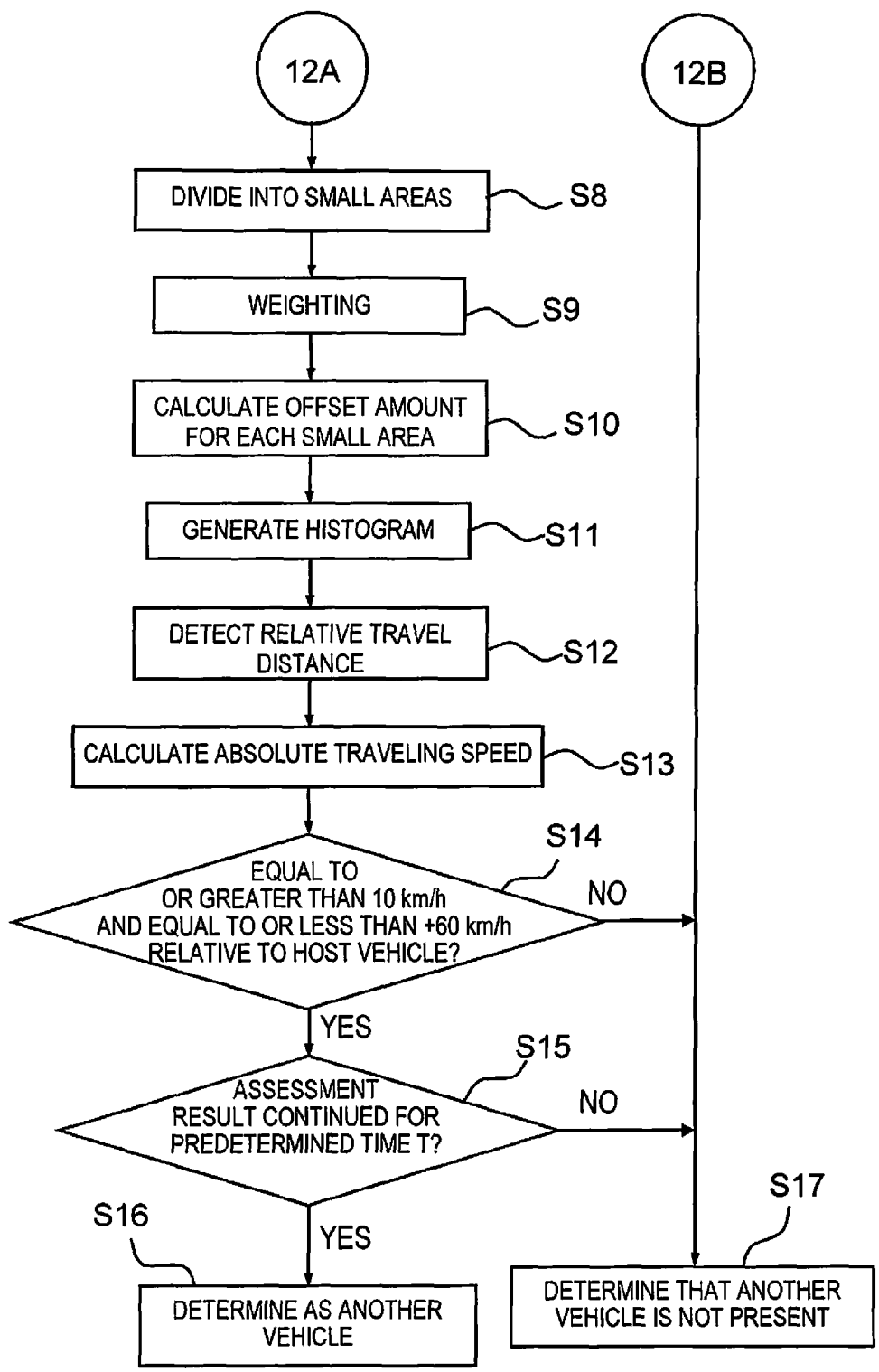
FIG. 12 is a second part of a flowchart illustrating a three-dimensional object detection method using the differential waveform information as executed by the viewpoint conversion unit, the alignment unit, the smear detection unit, and the three-dimensional object detection unit in FIG. 3.

Next, a three-dimensional object detection procedure based on differential waveform information will be described. FIGS. 11 and 12 depict a flowchart of a three-dimensional object detection procedure according to the present embodiment. As shown in FIG. 11, the data for the captured image P captured by the camera 10 are input into the computer 30, and the smear detection unit 40 generates a smear image SP (S1). Next, the viewpoint conversion unit 31 generates data for a bird's-eye view image $PB_t$ from the data of the captured image P captured by the camera 10, and data for a smear bird's-eye view image $SB_t$ is generated from the data for the smear image SP (S2).

The alignment unit 33 then aligns the data from bird's-eye view image $PB_t$ and the data for a bird's-eye view image $PB_{t-1}$ from one moment before and aligns the data for the smear bird's-eye view image $SB_t$ and the data for the smear bird's-eye view image $SB_{t-1}$ from one moment before (S3). After this alignment has been performed, the alignment unit 33 generates data for the differential image $PD_t$ and data for the mask image MP (S4). The three-dimensional object detection unit 33 then generates a differential waveform $DW_t$ from the data for the differential image $PD_1$ and the data for a differential image $PD_{t-1}$ from one moment before (S5). After generating the differential waveform $DW_t$, the three-dimensional object detection unit 33 sets the count for the parts of the differential waveform $DW_t$ corresponding to the areas of the smear S occurrence to zero, minimizing the effects of the smear S (S6).

The three-dimensional object detection unit 33 then assesses whether the peak of the differential waveform $DW_t$ is equal to or greater than a first threshold value α (S7). The first threshold value α is preset and variation can be altered by a control command from the controller 39 shown in FIG. 3, the details of which will be described hereafter. If the peak of the differential waveform $DW_t$ is not equal to or greater than the first threshold value α, i.e., if there is almost no difference, there is considered to be no three-dimensional object present in the captured image P. Therefore, if an assessment has been made that the peak of the differential waveform $DW_t$ is not equal to or greater than the first threshold value α (S7: NO), the three-dimensional object detection unit 33 assesses that there is no three-dimensional object or other vehicle constituting an obstacle present (FIG. 12: S16). The process shown in FIGS. 11 and 12 then ends.

Meanwhile, if the peak of the differential waveform $DW_t$ is equal to or greater than the first threshold value α (S7: YES), the three-dimensional object detection unit 33 assesses that a three-dimensional object is present and divides the differential waveform $DW_t$ into a plurality of small areas $DW_{t1}$ to $DW_{tn}$ (S8). Next, the three-dimensional object detection unit 33 assigns a weighting to each of the small areas $DW_{t1}$ to $DW_{tn}$ (S9). The three-dimensional object detection unit 33 then calculates an offset amount for each of the small areas $DW_{t1}$ to $DW_{tn}$ (S10) and generates a weighted histogram (S11).

The three-dimensional object detection unit 33 then calculates the relative travel distance, constituting the travel distance of the three-dimensional object with respect to the host vehicle V, based on the histogram (S12). Next, the three-dimensional object detection unit 33 calculates the absolute traveling speed of the three-dimensional object based on the relative travel distance (S13). At this time, the three-dimensional object detection unit 33 calculates the relative traveling speed by time-differentiating the relative travel distance and adds the host vehicle speed calculated by the vehicle speed sensor 20 to calculate the absolute traveling speed.

The three-dimensional object detection unit 33 then assesses whether the absolute traveling speed of the three-dimensional object is 10 km/h or greater and whether the relative traveling speed of the three-dimensional object with respect to the host vehicle V is +60 km/h or less (S14). If both conditions are satisfied (S14: YES), the three-dimensional object detection unit 33 assesses that the three-dimensional object is another vehicle VX (S15). The process shown in FIGS. 11 and 12 then ends. On the other hand, when either one of the conditions has not been satisfied (S14: NO), the three-dimensional object detection unit 33 assesses that no other vehicle is present (S16). The process shown in FIGS. 11 and 12 then ends.

In the present embodiment, the detection areas A1, A2 are to the rea of the host vehicle V, and emphasis is placed on detecting other vehicles VX traveling in lanes adjacent to the lane in which the host vehicle is traveling that call for attention while the host vehicle V is traveling and, in particular, on whether there is a possibility of contact therewith when the host vehicle V changes lanes. This is in order to determine whether there is a possibility of contact with another vehicle VX traveling in an adjacent lane next to the lane in which the host vehicle V is traveling when the host vehicle changes lanes. The process of step S14 is executed for this reason. Specifically, assuming that the system of the present embodiment is being operated on a highway, if the speed of a three-dimensional object is less than 10 km/h, there would rarely be a problem even if another vehicle VX were to be present because the other vehicle would be positioned far behind the host vehicle V when a lane change is made. Similarly, if the relative traveling speed of a three-dimensional object with respect to the host vehicle V exceeds +60 km/h (i.e., if the three-dimensional object is moving at a speed greater than 60 km/h than the speed of the host vehicle V), there is rarely a problem because the three-dimensional object would be positioned ahead of the host vehicle V when a lane change is made. Therefore, step S14 can also be considered to be an assessment of whether the other vehicle VX will present a problem when changing lanes.

The assessment in step S14 of whether the absolute traveling speed of the three-dimensional object is 10 km/h or higher and whether the relative traveling speed of the three-dimensional object with respect to the host vehicle V is +60 km/h or less yields the following effect. For example, a possible case is that an error in attaching the camera 10 could cause a stationary object to be detected as having an absolute traveling speed of several kilometers per hour. Thus, assessing whether the speed is 10 km/h or greater allows for a reduction in the possibility that the stationary object will be considered to be another vehicle VX. There is also the possibility that the relative speed of a three-dimensional object with respect to the host vehicle V being detected as exceeding +60 km/h due to noise. Thus, assessing whether the relative speed is +60 km/h or less allows for the possibility of noise-induced misdetection to be reduced.

In step S14, the relative traveling speed threshold values used to identify other vehicles VX can be set as desired. For example, the relative traveling speed threshold values can be set to −20 km/h or greater and 100 km/h or less. The negative minimum value is the minimum value for the traveling speed when a detected object moves to the rear of the host vehicle VX, i.e., when the detected object is being left behind. These threshold values can be preset as desired or can be altered according to a control command from the controller 39 described hereafter.

Additionally, there is the possibility of confirming that the absolute traveling speed is not negative or is not 0 km/h instead of performing the process of step S14. Because the present embodiment focuses on whether there is a possibility of contact when the host vehicle V changes lanes, a warning sound may be issued to the driver of the host vehicle or for a predetermined display device to display the equivalent of a warning if another vehicle VX is detected in step S15.

In step S15, an assessment is made regarding whether the three-dimensional object detected by the three-dimensional object detection unit 33 is continuously detected for a predetermined length of time T or longer. If the three-dimensional object is continuously detected for the predetermined length of time T or longer, the process continues to step S16, and the three-dimensional object is identified as being another vehicle present in the right-side detection area A1 or the left-side detection area A2. Otherwise, the process continues to step S17, and an assessment is made that no other vehicle is present.

Using the process of detecting three-dimensional objects based on differential waveform information as in the present example, a differential waveform $DW_t$ is generated by counting the number of pixels exhibiting a predetermined difference along the direction in which the three-dimensional object has collapsed as a result of viewpoint conversion in the data for the differential image $PD_t$ and creating a frequency distribution thereof. In this context, the pixels exhibiting a predetermined difference in the data for the differential image $PD_t$ are pixels exhibiting differences in images captured at different points in time and, in other words, can be considered to indicate locations at which a three-dimensional object was present. For this reason, the number of pixels in the collapsing direction of the three-dimensional object at the location where this object was present are counted and a frequency distribution thereof is created, thereby generating a differential waveform $DW_t$. In particular, because the number of pixels in the collapsing direction of the three-dimensional object is counted, height-directional information for the three-dimensional object is used to generate the differential waveform $DW_t$. The travel distance of the three-dimensional object is then calculated based on the change over time in the differential waveform $DW_t$ that contains height-directional information. Because height-directional information for a detected location before and after a change over time is included in the identification process, instead of the focus being on the movement at only one point, the location change tends to be the same location change on the three-dimensional object, and the travel distance is calculated based on the change over time in the same location, allowing for increased precision in the travel distance calculation.

In addition, the count of the frequency distribution is set to zero at locations corresponding to the areas of smear S occurrence in the differential waveform $DW_t$. As a result, waveform locations in the differential waveform $DW_t$ generated by the smear S are removed, suppressing the smear S from being mistakenly recognized as a three-dimensional object.

In addition, the travel distance of the three-dimensional object is calculated based on the offset amount for the differential waveform $DW_t$ at which the error differential waveform $DW_t$ is minimized. Thus, the travel distance is calculated based on an offset amount for one-dimensional information in the form of a waveform, allowing computing costs per calculation of the travel distance to be minimized.

In addition, the differential waveforms $DW_t$ formed at different times are divided into a plurality of small areas $DW_{t1}$ to $DW_{tn}$. Dividing into a plurality of small areas $DW_{t1}$ to $DW_{tn}$ in this way yields a plurality of waveforms representing various locations on the three-dimensional object. An offset amount such that waveform error is minimized is assessed for each of the small areas $DW_{t1}$ to $DW_{tn}$, and the offset amounts assessed for each of the small areas $DW_{t1}$ to $DW_{tn}$ are counted, and a histogram thereof is created to calculate the travel distance of the three-dimensional object. Thus, the offset amounts are assessed for various locations on the three-dimensional object, and the travel distance is calculated based on the plurality of offset amounts, thus allowing for increased precision in calculating the travel distance.

In addition, weighting is applied to the plurality of small areas $DW_{t1}$ to $DW_{tn}$, and the offset amounts found for each of the small areas $DW_{t1}$ to $DW_{tn}$ are counted according to the weighting to create a histogram. The weighting is thus increased for areas exhibiting noticeable characteristic and is reduced for areas not exhibiting noticeable characteristics, thereby allowing for a better travel distance calculation. As a result, the travel distance calculation precision can be even further increased.

The greater the difference is between the minimum and maximum values for the number of pixels exhibiting a predetermined difference in the small areas $DW_{t1}$ to $DW_{tn}$ of the differential waveform $DW_t$, the greater the weighting is. Thus, the weighting increases the more the area exhibits with characteristic contours and the larger the difference between the maximum and minimum values is and decreases the flatter the area is. Geometrically speaking, because accurately calculating the offset amount for the markedly contoured areas than for flattened areas is easier, increasing the weighting in accordance with an increase in the difference between the maximum and minimum values allows for even further improvements in the travel distance calculation precision.

In addition, the travel distance of the three-dimensional object is calculated based on the maximum value of the histogram obtained by counting the offset amounts assessed for each of the small areas $DW_{t1}$ to $DW_{tn}$. Thus, a more accurate travel distance can be calculated from the maximum value, even if there are variations in the offset amounts.

The offset amounts are also assessed for stationary objects, and these offset amounts are disregarded, preventing stationary-object-induced reductions in the precision in calculating the travel distance of the three-dimensional object. If, when disregarding the offset amounts corresponding to the stationary objects, there are multiple maximum values, the calculation of the travel distance of the three-dimensional object is canceled. This allows for the preventing of miscalculations in the travel distance, such as when there are multiple maximum values.

In the embodiments described above, the speed of the host vehicle V is assessed based on a signal from the vehicle speed sensor 20, but no limitation is imposed thereby; for example, there is also the possibility of using a configuration in which the speed can be estimated using a plurality of images captured at different points in time. A vehicle speed sensor is unnecessary in such an arrangement, allowing for a simpler configuration.

Furthermore, in the embodiments described above, a current image and an image from one moment before are converted to bird's-eye views, a differential image $PD_t$ is generated after the converted bird's-eye views have been aligned, and the generated differential image $PD_t$ is evaluated along the collapsing direction (i.e., the direction in which the three-dimensional object collapses when the image is converted to a bird's-eye view) to generate a differential waveform $DW_t$, but no limitation is imposed thereby. For example, there is also the possibility of using a configuration in which only the image from one moment before is converted to a bird's-eye view, the converted bird's-eye view is aligned and subsequently converted to one equivalent of the originally captured image, a differential image is generated using this image and the image at the current moment, and the generated differential image is evaluated along the direction corresponding to the collapsing direction (i.e., the direction obtained by converting the collapsing direction to a direction in the captured image) to thereby generate the differential waveform $DW_t$. In other words, as long as the current image and the image from one moment before are aligned, a differential image $PD_t$ is formed based on the difference between the two aligned images, and the differential image $PD_t$ can be evaluated in the collapsing direction of the three-dimensional object after being converted to a bird's-eye view image, forming a clear bird's-eye view image is not necessary.

Three-Dimensional Object Detection Based on Edge Information

Figure 13:
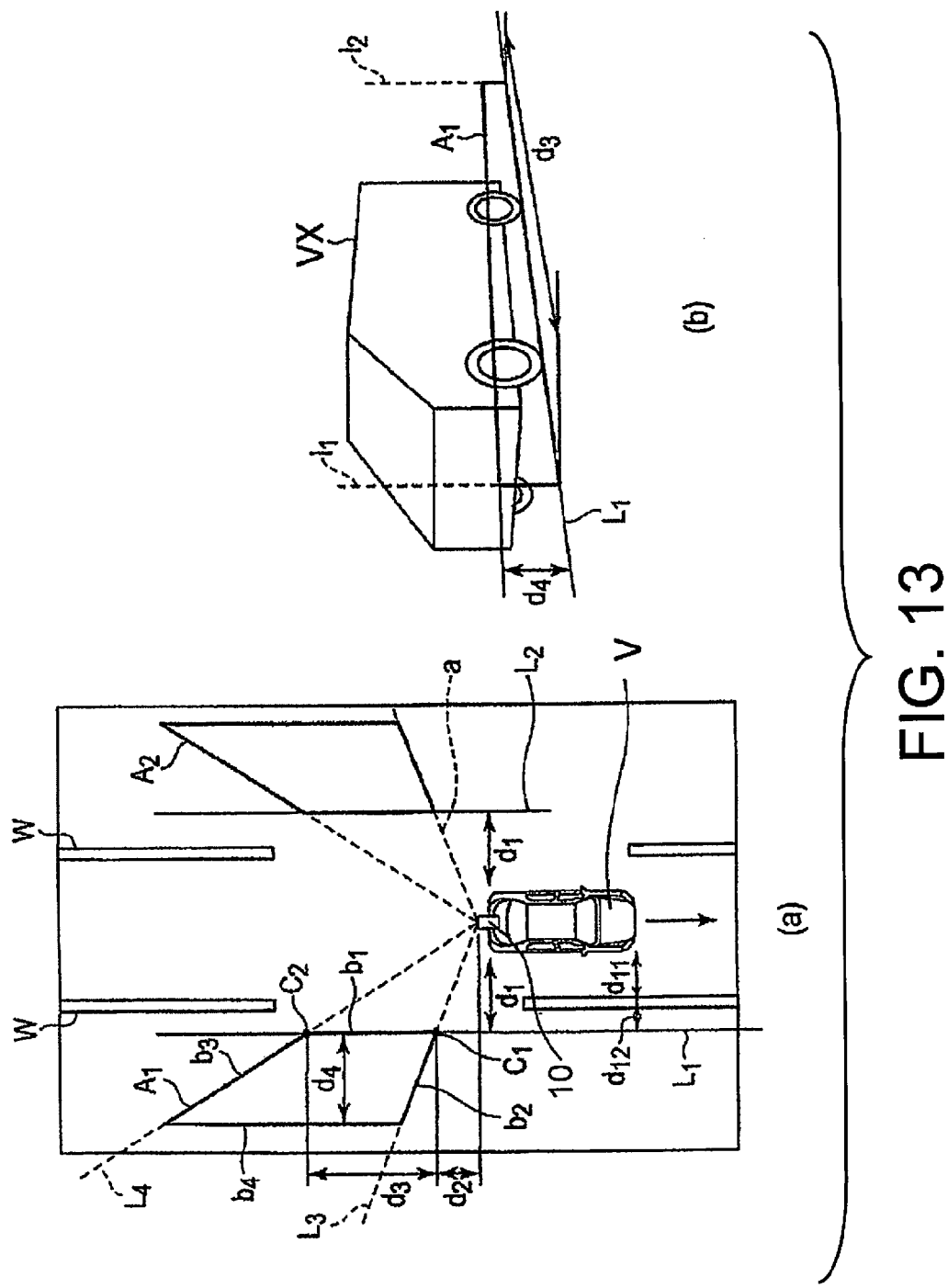
FIG. 13 is a view illustrating the traveling state of the vehicle in FIG. 1 (three-dimensional object detection based on the edge information), with part part (a) of FIG. 13 illustrating the positional relationship between the detection areas in a plan view, and part part (b) of FIG. 13 illustrating the positional relationship between the detection areas in real space in a perspective view.

Next, a three-dimensional object detection block B that can be operated instead of block A shown in FIG. 3 will be described. The detection block B detects a three-dimensional object using edge information compiled by the luminance difference calculation unit 35, an edge line detection unit 36, and a three-dimensional object detection unit 37. FIG. 13 is an illustration of the imaging range of the camera 10 in FIG. 3, with part (a) of FIG. 13 being a plan view, and part (b) of FIG. 13 being a perspective view of real space to the rear of the host vehicle V. As shown in part (a) of FIG. 13, the camera has a predetermined view angle α and photographs the area to the rear of the host vehicle V encompassed within the predetermined view angle α. The view angle α of the camera 10 is set so that the imaging range of the camera 10 includes the adjacent lanes, as well as the lane in which the host vehicle V is traveling, as in the case shown in FIG. 2.

In the present example, the detection areas A1, A2 have trapezoidal shapes as seen in a plan view (i.e., the bird's-eye view), and the positions, sizes, and shapes of the detection areas A1, A2 are assessed based on distances $d_1$ to $d_4$. In the example illustrated in the drawing, the detection areas A1, A2 are not limited to having trapezoidal shapes and may also have rectangular or other shapes as seen in a bird's-eye view, as shown in FIG. 2.

The distance d1 is the distance from the host vehicle V to the ground contact lines L1, L2. The ground contact lines L1, L2 are the lines at which a three-dimensional object present in a lane adjacent to the lane in which the host vehicle V is traveling contacts the ground. The object of the present embodiment is to detect other vehicles VX or the like (including two-wheeled vehicles or the like) traveling in adjacent lanes to the left and right of the lane of the host vehicle V to the rear of the host vehicle V. Thus, the distance d1 constituting the positions of the ground contact lines L1, L2 of the other vehicles VX can be substantially fixed based on the distance d11 from the host vehicle V to a white line W and the distance d12 from the white line W to a position in which another vehicle VX is predicted to be traveling.

The distance d1 need not be fixed and may be variable. In such a case, the computer 30 recognizes the position of a white line W with respect to the host vehicle V using road line recognition or another technique, and the distance d11 is assessed based on the position of the recognized white line W. The distance d1 is thus variably set using the decided distance d11. In the present embodiment described hereafter, the position at which the other vehicle VX travels (i.e., the distance d12 from the white line W) and the position in which the host vehicle V travels (i.e., the distance d11 from the white line W) are largely fixed; thus, the distance d1 is considered fixed.

The distance d2 is the distance extending from the rear end of the host vehicle V with respect to the vehicle travel direction. The distance d2 is set so that the detection areas A1, A2 fall within at least the view angle α of the camera 10. In the present embodiment in particular, the distance d2 is set so as to contact the range delineated by the view angle α. The distance d3 indicates the length of the detection areas A1, A2 with respect to the vehicle travel direction. The distance d3 is set based on the size of the three-dimensional object to be detected. In the present embodiment, the object to be detected is another vehicle VX or the like; therefore, the distance d3 is set to a length including the other vehicle VX.

The distance d4 indicates the height set so as to include the tires of another vehicle VX or the like in real space, as shown in part (b) of FIG. 13. The distance d4 in a bird's-eye view image is the length shown in part (a) of FIG. 13. The distance d4 can also be a length not including lanes adjacent to the left and right adjacent lanes (i.e., lanes two lanes away) in the bird's-eye view image. This is because, when the lanes two lanes away from the lane of the host vehicle V are included, there is no possibility of distinguishing whether another vehicle VX is present in the adjacent lanes to the left and right of the lane in which the host vehicle V is traveling or whether another vehicle VX is present in a lane two lanes away.

The distances d1 to d4 are assessed as described above, and the positions, sizes, and shapes of the detection areas A1, A2 are thereby decided. Specifically, the distance d1 is used to determine the position of the upper edges b1 of the trapezoidal detection areas A1, A2. The distance d2 is used to determine the starting point positions C1 of the upper edges b1. The distance d3 is used to determine the end point positions C2 of the upper edges b1. A straight line L3 extending from the camera 10 toward the starting point positions C1 is used to determine the side edges b2 of the trapezoidal detection areas A1, A2. Similarly, a straight line L4 extended from the camera 10 toward the end point positions C2 is used to determine the side edges b3 of the trapezoidal detection areas A1, A2. The distance d4 is used to determine the lower edges b4 of the trapezoidal detection areas A1, A2. The areas surrounded by the edges b1 to b4 in this way are the detection areas A1, A2. As shown in part (b) of FIG. 13, the detection areas A1, A2 are regular squares (rectangles) in real space to the rear of the host vehicle V.

Returning to FIG. 3, captured image data for a predetermined area photographed by the camera 10 is input into the viewpoint conversion unit 31. The viewpoint conversion unit 31 performs the viewpoint conversion on the input captured image data that converts the data to into bird's-eye view image data, showing a bird's-eye view. Here, bird's-eye view refers to a view from the viewpoint of, for example, an imaginary camera that is looking straight down (or somewhat diagonally downward) from above. The viewpoint conversion can be effected using, for example, the technique disclosed in Japanese Laid-Open Patent Application No. 2008-219063.

In order to detect the edges of a three-dimensional object included in the bird's-eye view image, the luminance difference calculation unit 35 calculates the luminance difference for the bird's-eye view image data obtained via viewpoint conversion performed by the viewpoint conversion unit 31. The luminance difference calculation unit 35 calculates the luminance difference between two pixels near each position along a vertical imaginary line extending in the vertical direction in real space. The luminance difference calculation unit 35 can calculate the luminance difference either by a method for setting a single vertical imaginary line extending in the vertical direction in real space or by a method for setting two vertical imaginary lines.

A specific method of setting two vertical imaginary lines will now be described. The luminance difference calculation unit 35 sets a first vertical imaginary line corresponding to a line segment extending in the vertical direction in real space and a second vertical imaginary line corresponding to a line segment different from the first vertical imaginary line and extending vertically in real space. The luminance difference calculation unit 35 assesses the luminance difference between points on the first vertical imaginary line and points on the second vertical imaginary line continuously along the first vertical imaginary line and the second vertical imaginary line. The operation of the luminance difference calculation unit 35 will be described in detail hereafter.

Figure 14:
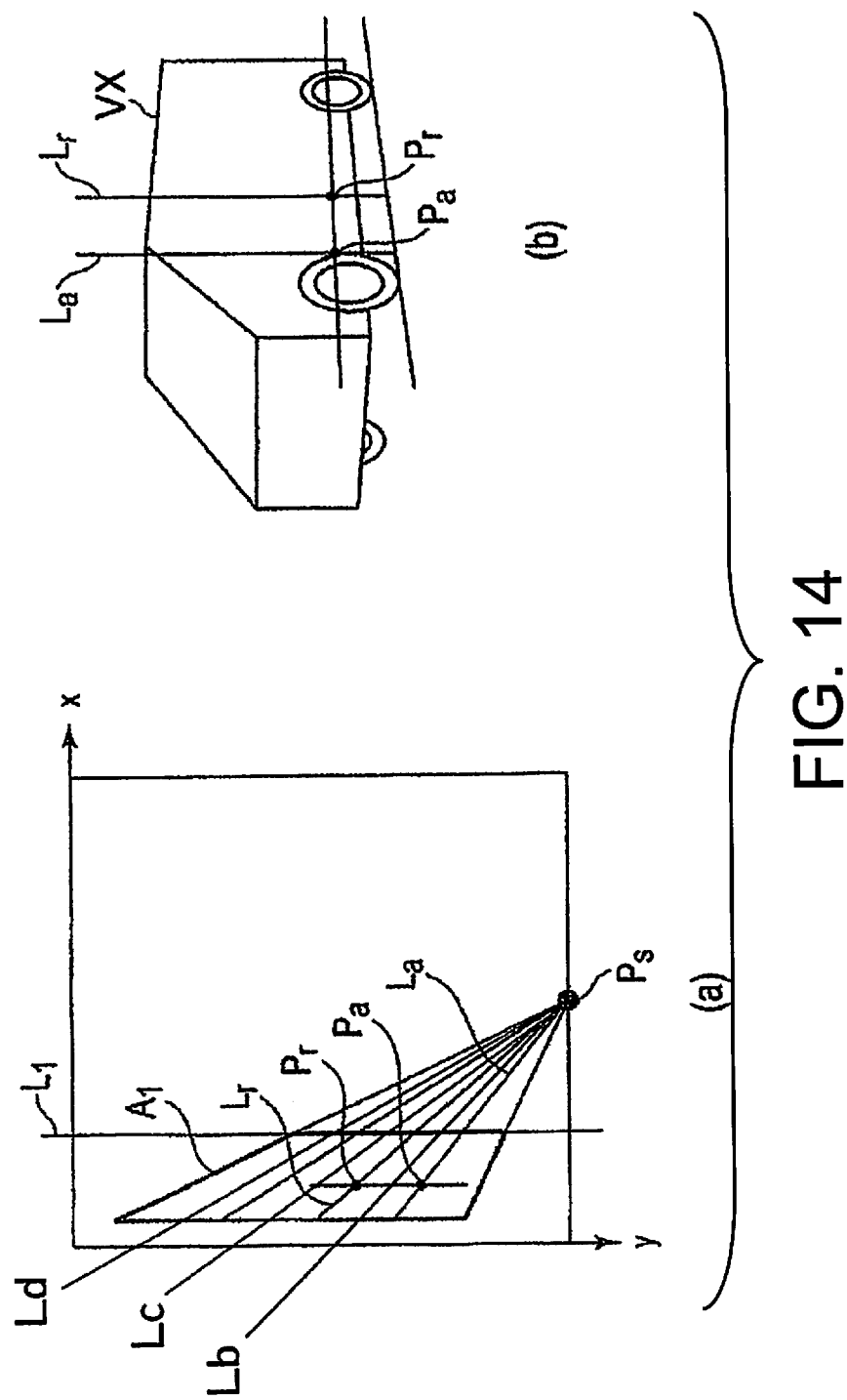
FIG. 14 is a view illustrating operation of a luminance difference calculation unit in FIG. 3, with part part (a) of FIG. 14 illustrating the positional relationship between the attention line, the reference line, the attention point, and the reference point in the bird's-eye view image, and part part (b) of FIG. 14 illustrating the positional relationship between the attention line, the reference line, the attention point, and the reference point in real space.

As illustrated in part (a) of FIG. 14, the luminance difference calculation unit 35 sets a first vertical imaginary line La (hereafter referred to as the attention line La) that corresponds to a line segment extending in the vertical direction in real space and that passes through the detection area A1. The luminance difference calculation unit 35 sets a second vertical imaginary line Lr (hereafter referred to as the reference line Lr), different from the attention line La, that corresponds to the line segment extending in the vertical direction in real space and that passes through the detection area A1. Here, the reference line Lr is set at a position separated from the attention line La by a predetermined distance in real space. The lines that correspond to the line segments extending in the vertical direction in real space are lines fanning outward in the radial direction from the position Ps of the camera 10 in a bird's-eye view image. These outward fanning lines in the radial direction are lines that follow the collapsing direction of the three-dimensional object when converted to a bird's-eye view.

The luminance difference calculation unit 35 sets an attention point Pa (a point on the first vertical imaginary line) on the attention line La. The luminance difference calculation unit 35 sets a reference point Pr (a point on the second vertical imaginary line) on the reference line Lr. The attention line La, the attention point Pa, the reference line Lr, and the reference point Pr have the relationship shown in part (b) of FIG. 14 in real space. As is apparent from part (b) of FIG. 14, the attention line La and the reference line Lr are lines extending in the vertical direction in real space, and the attention point Pa and the reference point Pr are points set at substantially the same height in real space. The attention point Pa and the reference point Pr need not be strictly the same height; a certain amount of deviation is permissible to the extent that the attention point Pa and the reference point Pr can be considered to be at the same height.

The luminance difference calculation unit 35 calculates the luminance difference between the attention point Pa and the reference point Pr. If there is a large luminance difference between the attention point Pa and the reference point Pr, an edge is considered to be present between the attention point Pa and the reference point Pr. Thus, the edge line detection unit 36 shown in FIG. 3 detects an edge lines based on the luminance difference between the attention point Pa and the reference point Pr.

Figure 15:
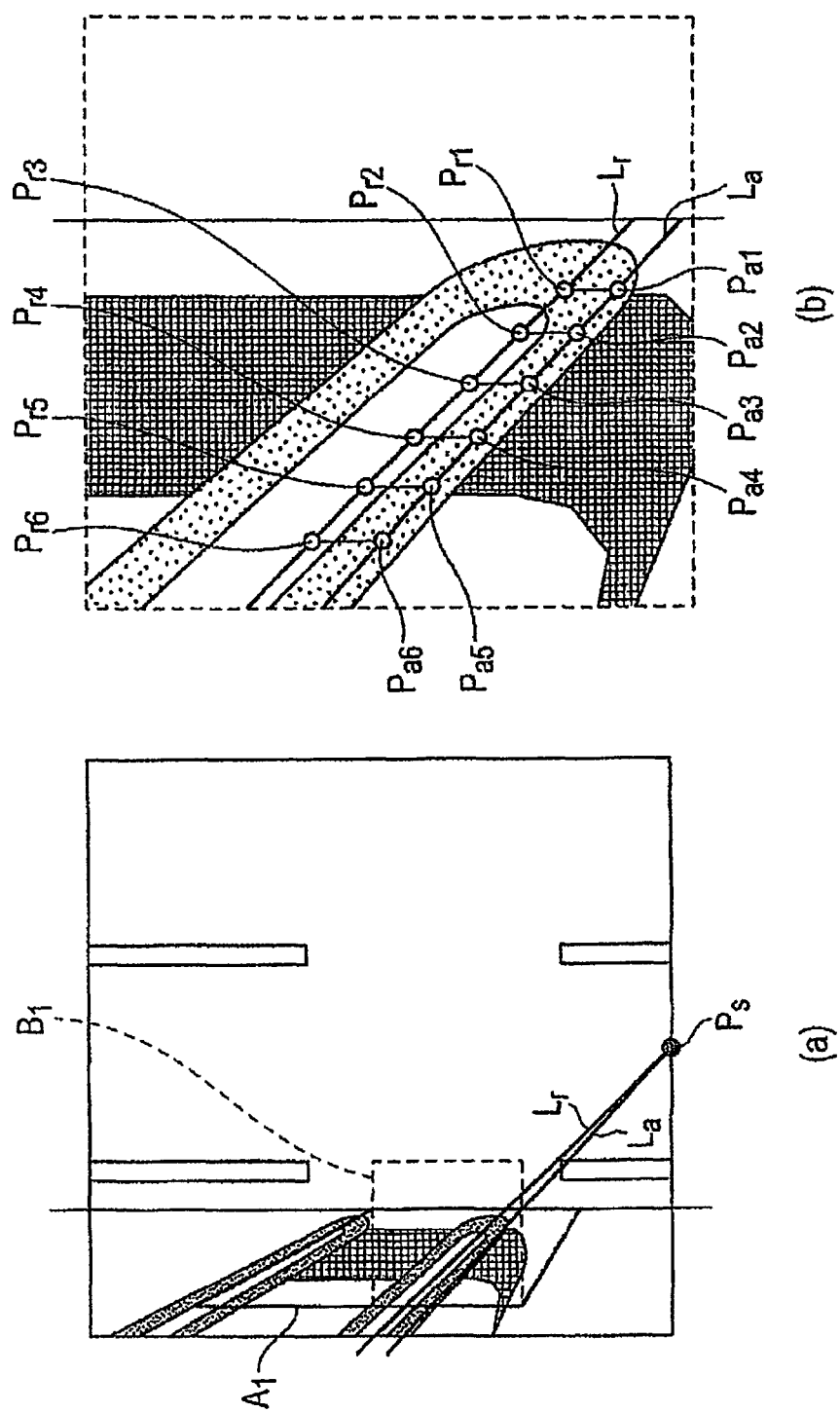
FIG. 15 is a view for describing the detailed operation of the luminance difference calculation unit in FIG. 3, with part (a) illustrating the detection area in the bird's-eye view image, and part (b) illustrating the positional relationship between the attention line, the reference line, the attention point, and the reference point in the bird's-eye view image.

This point will be described in greater detail. FIG. 15 is an illustration of the specific operation of the luminance difference calculation unit 35. Part (a) of FIG. 15 illustrates a bird's-eye view image of the bird's-eye view, and part (b) of FIG. 15 is a magnified view of a section B1 in the bird's-eye view image shown in part (a) of FIG. 15. Only the detection area A1 is illustrated and described in FIG. 15, but the luminance difference is also calculated for detection area A2 according to a similar procedure.

If another vehicle VX is shown in the captured image captured by the camera 10, the other vehicle VX appears in the detection area A1 in the bird's-eye view image, as shown in part (a) of FIG. 15. The attention line La is set on a rubber part of a tire of the other vehicle VX in the bird's-eye view image in part (b) of FIG. 15 and as shown in the magnified view of section B1 in part (a) of FIG. 15. In this state, the luminance difference calculation unit 35 first sets the reference line Lr. The reference line Lr is set along the vertical direction at a position separated a predetermined distance from the attention line La in real space. Specifically, in the three-dimensional object detection device 1 according to the present embodiment, the reference line Lr is set at a position at a distance of 10 cm away from the attention line La in real space. As a result, the reference line Lr is set, e.g., on the wheel of the tire of the other vehicles VX at a distance corresponding to 10 cm from the rubber of the tire of the other vehicle VX in the bird's-eye view image.

Next, the luminance difference calculation unit 35 sets a plurality of attention points Pa1 to PaN on the attention line La. In part (b) of FIG. 15, for convenience of the illustration, six attention points Pa1 to Pa6 are set (hereafter an arbitrarily selected point will be referred to as attention point Pai). Any number of attention points Pa may be set on the attention line La. In the following description, N attention points Pa are set on the attention line La.

The luminance difference calculation unit 35 subsequently sets the reference points Pr1 to PrN at the same height in real space as the attention points Pa1 to PaN. The luminance difference calculation unit 35 then calculates the luminance difference between attention point Pa and reference point Pr pairs at the same height. In this way, the luminance difference calculation unit 35 calculates the luminance difference between two pixels at a plurality of positions (1–N) along a vertical imaginary line extending in the vertical direction in real space. For example, the luminance difference calculation unit 35 calculates the luminance difference between a first attention point Pa1 and a first reference point Pr1 and calculates the luminance difference between a second attention point Pa2 and a second reference point Pr2. The luminance difference calculation unit 35 thereby continuously calculates the luminance differences along the attention line La and the reference line Lr. In other words, the luminance difference calculation unit 35 calculates the luminance differences in order between the third to $N^{th}$ attention points Pa3 to PaN and the third to $N^{th}$ reference points Pr3 to PrN.

The luminance difference calculation unit 35 repeatedly executes this process of setting the above-described reference line Lr, setting the attention point Pa, setting the reference point Pr, and calculating the luminance differences while shifting the attention line La within the detection area A1. Specifically, the luminance difference calculation unit 35 repeatedly executes the above-described process while shifting the positions of the attention line La and the reference line Lr by the same distance along the direction in which the ground contact line L1 extends in real space. For example, the luminance difference calculation unit 35 sets the line that was the reference line Lr in the previous process to be the attention line La, sets the reference line Lr in relation to the attention line La, and sequentially calculates the luminance difference.

Returning to FIG. 3, the edge line detection unit 36 detects the edge line based on the continuous luminance difference calculated by the luminance difference calculation unit 35. For example, in the case shown in part (b) of FIG. 15, the first attention point Pa1 and the first reference point Pr1 are positioned at the same part of the tire and, therefore, have a low luminance difference. Meanwhile, the second to sixth attention points Pa2 to Pa6 are positioned on the rubber part of the tire, and the second to sixth reference points Pr2 to Pr6 are positioned at the wheel part of the tire. Thus, there is a greater luminance difference between the second to sixth attention points Pa2 to Pa6 and the second to sixth reference points Pr2 to Pr6. Thus, the edge line detection unit 36 is capable of detecting the presence of an edge line between the second to sixth attention points Pa2 to Pa6 and the second to sixth reference points Pr2 to Pr6, which have a high luminance difference.

Specifically, to detect an edge line, the edge line detection unit 36 first assigns attributes to an $i^{th}$ attention point Pai based on the luminance difference between the $i^{th}$ attention point Pai (coordinates (xi, yi)) to the $i^{th}$ reference point Pri (coordinates (xi', yi')) according to the following formula 1.

When $1(xi,yi) > 1(xi',yi') + t$ $s(xi,yi) = 1$ when $I(xi,yi) < I(xi',yi') - t$ $s(xi,yi) = -1$ In other cases:

$s(xi,yi) = 0$             Formula 1

In formula 1, t indicates a threshold value, I(xi, yi) indicates a luminance value for an $i^{th}$ attention point Pai, and I(xi', yi') indicates a luminance value of the $i^{th}$ reference point Pri. According to formula 1, if the luminance value for the attention point Pai is greater than a luminance value obtained by adding the threshold value t to the reference point Pri, the attribute s(xi, yi) of the attention point Pai is "1." Meanwhile, if the luminance value for the attention point Pai is less than a luminance value yielded by subtracting the threshold value t from the reference point Pri, the attribute s(xi, yi) for the attention point Pai is "−1." For other relationships between the luminance value of the attention point Pai and the luminance value of the reference point Pri, the attribute s(xi, yi) of the attention point Pai is "0." The threshold value t is preset and can be altered according to a control command issued by the controller 39 shown in FIG. 3, the details of which will be described hereafter.

Next, the edge line detection unit 36 assesses whether the attention line La is an edge line based on the continuity c(xi, yi) of the attribute s along the attention line La based on the following formula 2.

When $s(xi,yi) = s(xi+1, yi+1)$ (except when 0=0)

$c(xi,yi) = 1$

In other cases:

$c(xi,yi) = 0$             Formula 2

If the attribute s(xi, yi) of the attention point Pai and the attribute s(xi+1, yi+1) of the adjacent attention point Pai+1 are identical, the continuity c(xi, yi) is "1." If the attribute s(xi, yi) of the attention point Pai and the attribute s(xi+1, yi+1) of the adjacent attention point Pai+1 are not identical, the continuity c(xi, yi) is "0."

Next, the edge line detection unit 36 finds the sum of the continuities c for all the attention points Pa on the attention line La. The edge line detection unit 36 normalizes the continuity c by dividing the calculated total for the continuities c by the number N of attention points Pa. If the normalized value exceeds a threshold value θ, the edge line detection unit 36 identifies the attention line La as an edge line. The threshold value θ is predetermined via experimentation or another means. The threshold value θ may be preset or may be altered according to a control command issued by the controller 39 according to the assessment results from the adhesion state assessment unit 38, as described hereafter.

Specifically, the edge line detection unit 36 assesses whether the attention line La is an edge line according to the following formula 3. The edge line detection unit 36 then assesses whether all of the attention lines La drawn on the detection area A1 are edge lines.

$\Sigma c(xi,yi)/N > \theta$             Formula 3

Returning to FIG. 3, the three-dimensional object detection unit 37 detects a three-dimensional object based on the amount of edge lines detected by the edge line detection unit 36. As described above, the three-dimensional object detection device 1 according to the present embodiment detects an edge line extending in the vertical direction in real space. Detecting many edge lines extending in the vertical direction indicates that there is a high possibility that a three-dimensional object is present in the detection areas A1, A2. For this reason, the three-dimensional object detection unit 37 detects a three-dimensional object based on the quantity of edge lines detected by the edge line detection unit 36. Furthermore, before detecting the three-dimensional object, the three-dimensional object detection unit 37 assesses whether the edge lines detected by the edge line detection unit 36 are correct. The three-dimensional object detection unit 37 assesses whether a variation in luminance on the edge lines is a predetermined threshold value or greater along the edge lines of the bird's-eye view image. When the variation in luminance on the edge lines in the bird's-eye view image is equal to or greater than a threshold value, the edge lines are assessed to have been incorrectly detected. Meanwhile, if the variation in luminance on the edge lines in the bird's-eye view image is not greater than a threshold value, an assessment is made that the edge lines are correct. The threshold value is preset by experimentation or another means.

Figure 16:
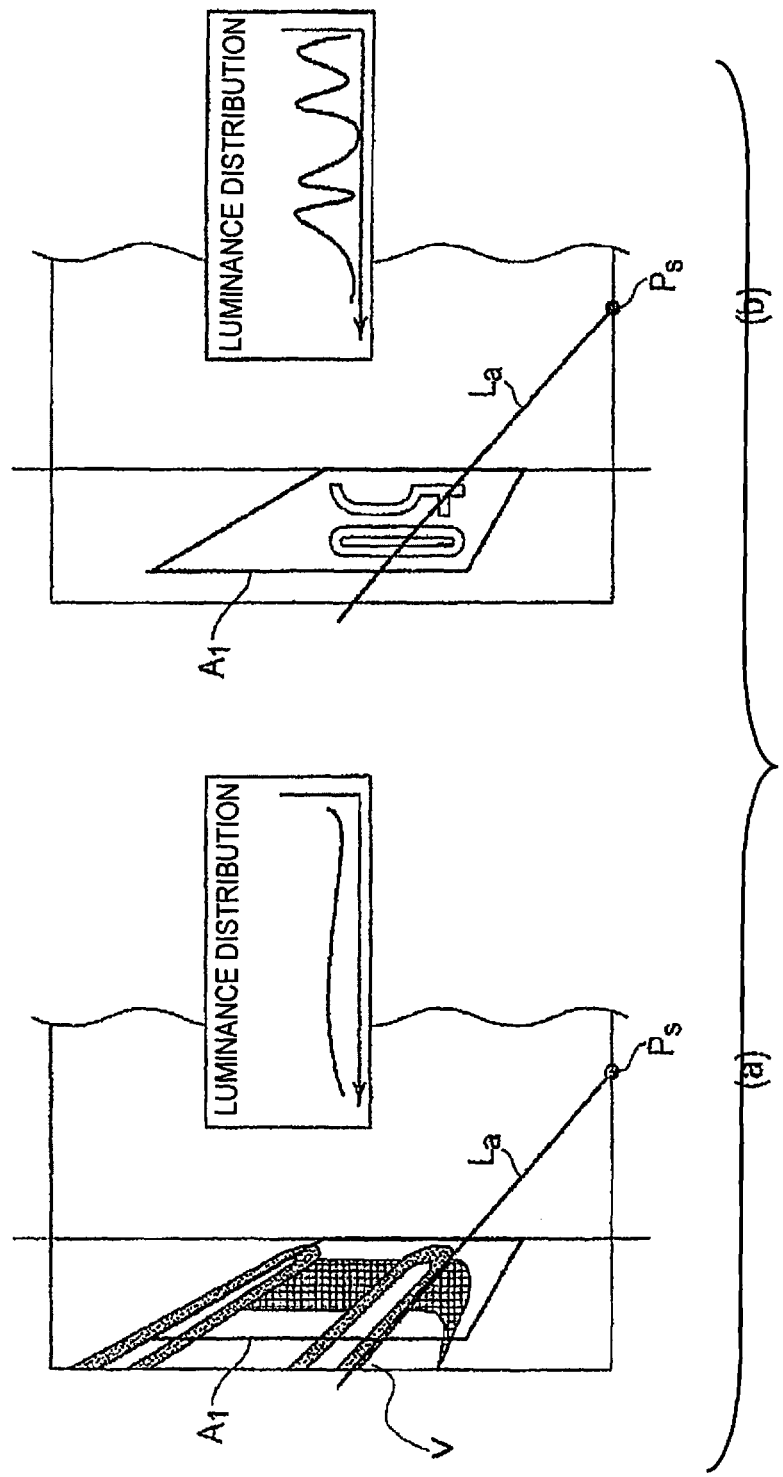
FIG. 16 is a view illustrating an edge line and a luminance distribution on an edge line, with part (a) illustrating a luminance distribution when a three-dimensional object (vehicle) is present in the detection area, and part (b) illustrating a luminance distribution when a three-dimensional object is not present in the detection area.

FIG. 16 shows edge line luminance distributions, wherein FIG. 16(a) shows an edge line and the luminance distribution when another vehicle VX is present in the detection area A1 as a three-dimensional object, and FIG. 16(b) shows an edge line and the luminance distribution when no three-dimensional object is present in the detection area A1.

Let us assume that an attention line La set on the tire rubber part of another vehicle VX in the bird's-eye view image has been identified an edge line, as shown in FIG. 16(a). In this case, there is a slight variation in luminance along the attention line La in the bird's-eye view image. This is due to the tire of the other vehicle VX being stretched in the bird's-eye view image as a result of the image captured by the camera 10 having been viewpoint-converted to a bird's-eye view image. Meanwhile, the attention line La set on a white section of text reading "50" painted on the road surface in the bird's-eye view image is assumed to have been misidentified as an edge line, as shown in FIG. 16(b). In this case, there is a sharply pronounced change in luminance along the attention line La in the bird's-eye view image. This is due to there being a mixture of high luminance areas corresponding to the white lettering and low luminance areas corresponding to the road surface on the edge line.

Based on the differences in the luminance distribution along the attention line La as described above, the three-dimensional object detection unit 37 assesses whether an edge line has been misidentified. If the change in luminance along the edge line is greater than a predetermined threshold, the three-dimensional object detection unit 37 assesses that the edge line has been detected as a result of an errant assessment. The edge line is thus not used to detect three-dimensional objects. This allows for a minimization in situations in which white text such as "50" on the road surface, grass on the shoulder, and the like are identified as edge lines, leading to reductions in the precision of three-dimensional object detection.

Specifically, the three-dimensional object detection unit 37 calculates the change in luminance along the edge line using the following formula 4 or 5. The change in luminance along the edge line corresponds to an evaluation value in the vertical direction in real space. The following formula 4 evaluates the luminance distribution using the total value of the squares of the differences between the $i^{th}$ luminance value I(xi, yi) and the adjacent $i^{th}+1$ luminance value I(xi+1, yi+1) on the attention line La. The following formula 5 evaluates the luminance distribution using the total value of the absolute values of the differences between the $i^{th}$ luminance value I(xi, yi) and the adjacent $i^{th}+1$ luminance value I(xi+1, yi+1) on the attention line La.

Evaluation value for vertical equivalent direction=
$\Sigma[\{I(xi,yi)-I(xi+1,yi+1)\}^2]$     Formula 4

Evaluation value for vertical equivalent direction=
$\Sigma|I(xi,yi)-I(xi+1,yi+1)|$     Formula 5

No limitation is imposed in the use of formula 5; for example, as shown in the following formula 6, a threshold value t2 can be used to binarize an attribute b of an adjacent luminance value and then to find the sum of the binarized attributes b for all of the attention points Pa.

Evaluation value for vertical equivalent direction=
$\Sigma b(xi,yi)$

However, when $|I(xi,yi)-I(xi+1,yi+1)|>t2$ $b(xi,yi)=1$

In other cases:

$b(xi,yi)=0$     Formula 6

If the absolute value of the luminance difference between the luminance value for the attention point Pai and the luminance value for the reference point Pri is greater than a threshold value t2, the attribute b(xi, yi) of the attention point Pa(xi, yi) is "1." For other relationships, the attribute b(xi, yi) of the attention point Pai is "0." The threshold value t2 is experimentally set in advance so as to confirm that the attention line La is not on the same three-dimensional object. The three-dimensional object detection unit 37 then finds the total of the attributes b for all of the attention points Pa on the attention line La and calculates an evaluation value in the vertical equivalent direction to thereby assess whether an edge line is correct.

Figure 17:
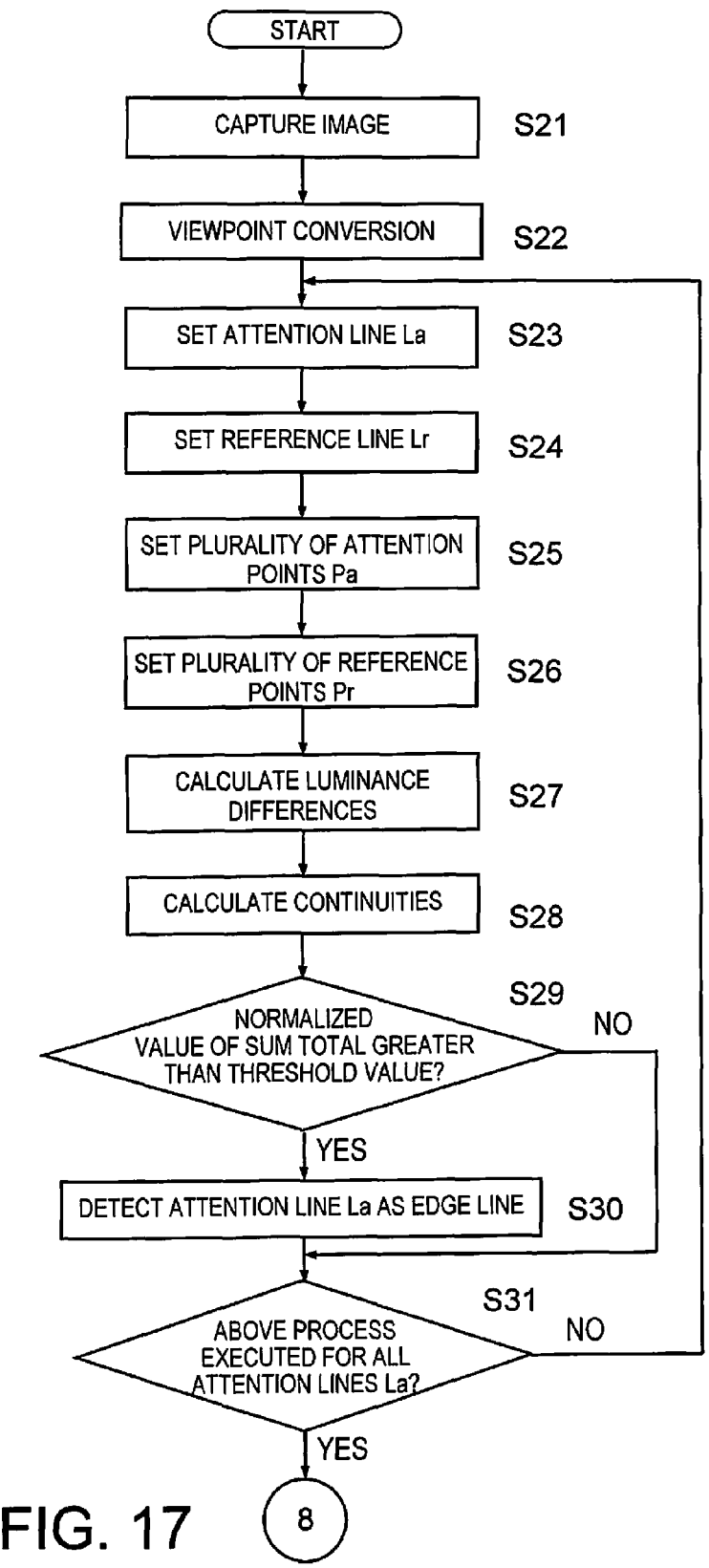
FIG. 17 is a first part of a flowchart illustrating an edge information-utilizing three-dimensional object detection method executed by the viewpoint conversion unit, a luminance difference calculation unit, an edge line detection unit, and the three-dimensional object detection unit in FIG. 3.
Figure 18:
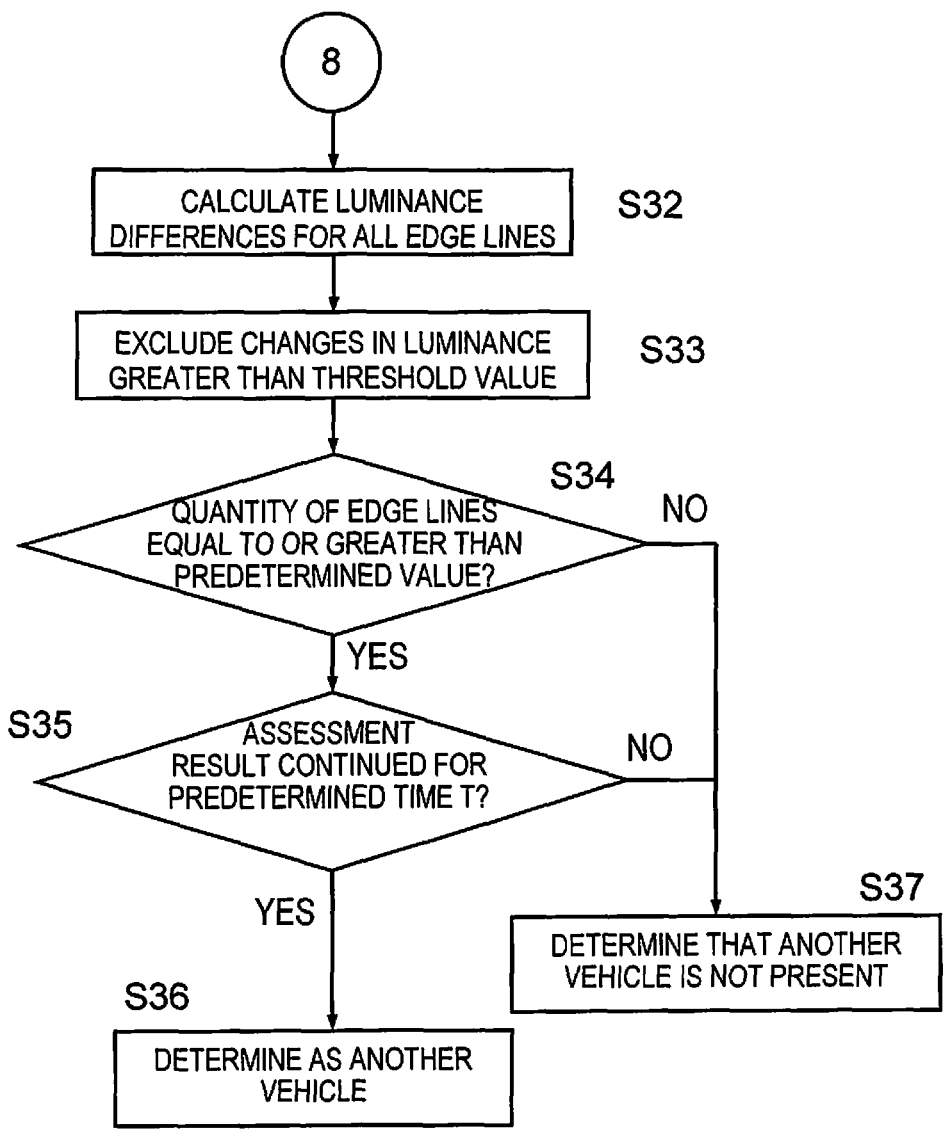
FIG. 18 is a second part of a flowchart illustrating an edge information-utilizing three-dimensional object detection method executed by the viewpoint conversion unit, the luminance difference calculation unit, the edge line detection unit, and the three-dimensional object detection unit in FIG. 3.

Next, a three-dimensional object detection method based on edge information according to the present embodiment will be described. FIGS. 17 and 18 show a flowchart illustrating the details of the three-dimensional object detection method according to the present embodiment. For convenience, FIGS. 17 and 18 illustrate a process being performed on detection area A1, but a similar process is also performed upon the detection area A2.

As shown in FIG. 17, the camera 10 first photographs a predetermined area assessed by the view angle α and the attaching position thereof in step S21. Next, in step S22, data for the image captured by the camera 10 in step S21 is input to the viewpoint conversion unit 31, and a bird's-eye view image data is generated via viewpoint conversion.

Next, in step S23, the luminance difference calculation unit 35 sets the attention line La on the detection area A1. To do so, the luminance difference calculation unit 35 sets a line equivalent to a line extending in the vertical direction in real space as the attention line La. Next, in step S24, the luminance difference calculation unit 35 sets the reference line Lr in the detection area A1. To do this, the luminance difference calculation unit 35 sets a line that is equivalent to a line segment extending in the vertical direction in real space and a line separated from the attention line La by a predetermined distance in real space as the reference line Lr.

Next, in step S25, the luminance difference calculation unit 35 sets a plurality of attention points Pa on the attention line La. At this time, the luminance difference calculation unit 35 sets a certain number of attention points Pa that will not be problematic when the edge line detection unit 36 is performing edge detection. In step S26, the luminance difference calculation unit 35 subsequently sets the reference points Pr so that the attention points Pa and the reference points Pr are at substantially the same height in real space. As a result, the attention points Pa and the reference points Pr are substantially aligned in the horizontal direction, and the edge line extending in the vertical direction in real space is more easily detected.

Next, in step S27, the luminance difference calculation unit 35 calculates the luminance difference between the attention points Pa and the reference points Pr at the same height in real space. The edge line detection unit 36 calculates the attribute s of the attention points Pa according to formula 1 above. In step S28, the edge line detection unit 36 then calculates the continuity c of the attribute s of the attention points Pa according to the formula 2 above. Next, in step S29, the edge line detection unit 36 assesses whether a normalized sum for the continuity c is greater than a threshold value θ according to formula 3 above. If the normalized value is found to be greater than the threshold value θ (step S29: YES), the edge line detection unit 36 detects the attention line La as the edge line in step S30. The process then transitions to step S31. If the normalized value is found not to be greater than the threshold value θ (S29: NO), the edge line detection unit 36 does not detect that the attention line La as an edge line, and the process transitions to step S31. The threshold value θ can be set in advance or altered according to a control command from the controller 39.

In step S31, the computer 30 assesses whether the processes of steps S23 to S30 have been executed for all settable attention lines La in the detection area A1. If the process is found not to have been performed for all the attention lines La (S31: NO), the process returns to step S23, sets a new attention line La, and repeats the process through step S31. Meanwhile, is the process is found to have been performed for all the attention lines La (S31: YES), the process shifts to step S32 in FIG. 18.

In step S32 in FIG. 18, the three-dimensional object detection unit 37 calculates the change in luminance along the edge line for each edge line detected in step S30 in FIG. 17. The three-dimensional object detection unit 37 calculates the change in luminance of the edge lines according to any of the formulas 4, 5, and 6. Next, in step S33, the three-dimensional object detection unit 37 removes any edge lines having a variation in luminance that is greater than the predetermined threshold value. In other words, an edge line having a large variation in luminance is assessed as not being a correct edge line, and the edge line is not used to detect a three-dimensional object. This is done in order to prevent text on the road surface, grass on the shoulder of the road and the like in the detection area A1 from being detected as edge lines, as discussed above. Thus, the predetermined threshold value is set to a value assessed in advance via experimentation or another means, based on the variation in luminance created by text on the road surface, grass on the shoulder of the road, and the like.

Next, in step S34, the three-dimensional object detection unit 37 assesses whether the edge line amount is equal to or greater than a second threshold value β. The second threshold value β can be set in advance via experimentation or another means and can be altered according to a control command issued by the controller 39 show in FIG. 3, the details of which will be described hereafter. For example, when the three-dimensional object to be detected is set to four-wheel vehicles, the second threshold value β is preset via experimentation or another means, based on the number of edge lines of a four-wheel vehicle appearing in the detection area A1. If the edge line amount is found to be equal to or greater than the second threshold value β (S34: YES), and the three-dimensional object is continuously detected by the three-dimensional object detection unit 33 for a predetermined length of time T or longer (S35: YES), the three-dimensional object detection unit 37 detects that a three-dimensional object is present in the detection area A1 in step S36 (S36). Meanwhile, the edge line amount is found not to be equal to or greater than the second threshold value β (S34: No), or no the three-dimensional object is continuously detected by the three-dimensional object detection unit 33 for a predetermined length of time T or longer (S35: NO), the three-dimensional object detection unit 37 finds that no three-dimensional object is present in the detection area A1 (S37). The second threshold value β can be set in advance or can be changed according to a control command from the controller 39. All of the detected three-dimensional objects may be assessed to be other vehicles VX traveling in an adjacent lane next to the lane in which the host vehicle V is traveling, or the relative speed of the detected three-dimensional object relative to the host vehicle V may be considered a characteristic of other vehicles VX in order to determine whether the object is another vehicle VX in an adjacent lane.

In accordance with the three-dimensional object detection method based on edge information according to the present embodiment, as discussed above, vertical imaginary lines are set in the bird's-eye view image as line segment extending in the vertical direction in real space in order to detect three-dimensional objects present in the detection areas A1, A2. Then, the luminance difference between two pixels near each position is calculated for multiple positions along the vertical imaginary line to determine whether a three-dimensional object is present based on the continuity of the luminance difference.

Specifically, an attention line La corresponding to a line segment extending in the vertical direction in real space and a reference line Lr different from the attention line La are set in the detection areas A1, A2 in the bird's-eye view image. Then, the luminance difference between an attention point Pa on the attention line La and a reference point Pr on the reference line Lr is continuously found along the attention line La and the reference line La. In this way, the luminance difference between the attention line La and the reference line Lr is found by continuously finding the luminance difference between the points. If there is a high luminance difference between the attention line La and the reference line Lr, there is a high possibility of an edge of a three-dimensional object being present at the location where the attention line La has been set. Accordingly, detecting a three-dimensional object based on the continuous luminance difference is possible. In particular, the process for detecting a three-dimensional object will not be affected, even if the three-dimensional object is enlarged according to the height from the road surface by conversion to a bird's-eye view image in order to compare the luminance between the vertical imaginary lines extending in the vertical direction in real space. Therefore, according to the present example, the precision for detecting a three-dimensional object can be improved.

In addition, in the present example, the luminance difference between two points of substantially the same height near the vertical imaginary line is found. Specifically, the luminance difference between an attention point Pa on the attention line La and the reference point Pr on the reference line Lr at substantially the same height in real space is found, allowing for clear detection of the luminance differences if an edge extending in the vertical direction is present.

Figure 19:
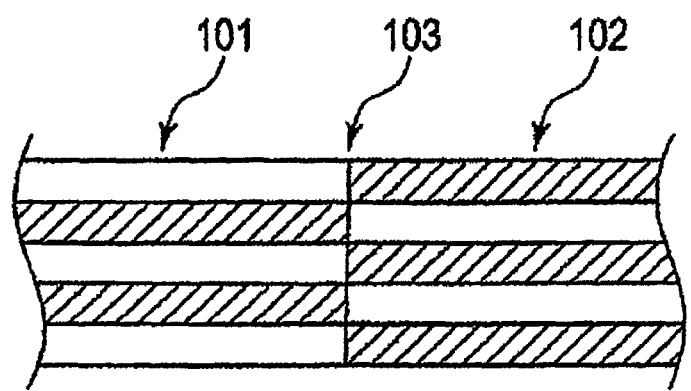
FIG. 19 is a view illustrating an example image for detailing an edge detection operation.

In addition, in the present example, an attribute is assigned to the attention point Pa based on the luminance difference between the attention point Pa on the attention line La and the reference point Pr on the reference line Lr, and a determination is made regarding whether the attention line La is an edge line based on the continuity c of the attributes along the attention line La. Therefore, the boundaries between areas of high luminance and areas of low luminance are detected as edge lines, and the edges can be detected as naturally perceived by humans. This effect of the above will be described. FIG. 19 is an illustration of an example image for explaining the process performed by the edge line detection unit 36. This example image features a first striped pattern 101, indicating a striped pattern in which areas of high luminance and areas of low luminance are repeated, and a second stripe pattern 102, indicating a stripes pattern in which areas of low luminance and areas of high luminance are repeated, which are adjacent to each other. In this example image, areas of high luminance in the first striped pattern 101 and areas of low luminance in the second striped pattern 102 are adjacent to each other, and areas of low luminance in the first striped pattern 101 and areas of high luminance in the second striped pattern 102 are adjacent to each other. A location 103 positioned at the boundary between the first striped pattern 101 and the second striped pattern 102 tends not to be perceivable to humans as an edge.

In contrast, because the areas of low luminance and the areas of high luminance are adjacent to each other, the location 103 is perceived as an edge if edges are detected only using luminance differences. However, in addition to the luminance difference at the location 103, the edge line detection unit 36 assesses the location 103 to be an edge line only when there is continuity in the attributes of the luminance difference. Therefore, the edge line detection unit 36 is capable of preventing mistaken identifications in which the location 103, which would not be perceived by a human as edge lines, is recognized as an edge line, and the edges can be perceived by humans.

Additionally, in the present example, if the change in luminance of the edge line detected by the edge line detection unit 36 is greater than a predetermined threshold value, the edge line is assessed as having been detected as the result of misidentification. When the captured image acquired by the camera 10 is converted to a bird's-eye view image, a three-dimensional object in a captured image tends to appear in a stretched state in a bird's-eye view image. For example, if the tire of another vehicle VX is stretched out, as described above, change in the luminance of the bird's-eye view image in the stretched out direction tend to be small because the tire as a single location is stretched. In contrast, if text or the like painted on the road surface is misidentified as an edge line, a mixture of an area of high luminance in the form of text and an area of low luminance in the form of the road surface appear in the bird's-eye view image. In this case, the change in luminance in the direction of stretching tends to be greater. Thus, by identifying changes in luminance along the edge line in the bird's-eye view image, as in the present example, edge lines detected as the result of misidentification can be recognized, allowing for heightened three-dimensional object detection precision.

Figure 20:
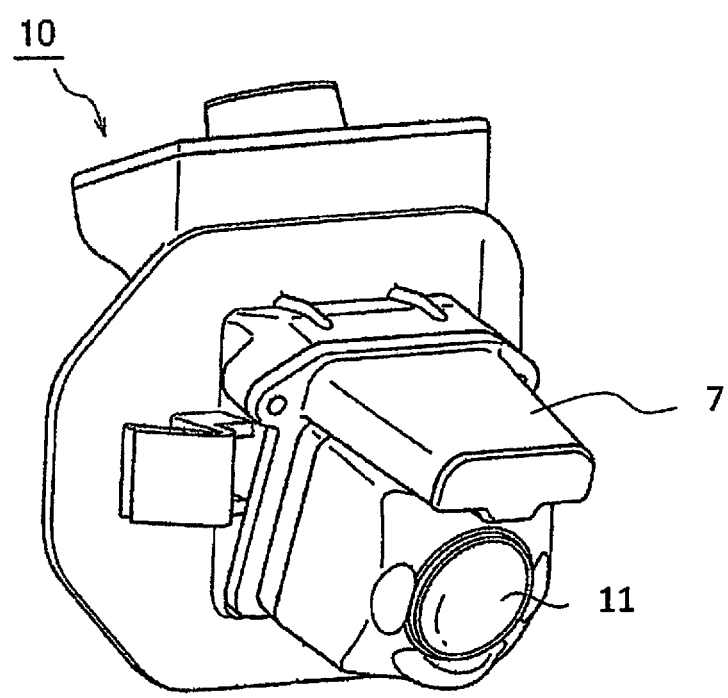
FIG. 20 is a perspective view illustrating a mounting example of a camera.

In this manner, the three-dimensional object detection device 1 of the present embodiment detects a three-dimensional object based on image information obtained via the camera 10. FIG. 20 is a perspective view illustrating the camera 10, which is the image capturing means, and is a perspective view from the rear left side of the vehicle. As described above, the camera 10 includes a lens (or a protective filter) 11 that configures an imaging optical system; however, since the camera 10 is mounted to the exterior of the vehicle cabin, foreign matter such as raindrops, sand, dust, and mud flung from the road surface and splashed muddy water can frequently adhere to the lens 11. Features of the pixels caused by the outline of foreign matter such as sand and mud that adheres to the lens 11 can be extracted, and the extracted features can be misidentified as three-dimensional objects.

Figure 21A:
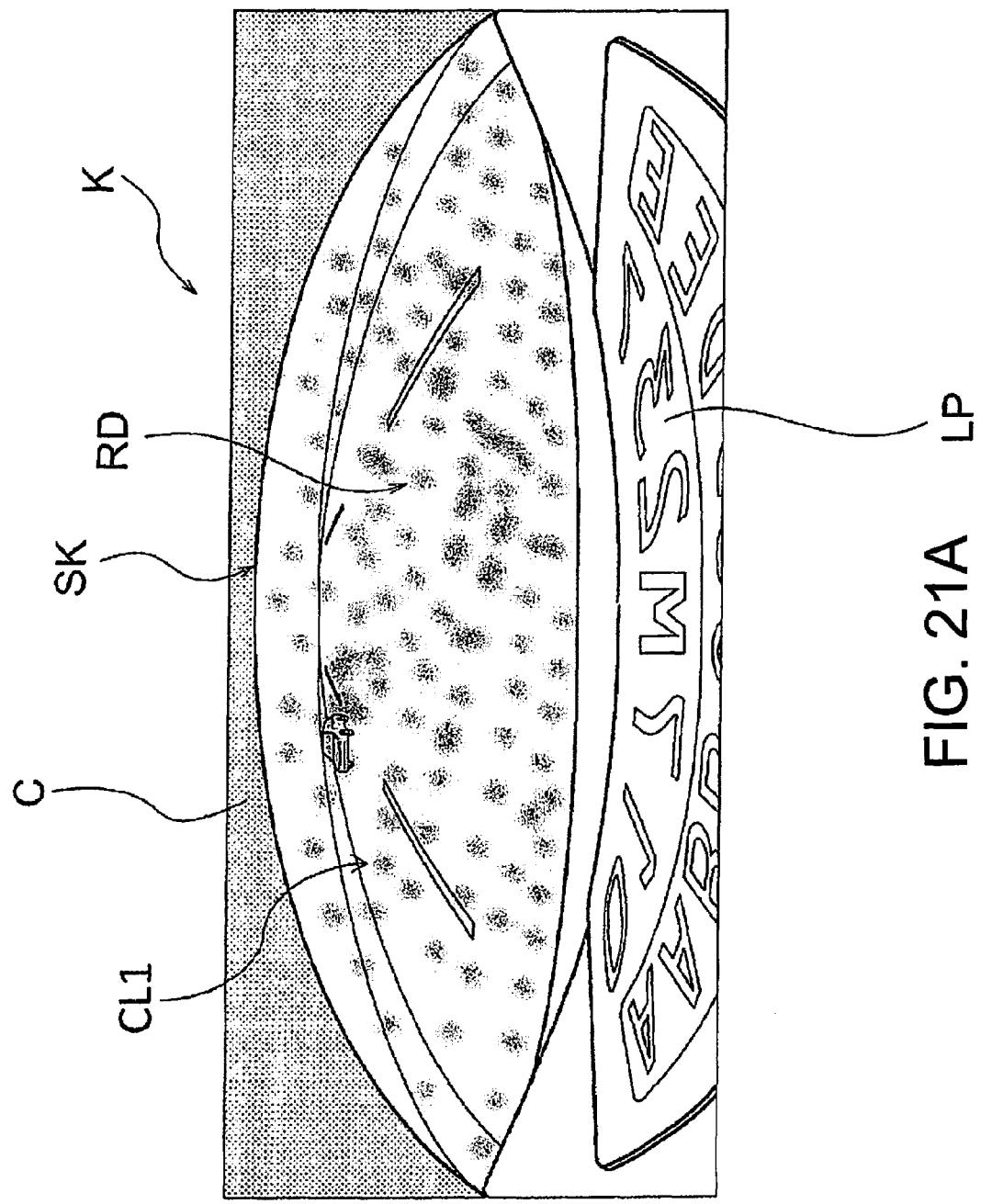
FIG. 21A is a view illustrating an example of image information that is captured by a camera, the lens of which is contaminated with foreign matter comprised of small particles.
Figure 21B:
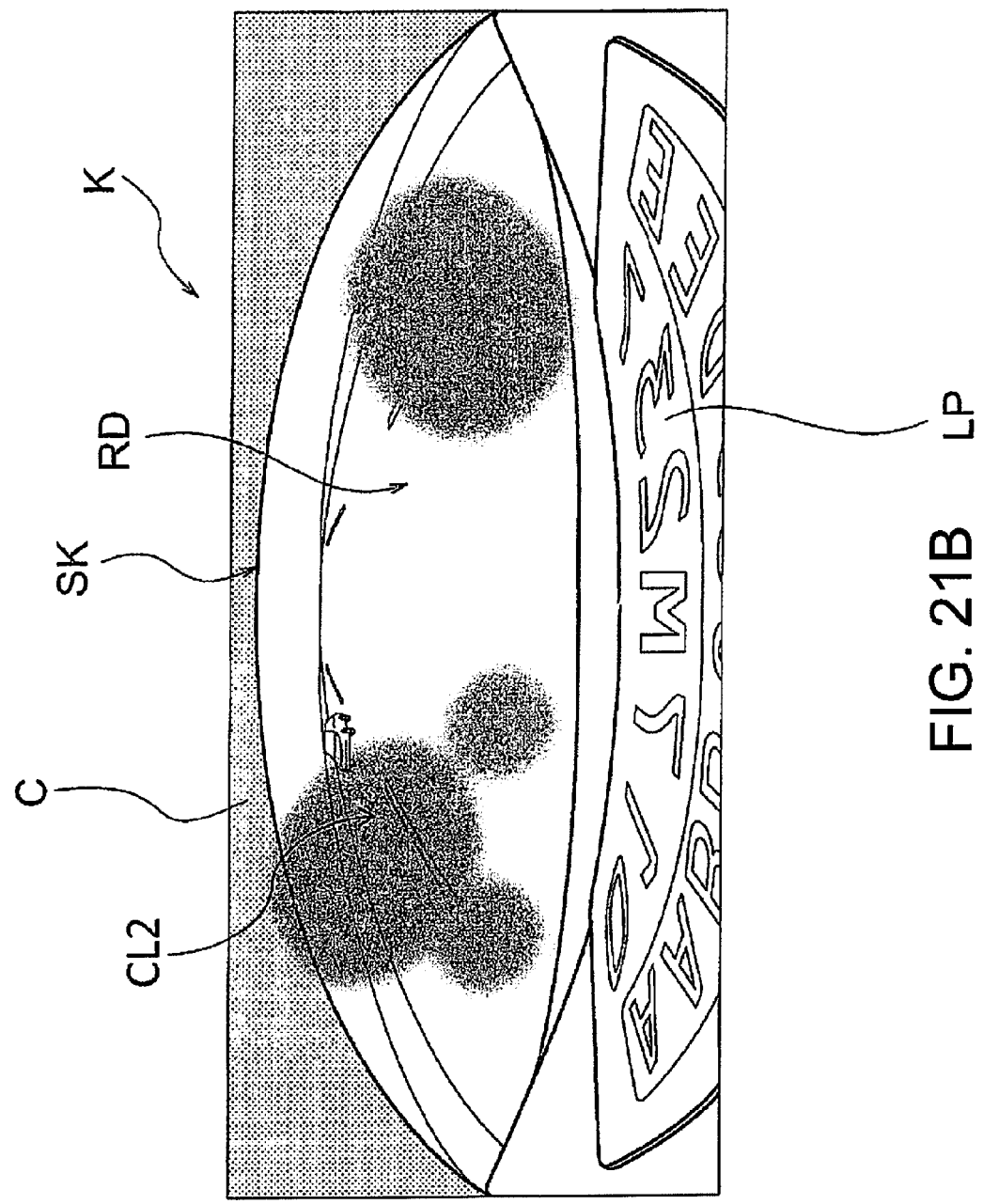
FIG. 21B is a view illustrating an example of image information that is captured by a camera, the lens of which is contaminated with foreign matter comprised of large particles.

An example of an image captured via a lens 11 to which foreign matter has adhered is shown in FIGS. 21A and 21B. The image on the lower side of FIGS. 21A and 21B is an image of the license plate LP, and the gray part on the upper side is an image of a case C of the camera 10. The image information K in the area between the license plate LP and the case C varies moment by moment. The image information K includes an image of a road surface RD of the road on which the host vehicle V travels and an image of the rear sky SK expanding above this road surface RD.

FIG. 21A is an image captured when traveling on a road on which sand, mud, and the like are present. Many fine grains of sand CL with a small particle size adhere to the surface of the lens 11, as shown in FIG. 21A. This state occurs when traveling in a sandy area or in a place with substantial dust. For example, when traveling on a road where the road surface is covered by dried sand, mud, or the like (including unpaved roads and paved roads), sand can be flung up, and fine sand or dust with small particle sizes adheres to the lens surface. A plurality of fine grains of sand CL1 with a small particle size evenly adhere to the entire surface of the lens 11, as shown in FIG. 21A. Since fine grains of sand CL1 with small particle sizes attract each other, film from the sand grains forms on the surface of the lens 11.

FIG. 21B is also an image captured when traveling on a road on which sand, mud, and the like are present; as shown in the drawing, several grains of sand CL2 with relatively large particle sizes are scattered on the surface of the lens 11. This state occurs when traveling in an area with substantial water, such as during rainy weather or after rainy weather. For example, the above occurs when traveling on a road that is wet (including unpaved roads and paved roads) or on a road that is muddy due to water from rainwater, groundwater, or the like. For example, when traveling on a road where the road surface is covered by dried sand, mud, or the like, including water (including unpaved roads and paved roads), sand and muddy water is flung up, and mud CL2 in which mud and sand with relatively large particle sizes are aggregated, in which sand and dust are aggregated (assembled), with relatively large particle sizes adhere to the lens surface. Mud CL2 with a relatively large particle size partially adheres to the surface of the lens 11 in an agglomerated state (aggregated state), as shown in FIG. 21B.

Since image information caused by foreign matter such as sand, mud, or the like is included in the image information that is captured when foreign matter adheres to the lens 11, there are cases in which a three-dimensional object cannot be accurately detected, as shown in FIGS. 21A and 21B. As a result, the present embodiment is provided with a lens cleaning device 100 for cleaning the lens 11.

The lens cleaning device 100 will be described here. The lens cleaning device 100 of the present embodiment is provided with a pump that supplies cleaning fluid and a nozzle that sprays the supplied cleaning fluid onto the lens 11, and this device sprays the cleaning fluid onto the lens at a predetermined time according to a predetermined lens cleaning step, in which is stipulated at least the supply timing for supplying cleaning fluid to the surface of the lens 11 or the amount of the cleaning fluid to use, in order to clean the lens 11 of the camera 10.

Figure 22:
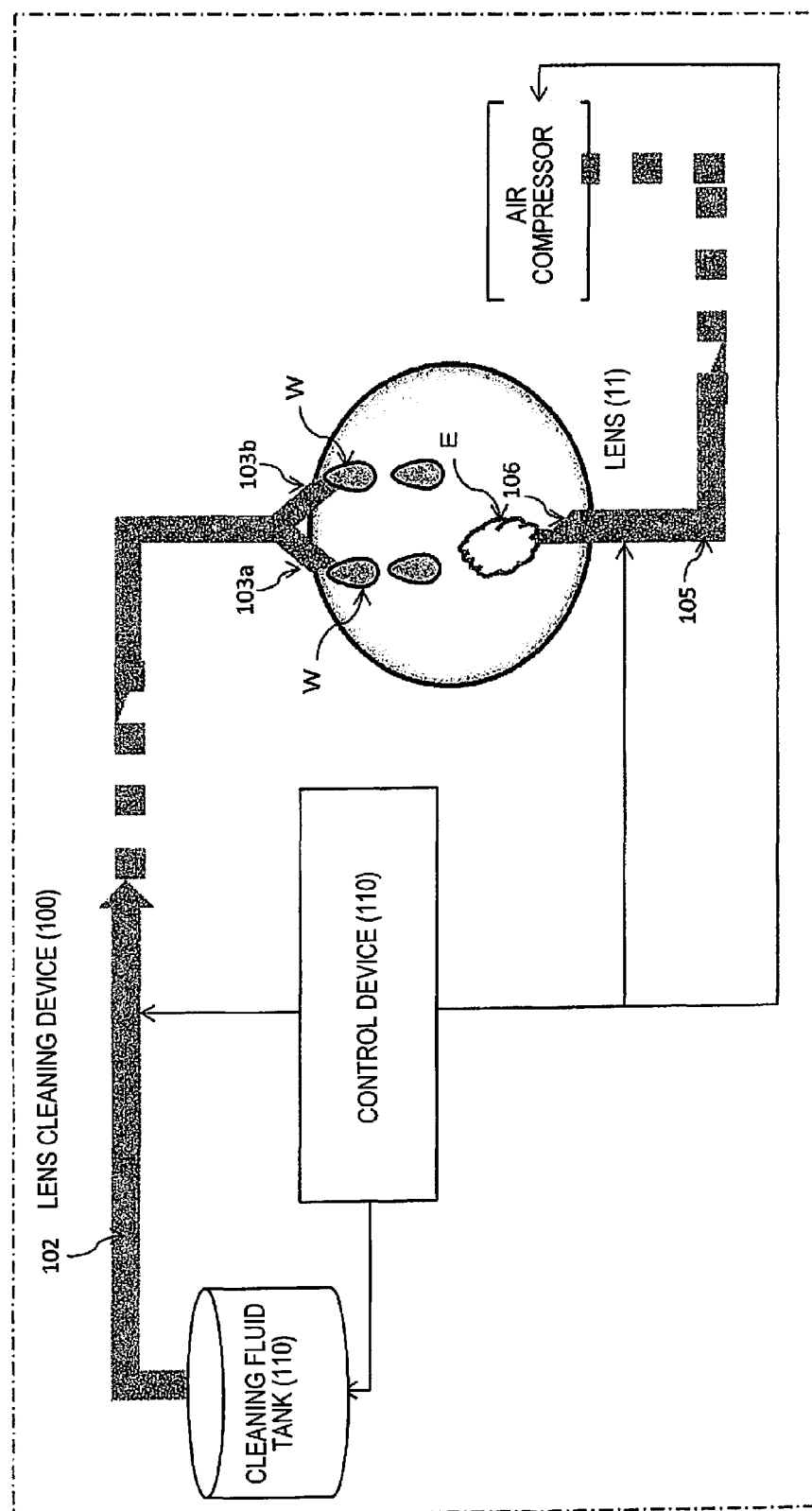
FIG. 22 is a view illustrating a general overview of a control mechanism of the lens cleaning device.

FIG. 22 is a schematic overview of the lens cleaning device 100 of the present embodiment. As shown in FIG. 22, the lens cleaning device 100 comprises a cleaning fluid tank 101 for storing cleaning fluid at least temporarily, a flow path 102 for transporting the cleaning fluid that is supplied from the cleaning fluid tank 101, dispensing openings 103a, 103b for dispensing the cleaning fluid W onto the surface of the lens 11, which are formed at the end of the flow path 102, an air compressor 104 for compressing gas that is supplied from the outside, a tube 105 for transporting the compressed gas, and an exhaust nozzle 106 formed on the end of the tube 105 for blowing gas E onto the surface of the lens 11. The operation of each configuration of the lens cleaning device 100 described above is controlled by a control device 110. The control device 110 cleans the lens 11 with a control program that follows a predetermined lens cleaning step that is defined in advance.

Figure 23:
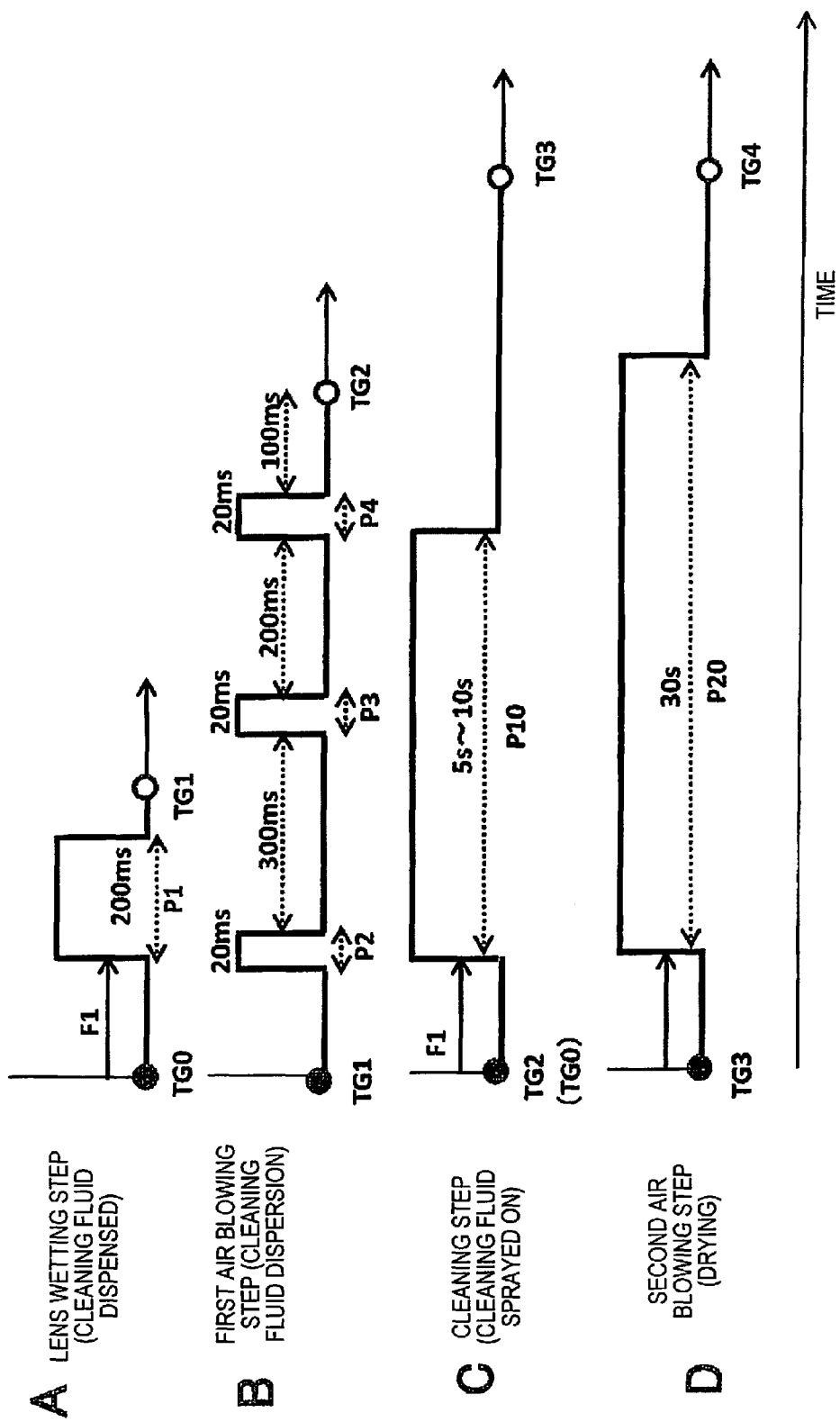
FIG. 23 is a timing chart for explaining the lens cleaning process.

The content of the lens cleaning step is not particularly limited, but the lens cleaning step of the present embodiment comprises a lens wetting step, a first air blowing step, a cleaning step, and a second air blowing step. FIG. 23 is a time chart illustrating the lens cleaning step of the present embodiment. In the lens cleaning step of the present embodiment, a "lens wetting step A" in which a cleaning fluid W is dispensed onto the lens 11 in order to wet the surface of the lens 11, a "first air blowing step B" in which gas is intermittently blown onto the lens 11 for a plurality of times at a predetermined interval in order to spread the dispensed cleaning fluid W across the entire surface of the lens 11, a "cleaning step C" in which the cleaning fluid W is blown onto the lens 11 to clean the lens 11 surface, and a "second air blowing step D" in which the cleaning fluid W is evaporated and the surface of the lens 11 is dried are executed in the order of A->B->C->D.

Specifically, when the cleaning execution process is started at time TG0, the control device 110 starts supplying cleaning fluid after a predetermined time F1 has elapsed and executes the "lens wetting step A." In this "lens cleaning step A," a cleaning fluid dispensing process P1, in which the cleaning fluid W is continuously dispensed onto the surface of the lens 11, is executed for around 200 ms. The control device 110 ends the "lens wetting step A" at a time TG1 and then starts the "first air blowing step B." In the first air blowing step B, the air blowing processes for diffusion P2 to P4 are performed a plurality of times. In the present embodiment, the blowing processes for the gas are intermittently performed three times for 20 ms each at a cycle of 300 ms–100 ms; however, the gas blowing cycle, the blowing time, and the number of times of blowing can be arbitrarily set according to the supply capacity of gas and the size of the lens 11. The control device 110 starts a "cleaning step C" after time TG2 at which the "first air blowing step B" has been completed and conducts a cleaning fluid blowing process P10 for blowing the cleaning fluid W onto the surface of the lens 11 for around 5 seconds to 10 seconds; after completing time TG3 thereof, a "drying step D" is started to conduct an air blowing process for drying P20 for blowing gas onto the surface of the lens 11 for around 30 seconds.

The cleaning step is not limited to that described above and can be arbitrarily defined. For example, the "lens wetting step A" and the "first air blowing step B" can be omitted; when the cleaning treatment step is started at time TG0, the supply of cleaning fluid can be started after a predetermined time F1 has elapsed, and the "cleaning step C" can be conducted for blowing the cleaning fluid W onto the lens 11 to wash away the dirt on the lens 11 surface; then, the "second air blowing step D" can be performed to evaporate the cleaning fluid W to dry the surface of the lens 11. In this case, just the cleaning steps C, D are executed in the order of C->D. In the cleaning of the present embodiment, the supply of cleaning fluid is started after the start time. The time difference between the start time and the supply of the cleaning fluid is a predetermined time F1, and this time difference is around the time difference of signal transmission and reception, including a short period of time of less than one second.

Figure 24:
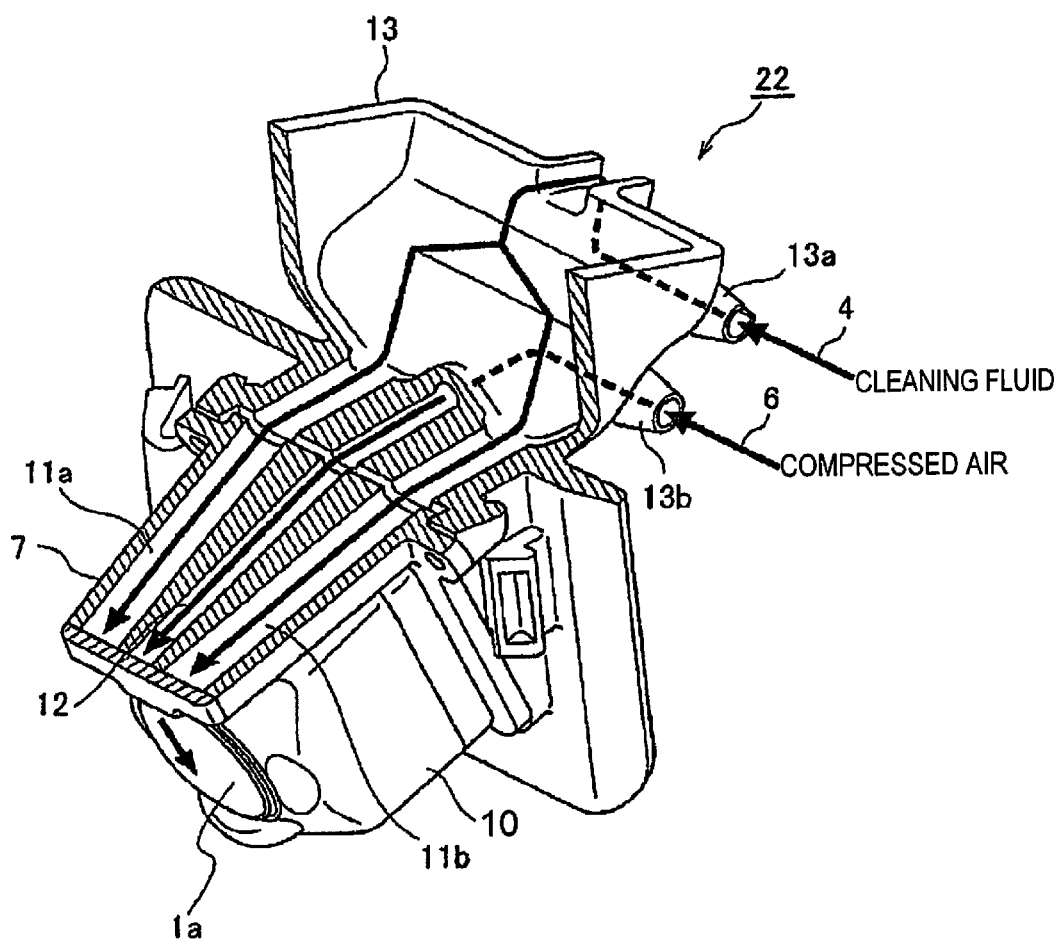
FIG. 24 is a partial cut-away perspective view of a camera device, which is a part of the lens cleaning device.
Figure 25A:
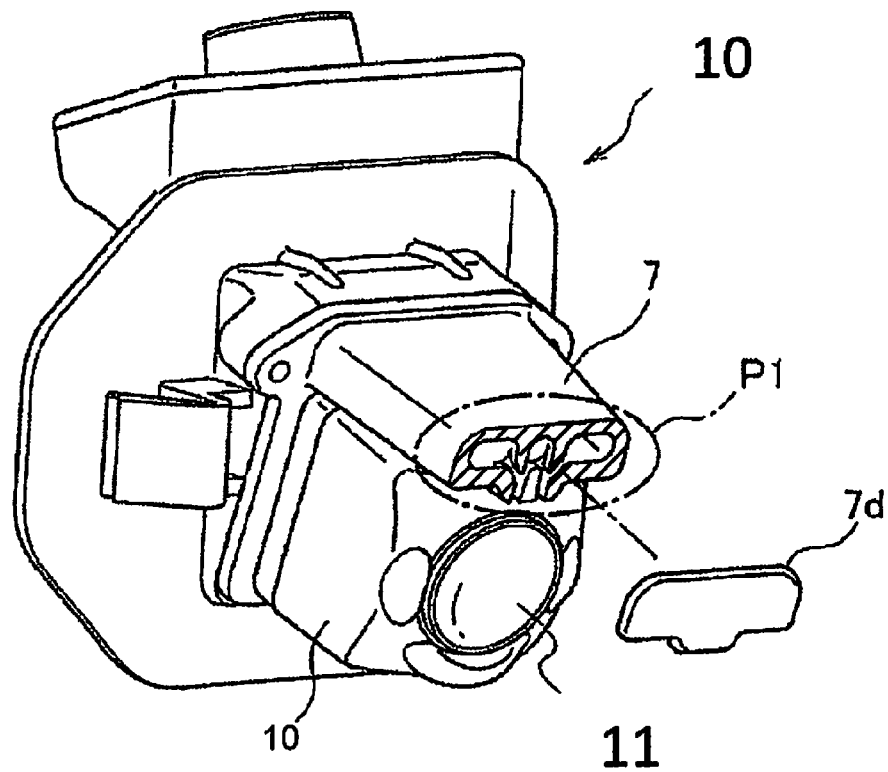
FIG. 25A is a perspective view of the camera device having the lens cleaning device with a portion shown in cross section.
Figure 25B:
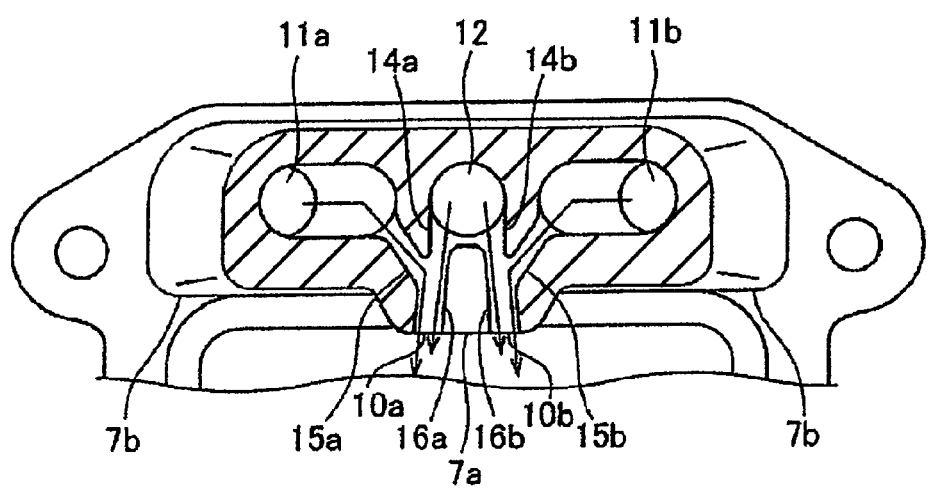
FIG. 25B is a partial view of a nozzle end section of the lens cleaning device provided to the camera device that is circled in FIG. 25A.

Additionally, FIGS. 24, 25A and 25B are views illustrating the supply mechanism of the cleaning fluid comprising the camera device 1000, which includes the camera 10 shown in FIG. 20. FIG. 24 is a partially cutaway perspective view of a camera device 1000, which is a part of the lens cleaning device. FIGS. 25A and B are views of the camera device 1000 showing in cross section the nozzle end section of the lens cleaning device provided to the camera device 1000.

FIG. 24 is a partially cutaway perspective view of a nozzle unit 22. An air passage 12 for introducing compressed air into the center portion is provided to a nozzle 7, which is provided to the end side of the nozzle unit 22, and cleaning fluid passages 11a, 11b for introducing cleaning fluid are provided to both the left and right sides of the air passage 12, as shown in FIG. 3. The air passage 12 and the distal ends of the cleaning fluid passages 11a, 11b are bent at a substantially right angle so as to face the lens surface 1a of the camera 10.

Additionally, a secondary tank 13 is provided on the upstream side of the cleaning fluid passages 11a, 11b for temporarily storing the cleaning fluid. A socket 13a is provided for connecting a cleaning fluid pipe 4 and a socket 13b is provided for connecting an air pipe 6 are provided to the side of the secondary tank 13, where the socket 13b is connected to the air passage 12 via a flow path provided below the secondary tank 13. That is, the compressed air that is introduced inside the nozzle unit 22 via the socket 13b is directly introduced into the air passage 12. The socket 13a is connected to the secondary tank 13, and the cleaning fluid that is supplied via the socket 13a flows inside from above the secondary tank 13. At this time, the pipe that is connected from the socket 13a to the secondary tank 13 faces the vertical direction.

The bottom of the secondary tank 13 is connected to two systems of cleaning fluid passages 11a, 11b, as shown in FIG. 24. Therefore, the compressed air sent from the air compressor 104 is introduced into the air passage 12 of the nozzle 7 via the air pipe 6 while the cleaning fluid sent from the cleaning fluid tank 101 is stored in the secondary tank 13 and is then introduced into the two systems of cleaning fluid passages 11a, 11b.

FIG. 25B is an explanatory view illustrating the detailed configuration of the nozzle end section, showing a cross-sectional view of the portion with the code P1 shown in FIG. 25A. As shown in FIG. 25B, an air passage 12 is provided to the center of the end section of the nozzle 7, and two cleaning fluid passages 11a, 11b are provided, sandwiching the air passage 12. Each of the cleaning fluid passages 11a, 11b is connected to the end sections 15a, 15b, and at this time, the flow path area of the end sections 15a, 15b is smaller than the flow path area of the cleaning fluid passages 11a, 11b. Therefore, the flow rate of the cleaning fluid flowing in the cleaning fluid passages 11a, 11b becomes faster in the end sections 15a, 15b.

Meanwhile, the distal end of the air passage 12 branches into two end sections 14a, 14b. At this time, the flow path area of the end sections 14a, 14b is smaller than the flow path area of the air passage 12. Therefore, the flow rate of the compressed air that flows in the air passage 12 becomes faster when passing through the end section 14a, 14b.

Then, the end section 15a of one of the cleaning fluid passages 11a and one end section 14a of the air passage 12 are joined to form a confluence path 16a, the distal end of which is a discharge port 10a. The end section 15b of the other cleaning fluid passage 11b and the other end section 14b of the air passage 12 are joined to form a confluence path 16b, the distal end of which is a discharge port 10b. At this time, the confluence path 16a and the confluence path 16b face directions that spread apart from each other toward the distal end side.

Therefore, when the cleaning fluid sent from the cleaning fluid tank 101 equipped with a pump is stored inside the secondary tank 13 and compressed air is sent from the air compressor 104, the compressed air is injected with an increased flow rate; additionally, the cleaning fluid passages 11a, 11b have a negative pressure due to the injection of the compressed air, thereby suctioning the cleaning fluid that is stored in the secondary tank 13. Consequently, the compressed air and the cleaning fluid are injected from the discharge ports 10a, 10b via the two confluence paths 16a, 16b and are sprayed on the lens surface 1a. The mixture of cleaning fluid and compressed air is injected in a direction that spreads on the surface of the lens 11 and, thus, is able to clean the entire lens surface 1a. The injection surface 7a in the end section of the nozzle 7 is configured to protrude forward from the side surface 7b of the periphery, as shown in FIG. 25B. Therefore, there is a possibility of preventing the cleaning fluid injected from the discharge ports 10a, 10b from adhering to the side surface 7b of the nozzle 7.

Next, the lens cleaning device 1000 or the adhesion state determination unit 38 that is provided to the three-dimensional object detection device 1 of the present embodiment will be described. The adhesion state assessment unit 38 assesses the state of adhered contamination based on the adhesion degree of foreign matter adhered to a predetermined area of the lens 11, based on the pixel values of the pixels included in the obtained captured image. The predetermined area of the lens 11 may be arbitrarily set. This may be the entire lens 11 or a part that has been arbitrarily set. Preferably, the predetermined area of the lens 11 includes an area in which an image of a subject included in the detection areas A1, A2 will form an image.

In the present embodiment, the "adhesion degree of foreign matter" includes the "adhesion amount of foreign matter," as well as the "adhesion ratio of foreign matter," and the "variation in the adhesion degree of foreign matter" includes the "variation in the adhesion amount of foreign matter," as well as the "variation in the adhesion ratio of foreign matter."

The "adhesion amount of foreign matter" measures the quantity of foreign matter adhered to the surface of the lens 11. While not particularly limited, the "adhesion amount of foreign matter" can be assessed based on the number of pixels corresponding to the foreign matter adhered to the surface of the lens 11. The pixels corresponding to the foreign matter adhered to the surface of the lens 11 can be determined based on the pixel value of each pixel.

The "variation in the adhesion amount of foreign matter" is the degree of increase or decrease in the foreign matter adhered to the lens 11 within a predetermined time. In the present embodiment, the "adhesion amount of foreign matter" and the "variation in the adhesion amount of foreign matter" are calculated based on an image (number of pixels) corresponding to the foreign matter.

The "adhesion ratio of foreign matter" is a measure based on the adhesion area of foreign matter with respect to the area of a predetermined area. The "adhesion ratio of foreign matter" includes the concept of dispersion degree (distribution degree) of foreign matter and, regarding the area of a predetermined area, is a measure showing the variation in the presence of foreign matter within the area. The "variation in the adhesion ratio of foreign matter" is the degree of variation in the ratio of the area in which foreign matter adheres to the lens 11 and is present during a predetermined time or the degree of variation in the variation of the presence of foreign matter adhered to the lens 11 during a predetermined time. In the present embodiment, the "adhesion ratio of foreign matter" and the "variation in the adhesion ratio of foreign matter" are calculated based on an image (number of pixels) corresponding to the foreign matter.

Hereafter, in the present embodiment, the "adhesion degree of foreign matter" is described using the phrases "adhesion amount of foreign matter," "adhesion ratio of foreign matter," "variation in the adhesion amount of foreign matter," and "variation in the adhesion ratio of foreign matter" as an example.

A case will be described hereafter, in which the adhesion degree of foreign matter is the adhesion amount of foreign matter or the amount of variation in the adhesion amount of foreign matter. A "first adhesion threshold" in the present invention includes a "first variation threshold" and a "second variation threshold." The "first variation threshold" and the "second variation threshold" are threshold values used when determining the state of adhered lens contamination 11 when the adhesion degree of foreign matter is the adhesion amount of foreign matter or the variation amount of the adhesion amount of foreign matter.

Figure 26A:
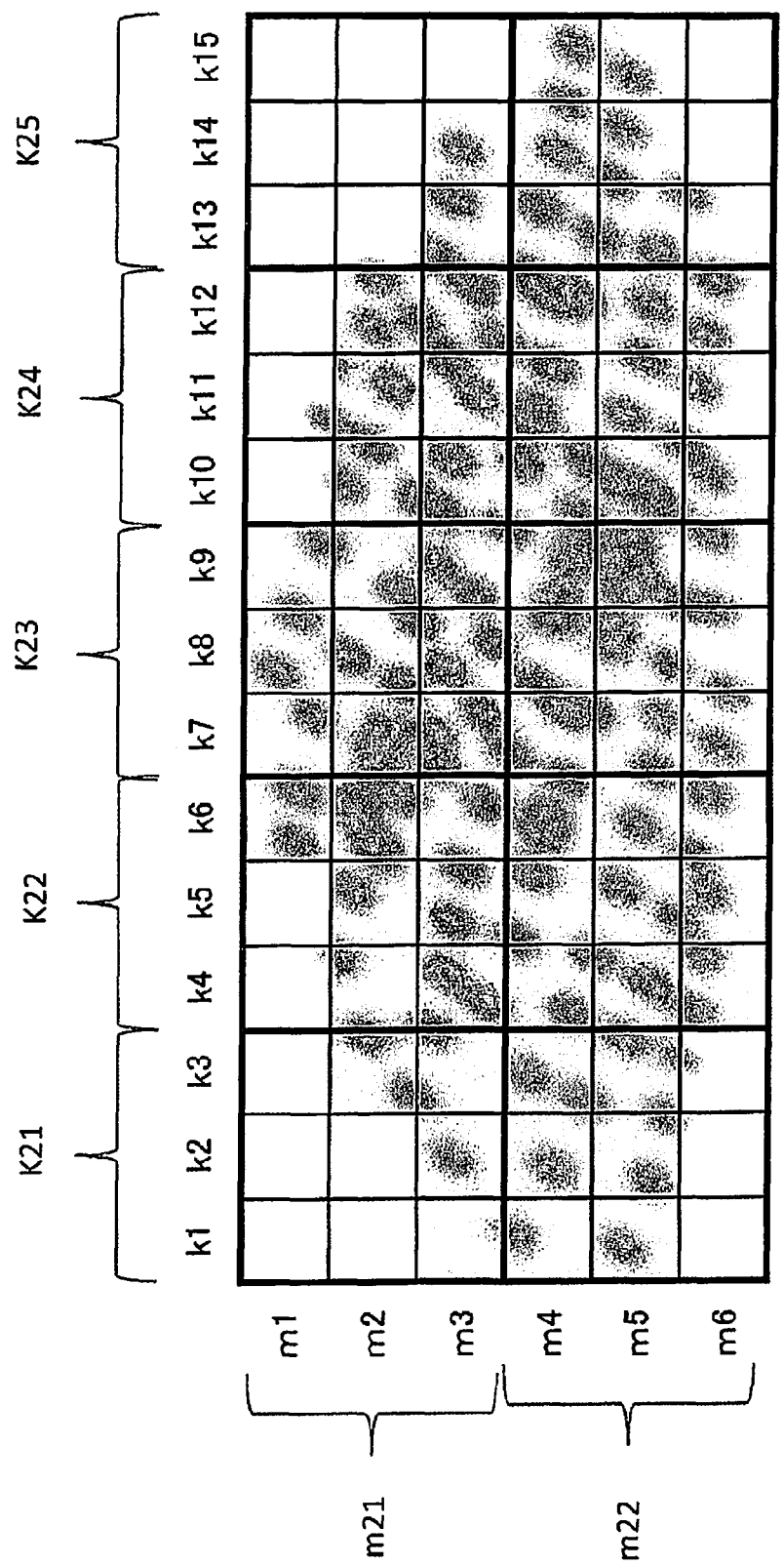
FIG. 26A is an illustration of an example of a state of a pixel of the image information when foreign matter with small particles has adhered to the lens.

The adhesion state assessment unit 38 of the present embodiment calculates the adhesion degree of foreign matter and the variation amount of the adhesion degree of foreign matter and determines that the state of adhered lens contamination 11 is in a first state when the variation amount is within a predetermined threshold value that is equal to or greater than a first variation threshold (one aspect of the first adhesion threshold and hereinafter the same) and less than a second variation threshold (one aspect of the second adhesion threshold and hereinafter the same), which are preset. A first dispersion threshold and a second dispersion threshold for evaluating the dispersion degree, as well as a first dispersion threshold and a second dispersion threshold for evaluating the variation amount of the dispersion degree, are set based on experimentation results or the like. The first state in the present embodiment is a state in which fine particles (particles with a small particle size) adhere to the lens 11, corresponding to, for example, the state shown in FIG. 21A. FIG. 26A shows a method for obtaining the adhesion degree of foreign matter based on the number of pixels with a pixel value of a predetermined range extracted from the captured image shown in FIG. 21A.

Whether foreign matter has adhered to the capture area corresponding to each pixel, as well as the adhesion state of foreign matter, such as the adhesion ratio of foreign matter, are assessed based on the pixel value of each pixel to which is assigned an address on the captured image that has been captured at a certain timing, as shown in FIG. 26A. The method for determining whether or not foreign matter has adhered is not particularly limited. Whether foreign matter has adhered can be assessed based on the pixel values of the captured image. Pixels with pixel values that are within a predetermined range can be determined to be pixels corresponding to foreign matter. For example, while not particularly limited, the assessment can use criteria that the pixel has a luminance difference of a predetermined range and that the travel distance within a predetermined time is less than a predetermined value, based on the characteristics that pixel values corresponding to foreign matter are less than the pixel values corresponding to a three-dimensional object and that the travel distance is small; or, the assessment can be based only on the characteristic that the travel distance is small. Then, the number of pixels determined to have adhered foreign matter is counted. The adhesion degree of foreign matter at a certain time (including the adhesion amount/adhesion ratio, which hereinafter are the same) can be calculated based on the count value of the number of pixels that have been determined to have foreign matter adhered at that time, and the variation amount of the adhesion degree of foreign matter (adhesion amount/adhesion ratio) at a certain time can be calculated based on the count values of the number of pixels that have been determined to have foreign matter adhered at a plurality of different times.

The first variation threshold (one aspect of the first adhesion threshold) in the present embodiment is a threshold value that is set based on the variation amount of the adhesion amount of foreign matter calculated by the adhesion state assessment unit 38 when the host vehicle V is traveling on a paved road without patterns on the road surface or a paved road without irregularities on the road surface in order to obtain the variation in the adhesion amount of foreign matter (control value) in a reference state when traveling on a paved road on which the effects of disturbance due to the state of the road surface is eliminated. When a variation amount of the adhesion amount of foreign matter that is less than the first variation threshold is detected, the host vehicle V can be predicted to be traveling on, for example, a paved road, where the adhesion of sand and mud is less likely to occur. Specifically, an assessment can be made that there is a low likelihood of being in a state in which foreign matter with a small particle size, such as sand, has adhered to the lens 11. Meanwhile, when a variation amount of the adhesion amount of foreign matter that is greater than the first variation threshold is detected, the host vehicle V can be presumed to be traveling on, for example, an unpaved road, where the adhesion of sand and mud is likely to occur.

The second variation threshold in the present embodiment is a threshold value that is set based on the variation amount of the adhesion amount of foreign matter calculated by the adhesion state assessment unit 38 when the host vehicle V is traveling on a paved road with patterns on the road surface or a paved road with irregularities formed on the road surface in order to eliminate the effects of disturbance due to patterns and the like on the road surface. Patterns on the road surface and irregularities on the road surface sometimes appear as an immobile image with a blurry outline in the captured image. Consequently, there are cases in which patterns on the road surface and irregularities on the road surface are assessed as foreign matter adhered to the lens 11. According to experimentation by the inventors, the dispersion degree based on the pixels (detected as foreign matter) caused by patterns on the road surface or irregularities on the road surface is greater than the dispersion degree of foreign matter or the variation amount of the dispersion degree of foreign matter caused by the adhesion of fine sand. Accordingly, when a variation amount of the adhesion amount of foreign matter has been detected to be greater than the second variation threshold, a prediction can be made that the host vehicle V is traveling on a paved road with patterns on the road surface or a paved road with irregularities formed on the road surface. In addition, an assessment can be made that there is a low likelihood of being in a state in which foreign matter with a small particle size, such as sand, has adhered to the lens 11. Meanwhile, when a variation amount of the adhesion amount of foreign matter has been detected to be less than the second variation threshold, a prediction can be made that the host vehicle V is traveling on, for example, an unpaved road, where the adhesion of sand and mud is likely, and that foreign matter of fine particles, such as sand, has adhered to the lens 11. Specifically, an assessment can be made that there is a low likelihood of being in a state in which foreign matter with a small particle size, such as sand, has adhered to the lens 11.

In this way, when the variation amount of the adhesion amount of foreign matter is within a predetermined threshold value of equal to or greater than the first variation threshold and less than the second variation threshold, which are preset, the state of adhesion of lens contamination 11 is assessed to be in a first state, thereby allowing for a distinction between a state in which foreign matter of various sizes has adhered to the lens 11 and a first state in which fine particles (particles with a small particle size) have adhered to the lens 11 when traveling on a paved road without patterns or irregularities; at the same time, when traveling on a paved road with patterns or irregularities, there is the possibility of distinguishing between a state in which an image of these patterns or irregularities on the road surface is included in the captured image, and a first state in which fine particles (particles with a small particle size) have adhered to the lens 11. Therefore, accurately assessing the first state in which fine particles (particles with a small particle size) have adhered is possible.

Figure 26B:
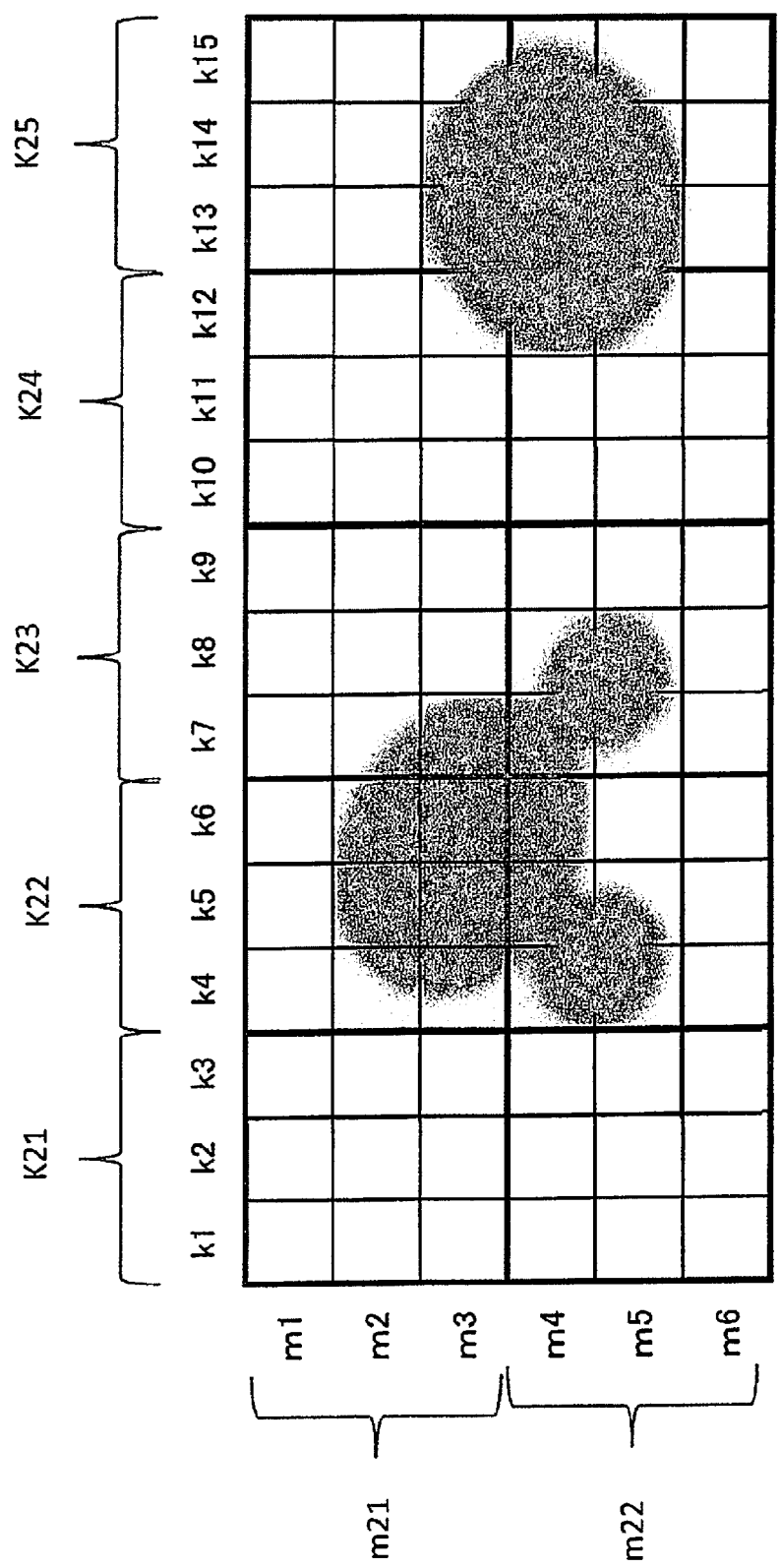
FIG. 26B is an illustration of an example of a state of a pixel of the image information when foreign matter with large particles has adhered to the lens.

The adhesion state assessment unit 38 of the present embodiment assesses that the state of adhered lens contamination 11 is in the second state when the variation amount of the adhesion amount of foreign matter is equal to or greater than the second variation threshold. The second state in the present embodiment is a state in which large particles (aggregates with a large particle size) have adhered to the lens 11, corresponding to the state shown in FIG. 21B. FIG. 26B illustrates a method for obtaining the adhesion amount of foreign matter based on the number of pixels having a pixel value of a predetermined range extracted from the captured image shown in FIG. 21B. The description of the method to calculate the adhesion amount of foreign matter, the variation amount of the adhesion amount of foreign matter, the adhesion ratio of foreign matter, and the variation amount of the adhesion ratio of the foreign matter in the example show in FIG. 26B is the same as the description regarding FIG. 26A; therefore, the description has been omitted, and the above description has been invoked. In the example shown in FIG. 26B, the number of pixels determined to have foreign matter adhered with respect to all the pixels 90 is 28, so a determination can be made that the adhesion ratio of foreign matter is around 31%.

As described above, the second variation threshold is a threshold value that is set based on the variation amount of the adhesion amount of foreign matter detected when the host vehicle V is traveling on a paved road with patterns on the road surface or a paved road with irregularities formed on the road surface. According to experimentation by the inventors, the variation amount of adhesion of foreign matter, when aggregated mud or the like has adhered to the lens 11 and depending on the size of the mass of the mud, tends to be greater than the variation amount of the adhesion amount of foreign matter that has been detected due to the patterns on the road surface or irregularities on the road surface. For this reason, in the present embodiment, the second variation threshold, which can be experimentally determined, is set as the reference value. When a variation amount of the adhesion amount of foreign matter that is equal to or greater than the second variation threshold is detected, a prediction can be made that the host vehicle is traveling on, for example, a muddy unpaved road, where foreign matter with a large particle size, such as aggregated mud, is likely to adhere. A third variation threshold that is greater than the second variation threshold can be separately defined in order to determine the second state of the adhered foreign matter.

Figure 27:
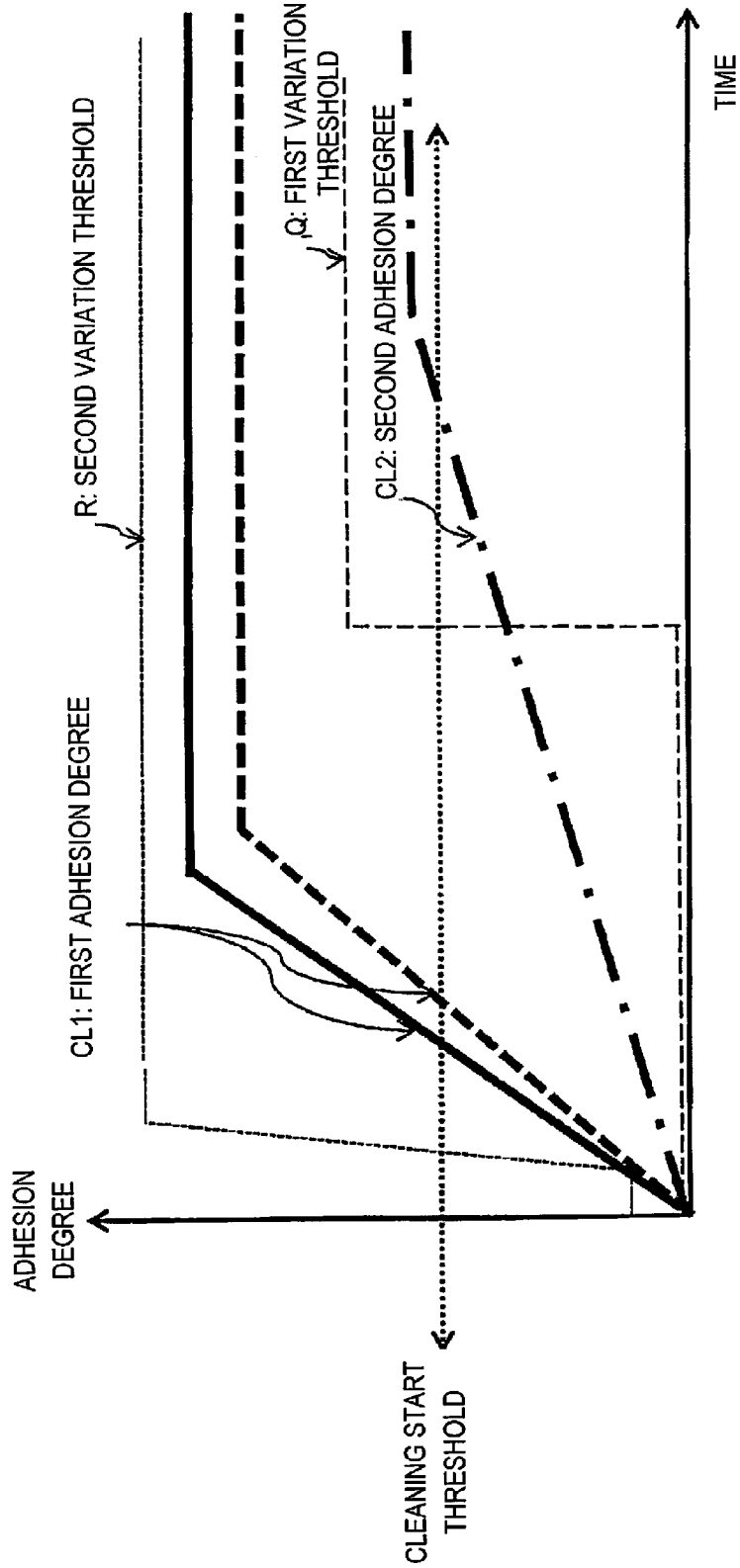
FIG. 27 is an illustration of the amount of variation in the adhesion amount of foreign matter corresponding to the state of the adhered lens contamination.

FIG. 27 illustrates an example of the first variation threshold, the second variation threshold, a first adhesion variation amount that is detected in the first state, and a second adhesion variation amount that is detected in the second state. When the adhesion amount of foreign matter is the trigger for starting the cleaning, the relationship of the variation amount at the time of exceeding the threshold value for starting the cleaning will be the second variation threshold R<first adhesion variation amount CL1 (first state) <second adhesion variation amount CL2 (second state) <second variation threshold Q, as shown in FIG. 27.

A case will be described hereafter, in which the adhesion degree of foreign matter is the adhesion ratio of foreign matter or the variation amount of the adhesion ratio of foreign matter. The "first adhesion threshold" in the present invention includes a "first dispersion threshold," and the "second adhesion threshold" includes a "second dispersion threshold." The "first dispersion threshold" and the "second dispersion threshold" are threshold values used when assessing the state of adhered lens contamination 11 when the adhesion degree of foreign matter is the adhesion ratio of foreign matter or the variation amount of the adhesion ratio of foreign matter.

The adhesion state assessment unit 38 of the present embodiment calculates the adhesion ratio or the variation amount (dispersion variation amount) of the adhesion ratio of foreign matter and assesses that the state of adhered lens contamination 11 is in a first state when the adhesion ratio or the variation amount of the adhesion ratio (dispersion variation amount) is within a predetermined threshold value that is equal to or greater than a first dispersion threshold (one aspect of the first adhesion threshold, and hereinafter the same) and less than a second dispersion threshold (one aspect of the second adhesion threshold, and hereinafter the same), which are preset. A first dispersion threshold and a second dispersion threshold for evaluating the adhesion ratio, as well as a first dispersion threshold and a second dispersion threshold for evaluating the variation amount of the adhesion ratio, are set based on experimentation results or the like.

As described above, the first state in the present embodiment is a state in which fine particles (particles with a small particle size) have adhered to the lens 11, corresponding to, for example, the state shown in FIG. 21A. FIG. 26A illustrates a method for obtaining the adhesion amount of foreign matter based on the number of pixels having a pixel value of a predetermined range extracted from the captured image shown in FIG. 21A.

Whether foreign matter has adhered to the capture area corresponding to each pixel, as well as the adhesion state of foreign matter such as the adhesion ratio of foreign matter, are assessed based on the pixel value of each pixel to which is assigned an address on the captured image that is captured at a certain time, as shown in FIG. 26A. The method for assessing whether or not foreign matter has adhered is not particularly limited. For example, the assessment can use criteria that the pixel has a luminance difference of a predetermined range and that the travel distance within a predetermined time is less than a predetermined value, based on characteristics that the pixel values corresponding to foreign matter are lower than pixel values corresponding to a three-dimensional object and that the travel distance is small; or, the assessment can be based only on the characteristic that the travel distance is small. Then, the number of pixels that are assessed as having adhered foreign matter is counted. The adhesion amount of foreign matter at a certain time can be calculated based on the count value of the number of pixels that have been assessed as having adhered foreign matter at that time, and the adhesion ratio of foreign matter or the variation amount of the adhesion ratio of foreign matter at a certain time can be calculated from the count values of the number of pixels that are assessed as having adhered foreign matter at a plurality of different times.

Assessing the adhesion ratio of foreign matter (the adhesion ratio and the scattering degree of foreign matter on the lens 11 in the detection position; one measure of the adhesion degree; hereinafter the same), based on the distribution of pixels that are assessed as having adhered foreign matter at a certain time, is possible. The variation amount of the adhesion ratio of foreign matter can be further calculated based on the adhesion ratio of foreign matter at a plurality of different times. The method of calculating the adhesion ratio of foreign matter is not particularly limited, and, for example, the ratio occupied by the number of pixels assessed as having adhered foreign matter with respect to the total number of pixels can be defined as the adhesion ratio. In the example shown in FIG. 26A, the number of pixels assessed as having adhered foreign matter with respect to all the pixels 90 is 68; therefore, an assessment can be made that the adhesion ratio is around 76%. The unit pixel can be arbitrarily defined. This can be set so that the whole is configured from 90 unit pixels or so that the whole is configured from ten unit pixels, with nine pixels arranged 3×3 as one pixel unit, as shown in FIG. 26A. There is also the possibility of obtaining the adhesion ratio of foreign matter over time and calculating the variation amount of the adhesion ratio of foreign matter based on the adhesion ratio of foreign matter at a plurality of different times.

The first dispersion threshold in the present embodiment is a threshold value that is set based on the adhesion ratio of foreign matter or the variation amount of the adhesion ratio of foreign matter calculated by the adhesion state assessment unit 38 when the host vehicle V is traveling on a paved road without patterns on the road surface or a paved road without irregularities on the road surface in order to obtain the variation in the adhesion ratio of foreign matter (control value) in a reference state when traveling on a paved road where the effects of disturbance due to the state of the road surface has been eliminated. When an adhesion ratio of foreign matter or the variation amount of the adhesion ratio of foreign matter (dispersion variation amount) that is less than the first dispersion threshold is detected, a prediction can be made that the host vehicle V is traveling on, for example, a paved road, where the adhesion of sand and mud is less likely to occur. Specifically, an assessment can be made that there is a low likelihood of being in a state in which foreign matter with a small particle size, such as sand, adheres to the lens 11. Meanwhile, when an adhesion ratio of foreign matter or the variation amount of the adhesion ratio of foreign matter (dispersion variation amount) that is greater than the first dispersion threshold is detected, a prediction can be made that the host vehicle V is traveling on, for example, an unpaved road, where the adhesion of sand and mud is likely to occur.

The second dispersion threshold in the present embodiment is a threshold value that is set based on the adhesion ratio of foreign matter or the variation amount of the adhesion ratio of foreign matter calculated by the adhesion state assessment unit 38 when the host vehicle V is traveling on a paved road with patterns on the road surface or a paved road with irregularities formed on the road surface in order to eliminate the effects of disturbance due to patterns and the like on the road surface. Patterns on the road surface and irregularities on the road surface sometimes appear as an immobile image with a blurry outline in the captured image. Consequently, there are cases in which patterns on the road surface and irregularities on the road surface are determined to be foreign matter adhered to the lens 11. According to experimentation by the inventors, the adhesion ratio based on the pixels (detected as foreign matter) caused by patterns on the road surface or irregularities on the road surface is greater than the adhesion ratio of foreign matter or the variation amount of the adhesion ratio of foreign matter caused by the adhesion of fine sand. For this reason, when an adhesion ratio of foreign matter or the variation amount of the adhesion ratio of foreign matter that is greater than the second dispersion threshold is detected, a prediction can be made that the host vehicle V is traveling on a paved road with patterns on the road surface or a paved road with irregularities formed on the road surface. In addition, an assessment can be made that there is a low likelihood of being in a state in which foreign matter with a small particle size, such as sand, adheres to the lens 11. On the other hand, when an adhesion ratio of foreign matter or the variation amount of the adhesion amount of foreign matter that is less than the second dispersion threshold is detected, a prediction can be made that the host vehicle V is traveling on, for example, an unpaved road, where the adhesion of sand and mud is likely to occur, and that foreign matter of fine particles, such as sand, has adhered to the lens 11. Specifically, an assessment can be made that there is a likelihood of being in a state in which foreign matter with a small particle size, such as sand, adheres to the lens 11.

In this way, when the adhesion ratio of foreign matter or the variation amount of the adhesion ratio of foreign matter is within a predetermined threshold value of equal to or greater than the first dispersion threshold and less than the second dispersion threshold, which are preset, an assessment can be made that the state of adhered lens contamination 11 is in a first state, allowing for a distinction to be made between a state in which foreign matter of various sizes has adhered to the lens 11 and a first state in which fine particles (particles with a small particle size) have adhered to the lens 11 when traveling on a paved road without patterns or irregularities; at the same time, when traveling on a paved road with patterns or irregularities, there is the possibility of making a distinction between a state in which an image of these patterns or irregularities on the road surface is included in the captured image and a first state in which fine particles (particles with a small particle size) have adhered to the lens 11. As a result, accurately assessing the first state in which fine particles (particles with a small particle size) have adhered is possible.

The adhesion state assessment unit 38 of the present embodiment assesses that the state of adhered lens contamination 11 is in the second state when the adhesion ratio of foreign matter or the variation amount of the adhesion ratio of foreign matter is equal to or greater than the second dispersion threshold. The second state in the present embodiment is a state in which large particles (aggregates with a large particle size) have adhered to the lens 11, corresponding to the state shown in FIG. 21B. FIG. 26B illustrates a method for obtaining the adhesion amount of foreign matter based on the number of pixels extracted from the captured image shown in FIG. 21B. The description of the method for calculating the adhesion amount of foreign matter, the variation amount of the adhesion amount of foreign matter, the adhesion ratio of foreign matter, and the variation amount of the adhesion ratio of the foreign matter in the example shown in FIG. 26B is the same as the description for FIG. 26A; therefore, the description has been omitted, and the above description has been invoked. In the example shown in FIG. 26B, the number of pixels determined to have adhered foreign matter with respect to all the pixels 90 is 28; therefore, a determination can be made that the adhesion ratio of foreign matter is around 31%.

As described above, the second dispersion threshold is a threshold value that is set based on the adhesion ratio of foreign matter or the variation amount of the adhesion ratio of foreign matter detected when the host vehicle V is traveling on a paved road with patterns on the road surface or a paved road with irregularities formed on the road surface. According to experimentation by the inventors, the adhesion ratio of foreign matter or the variation amount of the adhesion ratio of foreign matter, when aggregated mud or the like has adhered to the lens 11 and depending on the size of the mass of the mud, tends to be greater than the adhesion ratio or the variation amount of the adhesion ratio of foreign matter that is detected due to patterns on the road surface or irregularities on the road surface. For this reason, in the present embodiment, the second dispersion threshold, which can be experimentally determined, is set as the reference value. When an adhesion ratio or a variation amount of the adhesion ratio that is equal to or greater than the second dispersion threshold is detected, a prediction can be made that the host vehicle is traveling on, for example, a muddy unpaved road, where foreign matter with a large particle size, such as aggregated mud, is likely to adhere. A third dispersion threshold that is greater than the second dispersion threshold can be separately defined in order to determine the second state of the adhered foreign matter. Both the adhesion ratio of foreign matter and the variation amount of the adhesion ratio of foreign matter are also defined for this third dispersion threshold.

FIG. 27 shows an example of the first dispersion threshold, the second dispersion threshold, a first dispersion amount or a first dispersion variation amount (variation amount of the adhesion ratio of foreign matter) that is detected in the first state, as well as a second dispersion amount or a second dispersion variation amount (variation amount of the adhesion ratio of foreign matter) that is detected in the second state. The drawing illustrates the adhesion ratio with respect to time continuously, but acquiring the adhesion ratio of foreign matter as discrete values at an arbitrary time is possible. When the adhesion amount of foreign matter is the trigger for starting the cleaning, the relationship of the adhesion ratio of foreign matter or the variation amount of the adhesion ratio of foreign matter at the time of exceeding the threshold value for starting the cleaning will be the second dispersion threshold R<first dispersion variation amount CL1 (first state)<second dispersion variation amount CL2 (second state)<second dispersion threshold Q or the second dispersion threshold R<first adhesion ratio (first state)<second adhesion ratio CL2 (second state)<second dispersion threshold Q, as shown in FIG. 27.

The controller 101 of the lens cleaning device 100 will be described next. The controller 101 of the lens cleaning device 100 of the present embodiment cleans the lens 11 when the adhesion degree of foreign matter that adheres to the lens 11 (including the adhesion amount, the variation in the adhesion amount, the adhesion ratio, and the variation in the adhesion ratio; hereinafter the same) is a predetermined threshold value or greater. The predetermined threshold value can be experimentally set based on the adhesion degree with which fine particles adhere to the lens when traveling on a dry, unpaved road, or the like.

In particular, the controller 101 of the lens cleaning device 100 of the present embodiment preferably delays the timing of supplying the cleaning fluid performed by the lens cleaning device 100 from the scheduled supply time by a predetermined time when an assessment has been made that the state of adhered lens contamination 11 is the first state.

Specifically, when an assessment has been made that the state of adhered lens contamination is the first state, the supply of the cleaning fluid is temporarily stopped, and cleaning is executed after a predetermined time has elapsed.

The trigger for the lens cleaning device 100 to execute the cleaning process of the present embodiment is not particularly limited; the lapse of a predetermined time can be used as the trigger, or the input of a start command by the driver may be used as the trigger. The controller 101 of the lens cleaning device 100 of the present embodiment starts the execution of the lens cleaning step when the adhesion degree of foreign matter that has adhered to the lens 11 as assessed by the adhesion state determination unit 38 is a predetermined value or greater.

As described above, the first state is a state in which fine particles (particles with a small particle size) have adhered to the surface of the lens 11. In this way, when the cleaning fluid is supplied to where fine particles (particles with a small particle size) such as sand have adhered to the surface of the lens 11, water is held between the fine particles, creating a mud state, making the removal of sand and the like from the surface of the lens 11 difficult. For this reason, when an assessment has been made that the state of adhered lens contamination is the first state, the supply time for the cleaning fluid is extended so that cleaning fluid is not supplied. Therefore, avoiding a situation in which the state of the lens contamination 11 deteriorates is possible even while conserving the used amount of cleaning fluid by not conducting cleaning that has a minimal effect on removing the dirt.

Figure 28A:
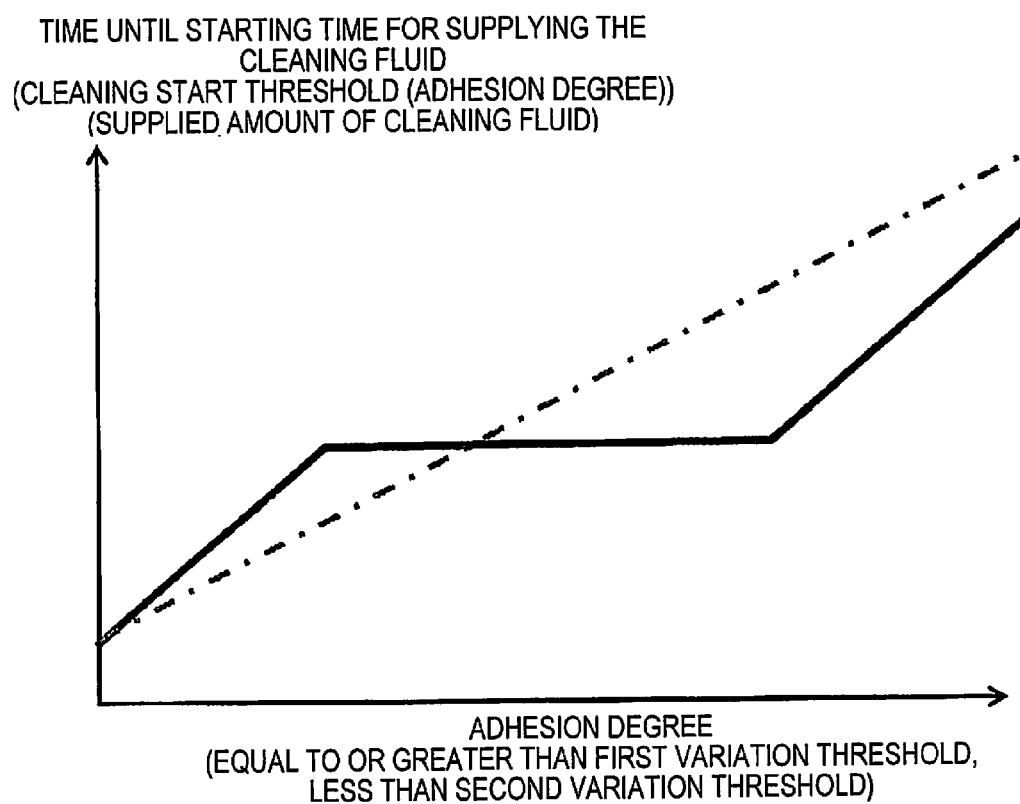
FIG. 28A is an illustration of an example of the relationship between the amount of variation in the adhesion amount of the foreign matter and the time until the starting time for supplying the cleaning fluid.

The controller 101 of the lens cleaning device 100 increases the supplied amount of the cleaning fluid, which is specified in the lens cleaning step, when an assessment has been made that the state of adhered lens contamination 11 is the first state. The supply of cleaning fluid comes from the lens cleaning device 100. FIG. 28A illustrates the relationship between the adhesion variation amount and the starting time for supplying the cleaning fluid. As shown in the drawing, the time until the starting time for supplying the cleaning fluid is extended as the adhesion variation amount increases. At this time, the threshold value for the adhesion degree as a trigger to start supplying the cleaning fluid can be changed to a large value as one method to extend the time until the starting time for supplying the cleaning fluid. Supplying the cleaning fluid is not conducted until the adhesion degree reaches the changed threshold value; as a result, extending the time until the starting time for supplying the cleaning fluid is possible. The specific relationship is not particularly limited and can be a stepped relationship shown by the solid line or a linear relationship shown by the dashed line.

Figure 28B:
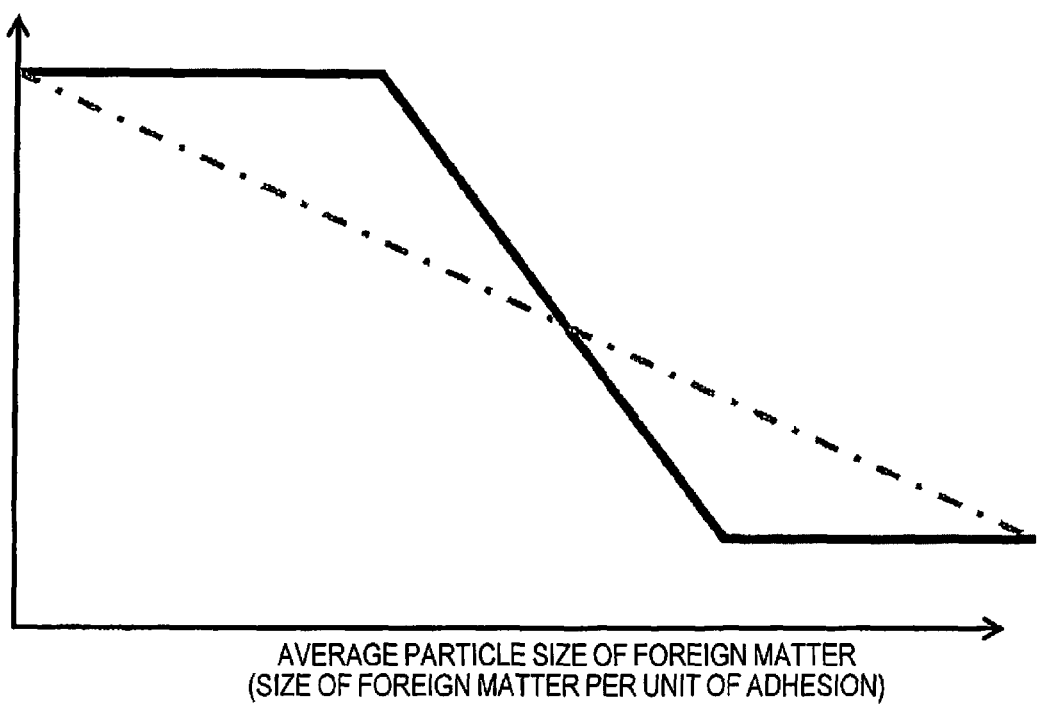
FIG. 28B is an illustration of example of the relationship between the average particle size of the foreign matter and the time until the starting time for supplying the cleaning fluid.

The variation amount of the adhesion amount of foreign matter and the variation amount of the adhesion ratio tend to increase as the particle size of the foreign matter gets smaller (the finer the foreign matter is). Consequently, according to the control of the present embodiment, extending the time until the starting time for supplying the cleaning fluid more is possible, the smaller the average particle size of foreign matter is, as shown in FIG. 28B. According to this control, delaying the supply time of the cleaning fluid when foreign matter with a small particle size has adhered is possible. As has already been described above, the threshold value for the adhesion degree (adhesion amount) as a trigger to start supplying the cleaning fluid can be changed to a large value as one method of extending the time until the starting time for supplying the cleaning fluid. The definition of the average particle size of the foreign matter is not particularly limited and can be the average value of the length, the width, and the thickness of a geometric circumscribed rectangle; or, this can be a three-axis diameter, a statistics diameter, an equivalent diameter, or a particle diameter belonging to another classification, a particle size according to a measurement method for a particle size stipulated in JIS Z8901, or the volume mean diameter such as the 50% cumulative particle diameter.

As described above, supplying a small amount of washing water in the first state where fine particles (particles with a small particle size) have adhered to the surface of the lens 11 would cause hardening. For this reason, supplying a large amount of cleaning fluid is preferable when the state of adhered lens contamination 11 is the first state. Even if in the first state in which fine particles (particles with a small particle size) have adhered to the surface of the lens 11, the fine particles, such as sand, adhered to the lens 11 can be efficiently removed by supplying a large amount of cleaning fluid.

The controller 101 of the lens cleaning device 100 of the present embodiment increases the supplied amount of the cleaning fluid as the variation amount of the adhesion degree of foreign matter increases, for example, the variation amount of the adhesion amount or the variation amount of the adhesion ratio. That is, the smaller the particle size of the foreign matter, the more the supplied amount of cleaning fluid is increased. An example of this relationship is shown in FIGS. 28A and 28B described above. Since smaller particle sizes of the foreign matter are more prone to agglomeration, there is the possibility of conserving the cleaning fluid while conducting an appropriate cleaning process that corresponds to the contamination situation by delaying the time for supplying the cleaning fluid when the particles are finer and washing by supplying the saved cleaning fluid at once.

The controller 101 of the lens cleaning device 100 of the present embodiment increases the supplied amount of the cleaning fluid as the variation amount of the adhesion degree of foreign matter increases. Because smaller particle sizes of the foreign matter are more prone to agglomeration, supplying a small amount of cleaning fluid would inhibit the removal of the foreign matter. For this reason, washing off the contamination by supplying a large amount of cleaning fluid at once is preferable when the variation amount of the adhesion degree of foreign matter increases and the particle size of the foreign matter decreases. In this way, removing foreign matter even if the particle size is small by supplying at once the cleaning fluid that was conserved by delaying the cleaning time is possible. Conserving the cleaning fluid while conducting an appropriate cleaning process that corresponds to the contamination situation by washing is possible by supplying a large amount of cleaning fluid.

Meanwhile, the controller 101 of the lens cleaning device 100 of the present embodiment advances the time to supply the cleaning fluid of the lens cleaning device 100 when an assessment is made that the state of adhered lens contamination 11 is the second state. In a state in which the variation amount of the adhesion degree of foreign matter is low and foreign matter with a large particle size, such as aggregates of mud and the like, has adhered to the lens 11, the foreign matter will not aggregate by supplying washing water as described above, and there is a high possibility that the foreign matter will be easily removed by supplying the washing water. For this reason, when the state of adhered lens contamination 11 is the second state, washing is conducted by advancing the time to supply the cleaning fluid. When aggregated foreign matter adheres to the lens 11, there is a possibility that a large portion of the lens 11 will be shielded; therefore, maintaining the accuracy of three-dimensional object detection by removing the above as quickly as possible is possible.

The controller 101 of the lens cleaning device 100 of the present embodiment increases the supplied amount of the cleaning fluid when an assessment is made that the state of adhered lens contamination 11 is the second state. Foreign matter with a large particle size, such as aggregates of mud and the like, can often be removed with a small amount of washing water. For this reason, when the state of adhered lens contamination 11 is the second state, washing is conducted by reducing the supplied amount of the cleaning fluid. Conserving the consumed amount of the cleaning fluid by reducing the supplied amount of cleaning fluid is possible while shortening the time until the cleaning fluid is supplied. The cycle for supplying the cleaning fluid can also be shortened, from the same point of view of shortening the time until the cleaning fluid is supplied.

The controller 101 of the lens cleaning device 100 of the present embodiment calculates the difference between the adhesion degree of foreign matter that has adhered to the lens 11 as assessed by the adhesion state determination unit 38, and the first adhesion threshold. When this difference is small, the actual measured adhesion degree of foreign matter will show a value that is close to the lower limit threshold value for determining the second state. Specifically, this means that the state adhered lens contamination 11 that is assessed based on the actual measured variation in the adhesion degree of foreign matter is closer to a state in which foreign matter has adhered when on a flat paved road without a pattern, determined as the reference, rather than the second state in which fine particles have adhered. For this reason, the adhesion state assessment unit 38 assesses that the reliability of the assessment result regarding the adhesion state of the foreign matter is low when the difference between the actual measured adhesion degree of foreign matter and the first adhesion threshold is small and sets the time to delay the supplying time of the cleaning fluid longer as the reliability is determined to be lower. If an assumption is made that the reliability of the assessment result is low, there is a high possibility that the state does not actually need cleaning, even if an assessment has been made that the state adhered lens contamination is the second state.

Similarly, the controller 101 of the lens cleaning device 100 of the present embodiment assesses that the reliability of the assessment result regarding the adhesion state of the foreign matter is low when the difference between the adhesion degree of foreign matter adhered to the lens 11 as assessed by the adhesion state assessment unit 38 and the second adhesion threshold is small and sets the time to further delay the supplying time of the cleaning fluid as the reliability is assessed to be lower. In the present embodiment, in this case, the cleaning process is not executed to conserve cleaning fluid. As a result, reducing the used amount of cleaning fluid is possible.

Figure 29:
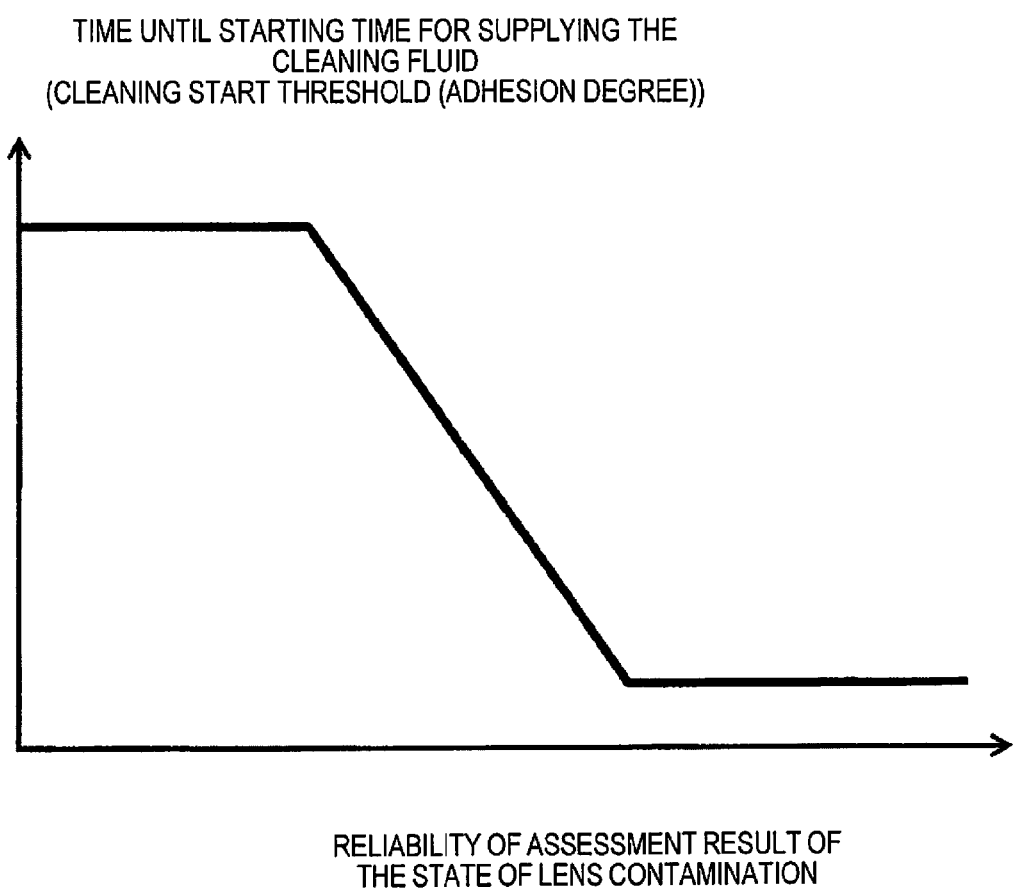
FIG. 29 is an illustration of an example of the relationship between the evaluation reliability of the state of the adhered lens contamination and the time until the starting time for supplying the cleaning fluid.

FIG. 29 shows an example of the relationship between the reliability of the assessment result of the state of adhered lens contamination 11 and the time for supplying the cleaning fluid. The specific line shape of the relationship can be experimentally set as appropriate.

The camera device 1000 of the present embodiment starts supplying cleaning fluid in a state in which the host vehicle V has escaped from an environment in which foreign matter of fine particles would adhere in order to efficiently consume the cleaning fluid. The cleaning fluid is supplied to the lens 11 when the host vehicle V has moved from an unpaved road, where the road surface is sandy or the like, to a paved road.

Figure 30:
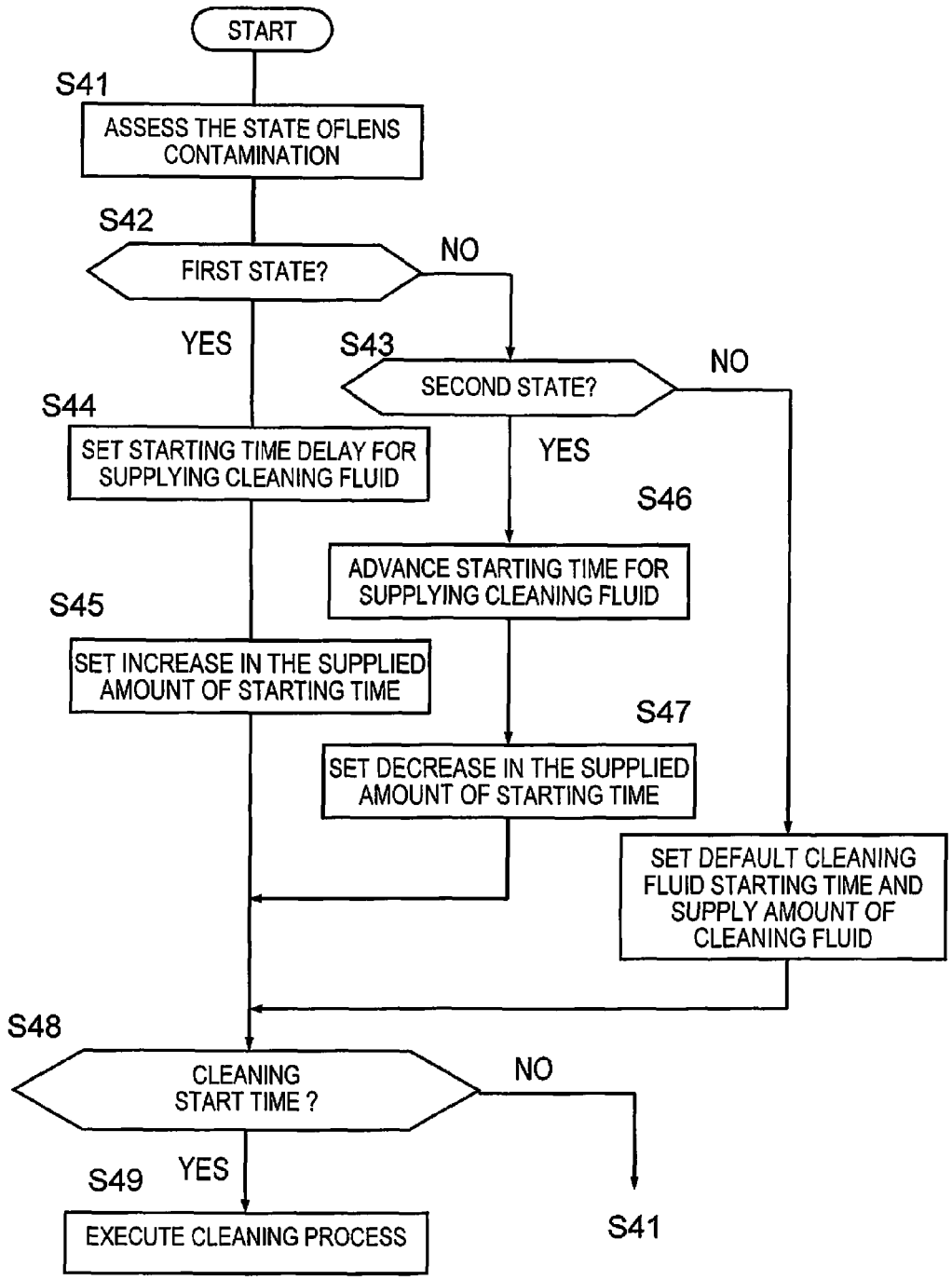
FIG. 30 is a flowchart illustrating the control procedure of the camera device according to the present embodiment of the present invention.

The lens 11 cleaning process of the camera device 1000 of the present embodiment will be explained based on the flowchart in FIG. 30. When the process is started, the adhesion state assessment unit 38 assesses the adhesion state based on the adhesion degree of foreign matter that has adhered to the lens in step S41, as shown in FIG. 30. In step S42, the adhesion state assessment unit 38 continues to step S42 when the variation amount of the adhesion degree of foreign matter that is calculated in real time is within a predetermined threshold value of equal to or greater than the first adhesion threshold and less than the second adhesion threshold, which are preset, and assesses that the state of adhered lens contamination 11 is the first state. That is, a state in which foreign matter of fine particles, such as sand, has adhered to the surface of the lens 11 is assessed. In step S42, when the variation amount of the adhesion degree of foreign matter is not within the predetermined threshold value of equal to or greater than the first adhesion threshold and less than the second adhesion threshold, which are preset, but the variation amount of the adhesion degree of foreign matter is equal to or greater than the second adhesion threshold, the process transitions to step S43, and an assessment is made that the state of adhered lens contamination 11 is the second state. That is, a state in which foreign matter with a relatively large volume, such as mud, has adhered to the surface of the lens 11 is assessed.

Specifically, when the adhesion degree of foreign matter is the adhesion amount of foreign matter, in step S42, the adhesion state assessment unit 38 transitions to step S42 when the variation amount of the adhesion amount of foreign matter that is calculated in real time is within a predetermined threshold value of equal to or greater than the first adhesion threshold and less than the second adhesion threshold, which are preset, and assesses that the state of adhered lens contamination 11 is the first state. In step S42, when the variation amount of the adhesion amount of foreign matter is not within the predetermined threshold value of equal to or greater than the first adhesion threshold and less than the second adhesion threshold, which are preset, but the variation amount of the adhesion amount of foreign matter is equal to or greater than the second adhesion threshold, the process transitions to step S43, and an assessment is made that the state of adhered lens contamination 11 is the second state.

When the adhesion degree of foreign matter is the adhesion ratio of foreign matter, in step S42, the adhesion state assessment unit 38 transitions to step S42 when the dispersion degree of foreign matter or the variation amount of the dispersion degree of foreign matter that is calculated in real time is within a predetermined threshold value of equal to or greater than the first dispersion threshold and less than the second dispersion threshold, which are preset, and assesses that the state of adhered lens contamination 11 is the first state. In step S42, when the dispersion degree of foreign matter or the variation amount of the dispersion degree of foreign matter is not within the predetermined threshold value of equal to or greater than the first dispersion threshold and less than the second dispersion threshold, which are preset, but the dispersion degree of foreign matter or the variation amount of the dispersion degree of foreign matter is equal to or greater than the second dispersion threshold, the process transitions to step S43, and an assessment is made that the state of adhered lens contamination 11 is the second state.

When the variation amount of the adhesion degree of foreign matter is less than the first threshold value, an assessment is made that the host vehicle is likely traveling on a paved road; when the variation amount of the adhesion degree of foreign matter is equal to or greater than the second threshold value or is equal to or greater than a separately set third threshold value, which is greater than the second threshold value, an assessment is made that patterns or irregularities on the road surface are likely being detected, and the default starting time for supplying the cleaning fluid and the default supplied amount of cleaning fluid are not changed.

Specifically, when the adhesion degree of foreign matter is the adhesion amount of foreign matter, when the variation amount of the adhesion amount of foreign matter is less than the first threshold value, an assessment is made that the host vehicle is likely traveling on a paved road; when the variation amount of the adhesion amount of foreign matter is equal to or greater than the second threshold value or is equal to or greater than a separately set third threshold value, which is greater than the second threshold value, an assessment is made that patterns or irregularities on the road surface are likely being detected, and the default starting time for supplying the cleaning fluid and the default supplied amount of cleaning fluid are not changed.

When the adhesion degree of foreign matter is the adhesion ratio of foreign matter, when the adhesion ratio (dispersion degree) of foreign matter or the variation amount of the adhesion ratio of foreign matter is less than the first threshold value, an assessment is made that the host vehicle is likely traveling on a paved road; when the dispersion degree of foreign matter or the variation amount of the adhesion degree of foreign matter is equal to or greater than the second threshold value or is equal to or greater than a separately set third threshold value, which is greater than the second threshold value, an assessment is made that patterns or irregularities on the road surface are likely being detected, and the default starting time for supplying the cleaning fluid and the default supplied amount of cleaning fluid are not changed.

When an assessment is made that the state of adhered lens contamination 11 is the first state, the process transitions to step S44, and the time to start supplying the cleaning fluid is delayed. This delay may be a delay of the starting time of a predetermined cleaning step that is defined in advance, or the time F1 that is set by the supply of cleaning fluid shown in FIG. 23 can be extended. The process then transitions to step S45, and the supplied amount of cleaning fluid is increased.

When an assessment is made that the state of adhered lens contamination 11 is the second state, the process transitions to step S46, and the time to start supplying the cleaning fluid is advanced (expedited). This process may be an advancement of the starting time of a predetermined cleaning step that is defined in advance, or the time F1 that is set by the supply of cleaning fluid shown in FIG. 23 can be shortened. The process then transitions to step S47, and the supplied amount of cleaning fluid is decreased.

Next, in step S48, when a traveling path state assessment unit 41 mentioned hereafter determines that the traveling path on which the host vehicle V travels is a paved road, the process transitions to step S48, the state in which the suspended supply of cleaning fluid is released, and cleaning fluid is supplied to the lens 11.

Next, the time for releasing the suspension of the supply of the cleaning fluid is assessed from the traveling state of the host vehicle V. Specifically, the camera device 1000 of the present embodiment is provided with a traveling path state assessment unit 41 for assessing whether the traveling path on which the host vehicle V travels is a paved road or an unpaved road. Then, the controller 101 of the lens cleaning device 100 supplies cleaning fluid to the lens 11. Next, when the traveling path state assessment unit 41 assesses that the traveling path on which the host vehicle V travels is a paved road. In this way, when an assessment is made that the host vehicle V is traveling on a paved road after an assessment has been made that the state of lens contamination 11 is the first state, there is a low likelihood that fine particles, such as sand, will further adhere to the lens 11. When traveling on an unpaved road on which sand or the like is present when cleaning fluid is supplied to the lens 11, sand will stick to the cleaning fluid on the lens 11. Sand in this state will aggregate and is not easy to remove. For this reason, in the present embodiment, cleaning fluid is supplied to the lens 11 after the host vehicle V has traveled on a paved road. Sand and the like adhering again on the lens 11 due to the supplied cleaning fluid can thereby be prevented, and effectively cleaning the lens 11 is possible.

The traveling path state assessment unit 41 of the present embodiment assesses whether the traveling path on which the host vehicle V travels is a paved road or an unpaved road, based on the traveling information acquired by the vehicle. Since "unpaved road" and "paved road" are used in the present embodiment is a classification based on the possibility of splashing mud while traveling, a road with a surface covered by asphalt or concrete and snow, mud, or sand is also considered to be "unpaved road," even if the road has been treated with pavement. That is, both paved roads and unpaved roads include roads that have an asphalt or concrete layer. The methods of assessing whether the traveling path is a paved road or an unpaved road will be described hereafter in that order.

In a first determination method, focusing on the point that, in general, white lines for distinguishing lanes are displayed (visible) on a paved road and that such white lines are not displayed (not visible) on an unpaved road, an assessment is made regarding whether the traveling path is a paved road based on whether or not the extraction of a white line from the captured image of the camera 10 is possible.

The traveling path state assessment unit 41 of the present embodiment extracts the white line information that is displayed on the road surface from the image acquired by the camera 10; when white line information is extracted, an assessment is made that the traveling path on which the host vehicle V travels is a paved road; and when white line information is not extracted, an assessment is made that the traveling path on which the host vehicle V travels is an unpaved road. Here, a method known at the time of the application can be used for the white line extraction or white line detection.

According to the present method, the state of the traveling path is estimated, and the properties and behavior of the foreign matter adhered to the lens 11 can be predicted according to the extraction availability of white line information; therefore, appropriately conducting a foreign matter detection process and a three-dimensional object detection process is possible.

In a second determination method, focusing on the point that, in general, when a vehicle travels on a paved road, there is no variation in the wheel speed of each wheel provided to the vehicle V and that each wheel will display a common wheel speed within a predetermined range, an assessment is made regarding whether the traveling path is a paved road based on the degree of variation in the wheel speed of the vehicle V.

The traveling path state assessment unit 41 of the present embodiment acquires each wheel speed from a plurality of wheels provided to the host vehicle V; when the variation in each of the plurality of acquired wheel speeds is less than a predetermined value, an assessment is made that the traveling path on which the host vehicle V travels is a paved road; when the variation in the plurality of acquired wheel speeds is equal to or greater than the predetermined value, an assessment is made that the traveling path on which the host vehicle V travels is an unpaved road. The wheel speed of each wheel is detected by a vehicle speed sensor 20 and is acquired directly or via the vehicle controller 100.

As a method for determining the degree of variation in each wheel speed, an assessment is made that the traveling path is a paved road when the difference between the front wheel speed and the rear wheel speed is less than a predetermined value; and, when the difference between the front wheel speed and the rear wheel speed is equal to or greater than the predetermined value, an assessment is made that the traveling path is a paved road. Or, an assessment is made that the traveling path is a paved road when the difference between the right-side wheel speed and the left-side wheel speed is less than a predetermined value, and an assessment is made that the traveling path is a paved road when the difference between the right-side wheel speed and the left-side wheel speed is equal to or greater than the predetermined value. In the present embodiment, this assessment is performed when not turning. The above is because the wheel speed of each wheel is different when turning. The method for comparing the wheel speeds, that is, the determination method for the degree of variation, is not particularly limited; however, in the present embodiment, information regarding the wheel speed with respect to the time is acquired for each wheel, signal processing is performed using a low-pass filter for each piece of information, and the positions and values of the wheel speed peak after smoothing are compared; thus, a variation in the speed of each wheel is evaluated.

According to the present method, the state of the traveling path is estimated, and the properties and behavior of the foreign matter adhered to the lens 11 can be predicted according to the variation in the wheel speed; therefore, appropriately conducting a foreign matter detection process and a three-dimensional object detection process is possible.

In a third determination method, focusing on the point that, in general, when a vehicle travels on a paved road, the frequency with which sliding, the slipping of the tires, and skidding occur is relatively low; however, when a vehicle travels on an unpaved road, the frequency with which sliding, the slipping of the tires, and skidding occur is relatively high; therefore, an assessment is made regarding whether the traveling path is a paved road based on the presence/absence of the activation of or the number of times of activation of a sliding prevention device, a skidding prevention device, or a tire slippage prevention device with which the host vehicle V is equipped.

A three-dimensional object detection device 1 of the present embodiment acquires operation information from an ABS (Anti-locked Braking System) device 300, as a sliding prevention device, regarding the operation thereof, acquires operation information from a TCS (Traction Control System) device 400 regarding the operation thereof, and acquires operation information from a VDC (Vehicle Dynamics Control) device 500, as a slippage prevention device, regarding the operation thereof. Each piece of operation information can be directly acquired from each device or via the vehicle controller 100. Each device will be described here.

The ABS device 300 of the present embodiment is a device for maintaining the traveling safety of the vehicle and for increasing the possibility of avoiding an obstacle by steering by preventing the tire from locking (stopping rotation) when braking suddenly or braking on a low-friction road. The ABS device of the present embodiment optimally controls the brakes based on the wheel speed information that has been detected by a vehicle speed sensor 20 that is attached to each wheel axle. Another device provided with a sliding prevention mechanism can also be used.

The TCS device 400 prevents the wheels from slipping when starting/accelerating the vehicle. The TCS device 400 detects the slipping of the wheels based on the speed of the host vehicle and the wheel speed of each wheel and eliminates the slipping state by reducing the drive force that is transmitted from the engine. The present device increases the stability of the vehicle position when the friction coefficient between the road surface and the tire is reduced on an unpaved road, such as a muddy road or a road during snow or after snow. Besides the TCS device 400, another device provided with a slippage prevention mechanism, such as a TRC (Traction Control) or a TCL (Traction Control), can be used as the slippage prevention device.

The VDC device 500 of the present embodiment automatically controls the brake and engine output, based on the driving operation and the vehicle speed of the host vehicle V, and reduces skidding of the car when turning a curve or avoiding an obstacle on a slippery road surface, such as a mud road, or a road during snow or after snow. Besides the VDC device 500, another device provided with a skidding prevention mechanism, such as an ESC device, can be used as the skidding prevention device. With this ESC device, there are cases in which skidding of the rear wheel (over steering) or skidding of the front wheel (under steering) occurs when turning a curve or avoiding an obstacle on a slippery road surface, such as a mud road, or a road during snow or after snow. In this case, the vehicle position during turning is stabilized by preventing skidding with a brake control using automatic pressurization or controlling the engine torque according to the detected vehicle behavior.

The traveling path state assessment unit 41 of the present embodiment acquires information relating to the operation of the ABS device 300, the TCS device 400, or the VDC device 500; when the number of times of operation or the operation frequency is less than a predetermined value, an assessment is made that the traveling path on which the host vehicle V travels is a paved road, and information relating to the operation of the ABS device 300, the TCS device 400, or the VDC device 500 is acquired; and when the number of times of operation or the operation frequency is equal to or greater than the predetermined value, an assessment is made that the traveling path on which the host vehicle V travels is an unpaved road.

According to the present method, the state of the traveling path is estimated, and the properties and behavior of the foreign matter adhered to the lens 11 can be predicted based on the operation information of the ABS device 300, the TCS device 400, or the VDC device 500, which control the vehicle when the vehicle position has been disturbed; therefore, appropriately conducting a foreign matter detection process and a three-dimensional object detection process is possible.

As a fourth determination method, there is the possibility of specifying the current position and the traveling path of the host vehicle V with a navigation device 200 and determining whether the traveling path of the host vehicle V is a paved road or an unpaved road, with reference to the road information included in the map information provided to the navigation device 200. Furthermore, when the current position of the host vehicle V is specified by the navigation device 200 and the stopped position of the host vehicle V corresponds to an intersection position provided in the map information, an assessment is made that the traveling path on which the host vehicle V travels is a paved road. The map information that is accessible by the navigation device 200 of the present embodiment is associated with road attribute information regarding whether each road is a paved road or an unpaved road, as well as being intersection positions and position specifying information (latitude/longitude). The road attribute information and intersection information described above can also be acquired via a communication device provided to the navigation device 200.

Final Three-Dimensional Object Assessment

Returning to FIG. 3, the three-dimensional object detection device 1 of the present example is provided with the two three-dimensional object detection units 33 (or three-dimensional object detection unit 37) described above, a three-dimensional object assessment unit 34, an adhesion state assessment unit 38, and a controller 39. The three-dimensional object assessment unit 34 makes a final assessment of whether a detected three-dimensional object is another vehicle VX present in the detection areas A1, A2, based on the results detected by the three-dimensional object detection units 33 (or three-dimensional object detection unit 37). The three-dimensional object detection units 33 (or the three-dimensional object detection unit 37) and the three-dimensional object assessment unit 34 detect a three-dimensional object reflecting the assessment results from the adhesion state assessment unit 38 according to commands from the controller 39.

The three-dimensional object assessment unit 34 will be described. The three-dimensional object assessment unit 34 makes a final assessment of whether a three-dimensional object detected by the three-dimensional object detection units 33, 37 is another vehicle VX present in the detection areas A1, A2. Specifically, the three-dimensional object assessment unit 34 finds that a three-dimensional object is another vehicle VX present in the detection areas A1, A2, if the three-dimensional object detection results yielded by the three-dimensional object detection units 33, 37 continue over a predetermined length of time T. Although there is no particular limitation either way, the three-dimensional object assessment unit 34 can make a final assessment of whether the three-dimensional object is another vehicle VX present in the detection areas A1, A2 if the number of peaks, the peak values, the traveling speed and the like of the differential waveform extracted from the differential waveform information are within a predetermined range, and that state continues for a predetermined length of time or longer, or to make a final assessment of whether or not the three-dimensional object is another vehicle VX present in the detection areas A1, A2, if the continuity, the normalized values of the sum, the edge line amount and the like of the edges extracted from the edge information are within a predetermined range, and that the state continues for a predetermined length of time or longer.

When the three-dimensional object detected by the three-dimensional object detection units 33, 37 is continuously detected for a predetermined length of time or longer, the three-dimensional object assessment unit 34 of the present embodiment assesses that the three-dimensional object is another vehicle VX present in the right-side detection area or the left-side detection area.

When the detected three-dimensional object is found to be another vehicle VX present in the detection areas A1, A2, the three-dimensional object assessment unit 34 executes a process such as notifying a passenger. The three-dimensional object assessment unit 34 is capable of suppressing identification of three-dimensional objects as other vehicles VX according to control commands from the controller 39. The controller 39 generates control commands according to the assessment results yielded by the adhesion state assessment unit 38.

If the adhesion degree of foreign matter adhered to the lens 11 assessed by the adhesion state assessment unit 38 is a predetermined value or greater, the controller 39 suppresses the detection of a three-dimensional object, and this three-dimensional object is assessed as being another vehicle VX.

The control command of the present embodiment is sent to the three-dimensional object detection units 33, 37 and the three-dimensional object assessment unit 34 in order to prevent misidentifying the detected three-dimensional object as another vehicle VX. Since the computer 30 of the present embodiment is a computer, the control commands, with respect to the three-dimensional object detection process, the three-dimensional object assessment process, and the adhesion state assessment process, can be embedded in the program for each process in advance or can be sent at the time of execution.

The controller 39 variations each of the threshold values used for each of the processes to be higher than the initial value, the standard value, and other set values (so that detection will be less likely) or variations the output value that is compared with each of the threshold values to be lower (so that detection will be less likely) in order to prevent a three-dimensional object from being detected by the three-dimensional object detection units 33, 37 or a three-dimensional object from being assessed as another vehicle by the three-dimensional object assessment unit 34. When the controller 39 conducts a promotion process, the promotion process becomes a control for the suppression process and assessment.

The specific contents of the process are as follows.

When the three-dimensional object detection unit 33, which detects a three-dimensional object using differential waveform information, detects a three-dimensional object when the differential waveform information is at a predetermined first threshold value $\alpha$ or greater, the controller 39 generates a control command for increasing the first threshold value $\alpha$, so that the three-dimensional object is not readily detected, and outputs this control command to the three-dimensional object detection unit 33 when the adhesion degree of foreign matter adhered to the lens 11 is assessed as being a predetermined value or greater.

Similarly, when the three-dimensional object detection unit 33 detects a three-dimensional object when the differential waveform information is at a predetermined first threshold value $\alpha$ or greater, the controller 39 generates a control command for decreasing and outputting a value obtained by counting the number of pixels that indicate a predetermined difference in the differential image of the bird's-eye view image and formed into a frequency distribution and outputs this control command to the three-dimensional object detection unit 38 when the adhesion degree of foreign matter adhered to the lens 11 is assessed as being a predetermined value or greater.

In addition, when the three-dimensional object detection unit 33, which detects a three-dimensional object using differential waveform information, extracts the number of pixels that indicate a pixel value at a threshold value p or greater as a number of pixels that indicate a predetermined difference, the controller 39 generates a control command for increasing the threshold value p, so that the three-dimensional object is not readily detected, and outputs this control command to the three-dimensional object detection unit 38 when the adhesion degree of foreign matter adhered to the lens 11 is assessed as being a predetermined value or greater.

Similarly, when the three-dimensional object detection unit 33 extracts the number of pixels that indicate a pixel value at a threshold value p or greater as a number of pixels that indicate a predetermined difference, the controller 39 generates a control command for decreasing and outputting the number of pixels extracted on the differential image along the collapsing direction of a three-dimensional object when the viewpoint of the bird's-eye view image is converted and outputs this control command to the three-dimensional object detection unit 37 when the adhesion degree of foreign matter adhered to the lens 11 is assessed as being a predetermined value or greater. For example, the controller 39 partially masks the detection areas A1, A2 or adjusts the threshold value or output value used for detection and assessment in order to suppress a detection result by the three-dimensional object detection units 33 (or the three-dimensional object detection unit 37) that a three-dimensional object is present or an assessment result by the three-dimensional object assessment unit 34 that the three-dimensional object is ultimately another vehicle VX.

When the three-dimensional object detection unit 37, which detects a three-dimensional object using edge information, extracts an edge line based on pixels that indicate a luminance difference of a predetermined threshold value t or more, the controller 39 generates a control command for increasing the predetermined threshold value t so that the three-dimensional object is not readily detected and outputs this control command to the three-dimensional object detection unit 37 when the adhesion degree of foreign matter adhered to the lens 11 is assessed as being a predetermined value or greater.

Similarly, when the three-dimensional object detection unit 37, which detects a three-dimensional object using edge information, extracts an edge line based on pixels that indicate a luminance difference of a predetermined threshold value t or more, the controller 39 generates a control command for decreasing and outputting the luminance value of the pixels and outputs this control command to the three-dimensional object detection unit 37 when the adhesion degree of foreign matter adhered to the lens 11 is assessed as being a predetermined value or greater.

When the three-dimensional object detection unit 37, which detects a three-dimensional object using edge information, detects a three-dimensional object based on an edge line having a length of a threshold value θ included in the edge information or longer, the controller 39 generates a control command for increasing the threshold value θ so that the three-dimensional object is not readily detected and outputs this control command to the three-dimensional object detection unit 37 when the adhesion degree of foreign matter adhered to the lens 11 is assessed as being a predetermined value or greater.

Similarly, when the three-dimensional object detection unit 37, which detects a three-dimensional object using edge information, detects a three-dimensional object based on an edge line having a length of a threshold value θ included in the edge information or longer, the controller 39 generates a control command for decreasing and outputting the value of the length of the edge line of the detected edge information and outputs this control command to the three-dimensional object detection unit 37 when the adhesion degree of foreign matter adhered to the lens 11 is assessed as being a predetermined value or greater.

When the three-dimensional object detection unit 37, which detects a three-dimensional object using edge information, detects a three-dimensional object based an assessment of whether the number of edge lines included in the edge information that are a predetermined length or longer, for example of the edge lines having a length of a threshold value θ or longer, is at a second threshold value β or greater, the controller 39 generates a control command for increasing the second threshold value β so that the three-dimensional object is not readily detected and outputs this control command to the three-dimensional object detection unit 37 when the adhesion degree of foreign matter adhered to the lens 11 is assessed as being a predetermined value or greater.

When the three-dimensional object detection unit 37, which detects a three-dimensional object using edge information, detects a three-dimensional object based an assessment of whether the number of edge lines included in the edge information that are a predetermined length or longer, for example of the edge lines having a length of a threshold value θ or greater, is at a second threshold value β or greater, the controller 39 generates a control command for decreasing and outputting the number of detected edge lines that are a predetermined length or longer and outputs this control command to the three-dimensional object detection unit 37 when the adhesion degree of foreign matter adhered to the lens 11 is assessed as being a predetermined value or greater.

In addition, when the traveling speed of the detected three-dimensional object is a predetermined speed that is preset or greater and the three-dimensional object assessment unit 34 assesses that this three-dimensional object is another vehicle, the controller 39 generates a control command for increasing the predetermined speed, which becomes the lower limit when assessing that a three-dimensional object is another vehicle, so that the three-dimensional object is not readily detected, and outputs this control command to the three-dimensional object assessment unit 34 when the adhesion degree of foreign matter adhered to the lens 11 is assessed as being a predetermined value or greater.

Similarly, when the traveling speed of the detected three-dimensional object is a predetermined speed that is preset or greater and the three-dimensional object assessment unit 34 assesses that this three-dimensional object is another vehicle, the controller 39 generates a control command for decreasing and outputting the traveling speed of the three-dimensional object that is compared with the predetermined speed, which becomes the lower limit when assessing that a three-dimensional object is another vehicle, and outputs this control command to the three-dimensional object assessment unit 34 when the adhesion degree of foreign matter adhered to the lens 11 is assessed as being a predetermined value or greater.

In addition, when the traveling speed of the detected three-dimensional object is less than a predetermined speed that is preset and the three-dimensional object assessment unit 34 assesses that this three-dimensional object is another vehicle, the controller 39 generates a control command for decreasing the predetermined speed, which becomes the upper limit when assessing that a three-dimensional object is another vehicle, and outputs this control command to the three-dimensional object assessment unit 34 when the adhesion degree of foreign matter adhered to the lens 11 is assessed as being a predetermined value or greater.

Similarly, when the traveling speed of the detected three-dimensional object is less than a predetermined speed that is preset and the three-dimensional object assessment unit 34 assesses that this three-dimensional object is another vehicle, the controller 39 generates a control command for increasing the traveling speed of the three-dimensional object that is compared with the predetermined speed, which becomes the upper limit when assessing that a three-dimensional object is another vehicle, and outputs this control command to the three-dimensional object assessment unit 34 when the adhesion degree of foreign matter adhered to the lens 11 is assessed as being a predetermined value or greater.

Here, the "traveling speed" includes the absolute speed of the three-dimensional object, as well as the relative speed of the three-dimensional object in relation to the host vehicle. The absolute speed of the three-dimensional object may be calculated based on the relative speed of the three-dimensional object, or the relative speed of the three-dimensional object may be calculated based on the absolute speed of the three-dimensional object.

The controller procedure of the three-dimensional object detection device 1 of the present embodiment will be described hereafter, based on the flowchart in FIG. 31.

Figure 31:
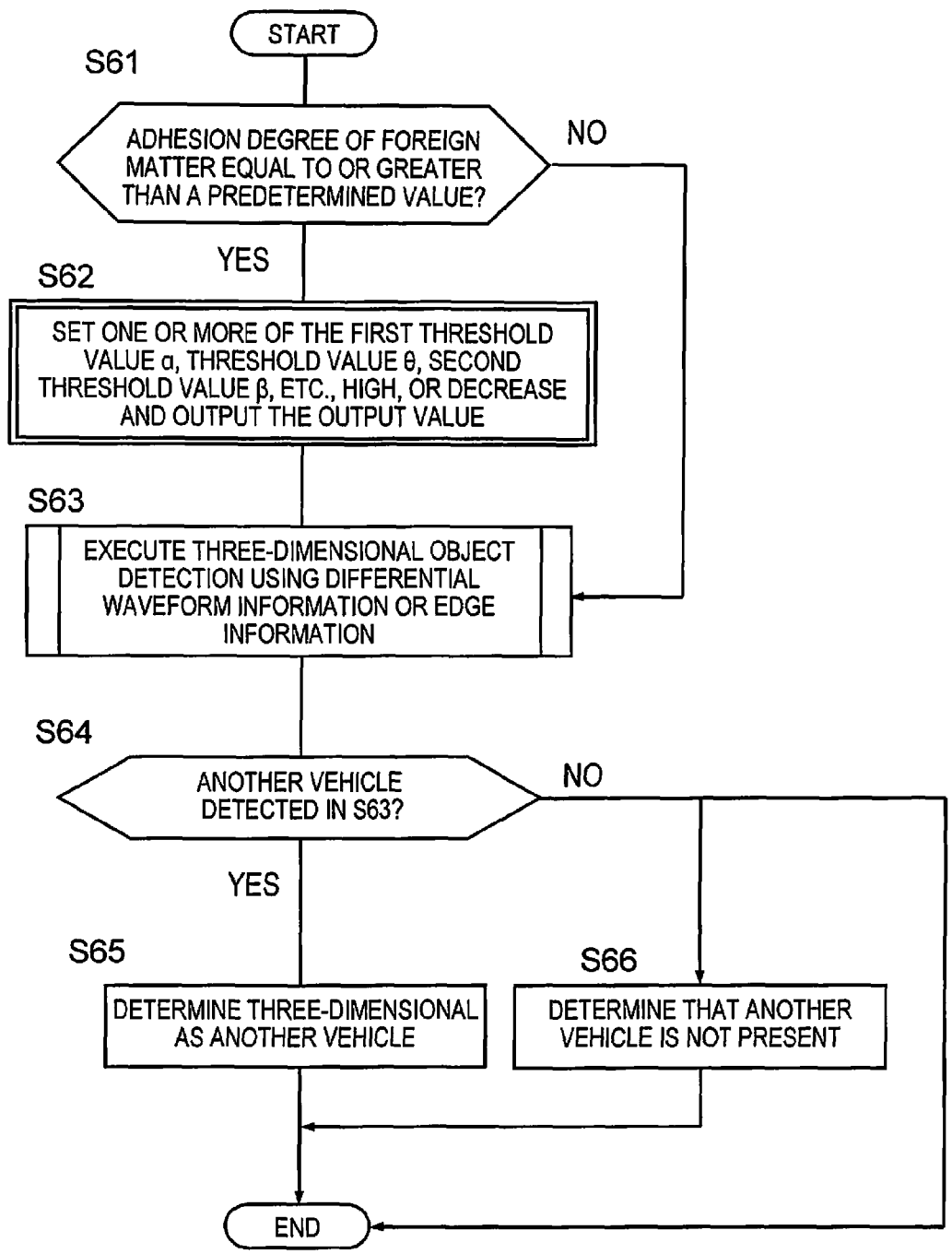
FIG. 31 is a flowchart illustrating the control procedure of the process for detecting another vehicle utilizing the three-dimensional object detection device according to the present embodiment of the present invention.

First, the adhesion state assessment unit 38 assesses whether the adhesion degree of foreign matter adhered to the lens 11 is a predetermined amount or more in step S61 shown in FIG. 31. The threshold value "predetermined amount," which is set in order to assess whether to conduct the suppressing process of the detection of the three-dimensional object, is set as a value for determining whether enough foreign matter has adhered to impair the accuracy of the three-dimensional object detection process.

If the adhesion degree of foreign matter adhered to the lens 11 is a predetermined value or greater, the process transitions to step S62, the various threshold values used for three-dimensional object detection are increased, and the output values that are compared with the various threshold values are decreased and outputted.

The first threshold value α is for determining the peak of the differential waveform $DW_t$ in step S7 in FIG. 11. The threshold value θ is a threshold value for assessing a value (length of edge) obtained by normalizing the sum of the continuity c of the attributes of each attention point Pa in step S29 in FIG. 17, and the second threshold value β is a threshold value for evaluating the quantity (number) of edge lines in step S34 in FIG. 18. By increasing the threshold value for assessment in this way, the detection sensitivity can be adjusted so that another vehicle VX traveling adjacent to the traveling lane of the host vehicle V is less likely to be detected; therefore, preventing the misidentification of a foreign matter adhered to the lens 11 as another vehicle VX is possible.

The controller 39 according to the present embodiment outputs to the three-dimensional object detection unit 33 a control command for decreasing and outputting a value obtained by counting the number of pixels that indicate a predetermined difference in the differential image of the bird's-eye view image and formed into a frequency distribution. A value obtained by counting the number of pixels that indicate a predetermined difference in the differential image of the bird's-eye view image and formed into a frequency distribution is a value on the vertical axis of the differential waveform $DW_t$ generated in step S5 in FIG. 11.

In addition, the controller 39 according to the present embodiment outputs to the three-dimensional object detection unit 37a control command for decreasing and outputting the detected edge information. The detected edge information is the length of the edge line, which is a value obtained by normalizing the sum of the continuity c of the attributes of each attention point Pa in step S29 in FIG. 17, as well as the quantity of edge lines in step S34 in FIG. 18. The controller 39 decreases the value obtained by normalizing the sum of the continuity c of the attributes of each attention point Pa or the edge line amount, so that a three-dimensional object is not readily detected in the subsequent process and so that the foreign matter adhered to the lens 11 is not detected as a three-dimensional object when the adhesion degree of foreign matter adhered to the lens 11 is assessed as being a predetermined value or greater. By lowering the output value in this way, the detection sensitivity can be adjusted so that another vehicle VX traveling adjacent to the traveling lane of the host vehicle V is less likely to be detected; therefore, preventing the misdetection of a foreign matter adhered to the lens 11 as another vehicle VX traveling in the adjacent lane is possible.

When a three-dimensional object (another vehicle) is detected based on the differential waveform information or the edge information in the subsequent step S63, and an assessment is made regarding whether the three-dimensional object detected in step S63 is another vehicle VX in step S64, and if the three-dimensional object is another vehicle VX, an assessment result that another vehicle is present is outputted in step S65; and, if the three-dimensional object is not another vehicle VX, an assessment result that another vehicle is not present is outputted in step S66. The processes in step S63 and step S64 are common with the detection process for another vehicle VX, based on differential waveform information described above in FIGS. 11 and 12, and the detection process for another vehicle VX based on the edge information similarly described in FIGS. 17 and 18. When a three-dimensional object is not detected in step S64, the assessment is that another vehicle is not present, or the process for detecting a three-dimensional object can be ended.

The following effects are obtained according to the camera device 1000, the three-dimensional object detection device 1, and the lens cleaning method according to the present embodiment of the present invention, which are configured to operate in the way described above.

(1) According to the camera device 1000 of the present embodiment, when the state of adhered lens contamination is assessed as being the first state, the supplying time for the cleaning fluid is extended so that the cleaning fluid is not supplied; therefore, avoiding a situation in which water is held between fine particles creating a muddy state is possible, and removing sand and the like from the surface of the lens 11 becomes difficult while conserving the used amount of cleaning fluid by omitting a cleaning step that has a low effect on removing dirt.

(2) According to the camera device 1000 of the present embodiment, even when in the first state in which fine particles (particles with a small particle size) have adhered to the surface of the lens 11, the fine particles, such as sand, adhered to the lens 11 can be efficiently removed by supplying a large amount of cleaning fluid.

(3) According to the camera device 1000 of the present embodiment, cleaning by further delaying the time for supplying the cleaning fluid is possible as the particles become finer by increasing the time for delaying the supplying time of the cleaning fluid as the variation amount of the adhesion degree of the foreign matter increases. As a result, conserving the cleaning fluid while conducting an appropriate cleaning process that corresponds to the contamination situation is possible.

(4) According to the camera device 1000 of the present embodiment, washing off the contamination by increasing the supplied amount of the cleaning fluid is possible as the variation amount of the adhesion degree of foreign matter increases, and supplying a large amount of cleaning fluid at once as the particle size of the foreign matter decreases is possible. Therefore, conserving the cleaning fluid while conducting an appropriate cleaning process that corresponds to the contamination situation is possible.

(5) According to the camera device 1000 of the present embodiment, when the variation amount of the adhesion degree of foreign matter is within a predetermined threshold value of equal to or greater than a first adhesion threshold and less than a second adhesion threshold, which are preset, the state of adhered lens contamination 11 is assessed as being in a first state; as a result, distinguishing between a state in which foreign matter of various sizes has adhered to the lens 11 and a first state in which fine particles (particles with a small particle size) have adhered to the lens 11 is possible when traveling on a paved road without patterns or irregularities; at the same time, when traveling on a paved road with patterns or irregularities, distinguishing between a state in which an image of these patterns or irregularities on the road surface is included in the captured image and a first state in which fine particles (particles with a small particle size) have adhered to the lens 11 is possible. Therefore, accurately assessing the first state in which fine particles (particles with a small particle size) have adhered is possible.

(6) According to the camera device 1000 of the present embodiment, when the state of adhered lens contamination 11 is the second state, washing is conducted by advancing the time to supply the cleaning fluid; therefore, maintaining the accuracy of three-dimensional object detection by removing aggregated foreign matter that shields a large portion of the lens 11 is possible.

(7) According to the camera device 1000 of the present embodiment, when the state of adhered lens contamination 11 is the second state, washing is conducted by reducing the supplied amount of the cleaning fluid; therefore, conserving the consumed amount of the cleaning fluid by reducing the supplied amount of cleaning fluid is possible while shortening the time during which the cleaning fluid is supplied.

(8) The camera device 1000 of the present embodiment assesses that the reliability of the assessment result regarding the adhesion state of the foreign matter is low when the difference between the actuals measured adhesion degree of foreign matter and the first adhesion threshold is small and sets the time for delaying the supply time of the cleaning fluid to be longer as the reliability of the assessment decreases; therefore, cleaning fluid is conserved by not conducting the cleaning process when this process is not necessary for actual cleaning, even when the state of adhered lens contamination is assessed as being the second state. Therefore, reducing the used amount of cleaning fluid is possible.

(9) According to the camera device 1000 of the present embodiment, by supplying cleaning fluid to the lens 11 after the host vehicle V is in a state of traveling on a paved road, sand and the like adhering again on the lens 11 due to the supplied cleaning fluid can be prevented, and effectively cleaning the lens 11 is possible.

(10) According to the three-dimensional object detection device 1 of the present embodiment, when the adhesion degree of foreign matter adhered to the lens 11 assessed by the adhesion state assessment unit 38 is a predetermined value or greater, the controller 39 of the present embodiment prevents three-dimensional object detection, and a three-dimensional object from being assessed to be another vehicle VX, so that a three-dimensional object can be appropriately detected. The actions and effects described above are similarly exerted when detecting another vehicle VX, using differential image information or when detecting another vehicle VX using edge information.

The camera 10 described above corresponds to the capturing means according to the present invention; the viewpoint conversion unit 31 described above corresponds to the image conversion means according to the present invention; the alignment unit 32 and the three-dimensional object detection unit 33 described above correspond to the three-dimensional object detection means according to the present invention; the luminance difference calculation unit 35, edge line detection unit 36, and three-dimensional object detection unit 37 described above correspond to the three-dimensional object detection means according to the present invention; the three-dimensional object assessment unit 34 described above corresponds to the three-dimensional object assessment means; the adhesion state assessment unit 38 described above corresponds to the adhesion state determination means; the controller 39 described above corresponds to the control means; the traveling path state assessment unit 41 described above corresponds to the traveling path state assessment means; the vehicle speed sensor 20 described above corresponds to the vehicle speed sensor; the lens cleaning device 100 described above corresponds to the lens cleaning means; and the controller 101 described above corresponds the lens cleaning control means.

The "distribution information" in the present invention is information regarding the distribution of pixels in which the luminance difference is at a predetermined threshold value or greater along the collapsing direction of a three-dimensional object when the viewpoint is converted to a bird's-eye view image obtained by the viewpoint conversion unit 31 (image conversion means). The "distribution information" includes at least the "differential waveform information" and the "edge information" in the present invention.

The alignment unit 21 in the present embodiment aligns on a bird's-eye view the positions of bird's-eye view images obtained at different times and obtains the aligned bird's-eye view images; however, the "alignment" process may be performed with a precision corresponding to the type of objects to be detected or to the required detection precision. The process may be a strict alignment process in which alignment is conducted based on the same time and the same position or a loose alignment in which the coordinates of each bird's-eye view image are grasped.

The invention claimed is:
1. A camera device comprising:
an image capturing device installed on a vehicle and comprising a lens for forming an image of the vehicle surroundings;
a lens cleaning device configured to clean the lens by spraying a cleaning fluid on the lens at a predetermined timing that is set in advance, in which at least a supply time for supplying cleaning fluid to the lens surface is predetermined;

an adhesion state assessment unit programmed to assess an adhesion state of contamination adhered to the lens based on an amount of change of a degree of adhesion by calculating the degree of adhesion of foreign matter adhered to a predetermined area of the lens based on a captured image captured by the image capturing device; and a lens cleaning controller programmed to extend the time until a time to start supplying the cleaning fluid, the larger the amount of change in the adhesion degree of foreign matter adhered to the lens determined by the adhesion state assessment unit, the longer the lens cleaning controller extends the time until the cleaning fluid is supplied.

2. The camera device as recited in claim 1, wherein the adhesion state assessment unit is programmed to calculate an adhesion amount of the foreign matter as the adhesion degree, based on pixel values of pixels included in the obtained captured image, and the number of pixels corresponding to foreign matter adhered to the surface of the lens, and to assess a state of adhered lens contamination based on the adhesion degree.

3. The camera device as recited in claim 1, wherein the adhesion state assessment unit is programmed to calculate a variation in the adhesion amount of foreign matter as a variation in the adhesion degree, based on pixel values of pixels included in the obtained captured image, and a variation in the number of pixels corresponding to foreign matter adhered to the surface of the lens in a predetermined time, and to assess a state of adhered lens contamination based on the variation in the adhesion degree.

4. The camera device as recited in claim 1, wherein the adhesion state assessment unit is programmed to calculate an adhesion ratio of the foreign matter as the adhesion degree, based on pixel values of the pixels included in the obtained captured image, and the distribution of the pixels corresponding to foreign matter adhered to the surface of the lens, and to assess a state of adhered lens contamination based on the adhesion degree.

5. The camera device as recited in claim 1, wherein the adhesion state assessment unit is programmed to calculate a variation in the adhesion ratio of foreign matter as a variation in an adhesion degree, based on pixel values of the pixels included in the obtained captured image, and a variation in distribution of the pixels corresponding to foreign matter adhered to the surface of the lens in a predetermined time, and to assess a state of adhered lens contamination based on the variation in the adhesion degree.

6. The camera device as recited in claim 2, wherein the adhesion state assessment unit is programmed to assess that the state of adhered lens contamination is a predetermined state when the adhesion degree of foreign matter is in a predetermined threshold value of equal to or greater than a first adhesion threshold and less than a second adhesion threshold, which are preset; and the lens cleaning controller is programmed to execute a control to extend the time until a time to start supplying the cleaning fluid when the state of adhered lens contamination is assessed as being the predetermined state.

7. The camera device as recited in claim 6, wherein the first adhesion threshold is an adhesion degree of foreign matter when the vehicle is traveling on a paved road without patterns on the road surface or a paved road without irregularities on the road surface.

8. The camera device as recited in claim 6, wherein the second adhesion threshold is an adhesion degree of foreign matter when the vehicle is traveling on one of a paved road with patterns on the road surface and a paved road with irregularities formed on the road surface.

9. The camera device as recited in claim 6, wherein the lens cleaning controller is programmed to cause the lens cleaning device to clean the lens following the predetermined lens cleaning step when the adhesion degree of foreign matter is assessed as being less than the first adhesion threshold or is equal to or greater than the second adhesion threshold, which is greater than the first adhesion threshold, and when the state of adhered lens contamination is assessed as not being the predetermined state.

10. The camera device as recited in claim 6, wherein the predetermined state is a state in which particles with a small average particle size have adhered to the lens.

11. The camera device as recited in claim 1, further comprising:

a traveling path state assessment unit programmed to assess whether a traveling path on which the vehicle is traveling is one of a paved road and an unpaved road based on traveling information acquired by the vehicle; wherein the lens cleaning controller supplies the cleaning fluid to the lens at a time at which the traveling path on which the host vehicle is traveling is assessed as being the paved road by the traveling path state assessment unit.

12. The camera device as recited in claim 11, wherein the traveling path state assessment unit acquires each wheel speed of a plurality of wheels provided to the vehicle, and when the variation of the plurality of acquired wheel speeds is less than a predetermined value, the traveling path on which the vehicle is traveling is assessed as being a paved road.

13. A three-dimensional object detection device including the camera device as recited in claim 2, the three-dimensional object detection device comprising:

an image conversion unit programmed to perform viewpoint conversion of captured images obtained by the camera device into bird's-eye view images;

a three-dimensional object detection unit programmed to detect a presence of a three-dimensional object, based on distribution information of pixels that is generated in the bird's-eye view images obtained by the image conversion unit, when a luminance difference is at a predetermined threshold value or greater along a collapsing direction of a three-dimensional object when the viewpoint is converted to the bird's-eye view image;

a three-dimensional object assessment unit programmed to assess whether the three-dimensional object detected by the three-dimensional object detection unit is another vehicle; and a controller programmed to prevent a detection of the three-dimensional object and the three-dimensional object from being assessed as being another vehicle when the adhesion state assessment unit has assessed that the adhesion degree of foreign matter adhered to the lens is equal to or greater than a predetermined value.

14. A lens cleaning method that is executed by a camera device comprising:
- a lens; and
- a lens cleaning device for cleaning the lens by supplying cleaning fluid on the lens; wherein
- the camera device executes a step assessing an adhesion state of contamination adhered to the lens based on an amount of change of a degree of adhesion by calculating the degree of adhesion of foreign matter adhered to a predetermined area of the lens based on a captured image; and
- extending the time until a time to start supplying the cleaning fluid, the larger the amount of change in the adhesion degree of foreign matter adhered to the lens, the longer the time is extended until the cleaning fluid is supplied.

* * * * *